United States Patent
Shigetomi et al.

(10) Patent No.: US 8,710,139 B2
(45) Date of Patent: Apr. 29, 2014

(54) ACRYLIC PRESSURE-SENSITIVE ADHESIVE COMPOSITION, ACRYLIC PRESSURE-SENSITIVE ADHESIVE LAYER, AND ACRYLIC PRESSURE-SENSITIVE ADHESIVE TAPE

(71) Applicant: Nitto Denko Corporation, Ibaraki (JP)

(72) Inventors: Kiyoe Shigetomi, Ibaraki (JP); Masayuki Okamoto, Ibaraki (JP); Masato Yamagata, Ibaraki (JP); Jun Akiyama, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 13/778,880

(22) Filed: Feb. 27, 2013

(65) Prior Publication Data

US 2013/0177758 A1 Jul. 11, 2013

Related U.S. Application Data

(63) Continuation of application No. PCT/JP2011/004708, filed on Aug. 24, 2011.

(30) Foreign Application Priority Data

| Aug. 27, 2010 | (JP) | 2010-191265 |
| Aug. 27, 2010 | (JP) | 2010-191266 |
| Aug. 5, 2011 | (JP) | 2011-172379 |
| Aug. 5, 2011 | (JP) | 2011-172380 |

(51) Int. Cl.
*B32B 5/22* (2006.01)
*B32B 15/04* (2006.01)
*B32B 7/12* (2006.01)
*C08L 39/00* (2006.01)
*C08J 3/00* (2006.01)

(52) U.S. Cl.
USPC ........ 524/516; 524/522; 428/317.9; 428/354; 428/355 AC

(58) Field of Classification Search
USPC ......... 524/516, 522; 428/317.9, 354, 355 AC
See application file for complete search history.

(56) References Cited

U.S. PATENT DOCUMENTS

| 2013/0005911 A1 | 1/2013 | Okamoto et al. |
| 2013/0011672 A1 | 1/2013 | Okamoto et al. |

FOREIGN PATENT DOCUMENTS

| JP | 6-207151 A | | 7/1994 |
| JP | 11-504054 A | | 4/1999 |
| JP | 2005-239831 A | | 9/2005 |
| JP | 2005239831 A | * | 9/2005 |
| JP | 2006-096958 A | | 4/2006 |
| JP | 2006096958 A | * | 4/2006 |
| JP | 2007-112869 A | | 5/2007 |
| JP | 2007112869 A | * | 5/2007 |
| JP | 2007-224258 A | | 9/2007 |
| JP | 2007224258 A | * | 9/2007 |
| JP | 2007-302846 A | | 11/2007 |
| JP | 2010-138409 A | | 6/2010 |
| JP | 2011-202012 A | | 10/2011 |
| JP | 2011-202013 A | | 10/2011 |
| WO | 96/33246 A1 | | 10/1996 |

\* cited by examiner

*Primary Examiner* — Michael Bernshteyn
(74) *Attorney, Agent, or Firm* — Sughrue Mion, PLLC

(57) ABSTRACT

An acrylic pressure-sensitive adhesive composition contains 100 parts by mass of an acrylic polymer (A), 1 to 70 parts by mass of a (meth)acrylic polymer (B) having a weight average molecular weight (Mw) of $1000 \leq Mw < 30000$, and 1 to 50 parts by mass of a hydrogenated tackifying resin (C). The (meth)acrylic polymer (B) is a polymer having a weight average molecular weight smaller than that of the acrylic polymer (A) as a pressure-sensitive adhesive composition, and functions as a tackifying resin along with the hydrogenated tackifying resin (C).

12 Claims, 1 Drawing Sheet

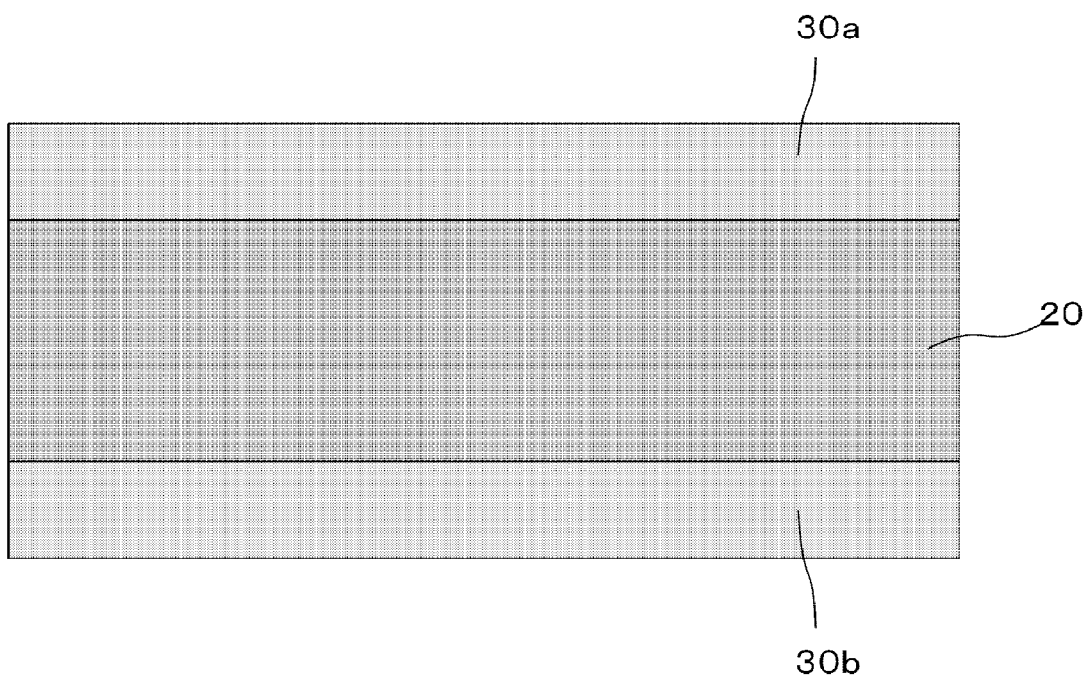

ACRYLIC PRESSURE-SENSITIVE ADHESIVE COMPOSITION, ACRYLIC PRESSURE-SENSITIVE ADHESIVE LAYER, AND ACRYLIC PRESSURE-SENSITIVE ADHESIVE TAPE

CROSS-REFERENCE TO RELATED APPLICATIONS

This application is based upon and claims the benefit of priority from the prior Japanese Patent Application No. 2010-191265, filed on Aug. 27, 2010, the prior Japanese Patent Application No. 2010-191266, filed on Aug. 27, 2010, the prior Japanese Patent Application No. 2011-172379, filed on Aug. 5, 2011, the prior Japanese Patent Application No. 2011-172380, filed on Aug. 5, 2011, and International Patent Application No. PCT/JP2011/004708, filed on Aug. 24, 2011, the entire content of each of which is incorporated herein by reference.

BACKGROUND OF THE INVENTION

1. Field of the Invention

The present invention relates to an acrylic pressure-sensitive adhesive composition, and an acrylic pressure-sensitive adhesive layer and an acrylic pressure-sensitive adhesive tape each having the acrylic pressure-sensitive adhesive composition.

2. Description of the Related Art

Because acrylic pressure-sensitive adhesive tapes each having an acrylic pressure-sensitive adhesive layer are excellent in adhesiveness, such as pressure-sensitive adhesive force, resistance to resilience, and holding property (cohesive force), and further excellent in aging resistance, such as heat resistance, light resistance, weatherability, and oil resistance, the acrylic pressure-sensitive adhesive tapes have been conventionally used in wide applications. In particular, the acrylic pressure-sensitive adhesive tapes having such properties have been widely used as joining materials in various industrial fields, such as home electronic appliances, building materials, and automobile interior and exterior materials. Accordingly, the acrylic pressure-sensitive adhesive tapes are required to be adhered, with high reliability, to various adherends (objects to be joined) including: metallic materials, such as stainless steel and aluminum; various plastic materials, such as polyethylene, polypropylene, polystyrene, ABS, (meth)acrylic resin, and polycarbonate resin; and glass materials, etc.

A method of adding a tackifying resin (tackifier) to an acrylic pressure-sensitive adhesive composition that forms an acrylic pressure-sensitive adhesive layer is known as a method of enhancing the adhesiveness of an acrylic pressure-sensitive adhesive tape to an adherend. Patent Documents 1 and 2 disclose acrylic pressure-sensitive adhesive compositions in each of which rosin or a hydrogenated petroleum resin has been added, as a tackifying resin, to an acrylic polymer.

PATENT DOCUMENTS

[Patent Document 1] Japanese Patent Application Publication No. 1994-207151
[Patent Document 2] Japanese Patent Application Publication (Translation of PCT Application) No. 1999-504054

Acrylic pressure-sensitive adhesive tapes are always required to have improved adhesiveness to adherends. In particular, it is strongly required that acrylic pressure-sensitive adhesive tapes should have improved adhesiveness to adherends having low polarity represented by polyolefin resins, such as polyethylene and polypropylene, which are frequently used for home electric appliances, building materials, and automobile interior and exterior materials, etc. On the other hand, there are sometimes the cases where the aforementioned acrylic pressure-sensitive adhesive composition to which a tackifying resin, such as rosin, has been added does not sufficiently meet the demand that the adhesiveness of an acrylic pressure-sensitive adhesive tape to an adherend having low polarity should be improved.

SUMMARY OF THE INVENTION

The present invention has been made in view of these situations, and a purpose of the invention is to provide a technique for improving the adhesiveness of an acrylic pressure-sensitive adhesive tape.

A first aspect of the present invention is an acrylic pressure-sensitive adhesive composition. The acrylic pressure-sensitive adhesive composition contains 100 parts by mass of an acrylic polymer (A), 1 to 70 parts by mass of a (meth)acrylic polymer (B) having a weight average molecular weight (Mw) of $1000 \leq Mw < 30000$, and 1 to 50 parts by mass of a hydrogenated tackifying resin (C).

According to the acrylic pressure-sensitive adhesive tape of this aspect, the adhesiveness of an acrylic pressure-sensitive adhesive tape to adherends including adherends having low polarity can be improved.

In the acrylic pressure-sensitive adhesive composition according to the aforementioned aspect, the glass transition temperature (Tg) of the (meth)acrylic polymer (B) may be $0°C \leq Tg \leq 300°C$. In addition, the (meth)acrylic polymer (B) may contain, as a monomer unit, a (meth)acrylic monomer having an alicyclic structure in its side chain. In this case, an alicyclic hydrocarbon group in the (meth)acrylic monomer having an alicyclic structure may have a bridged ring structure.

In addition, the hydrogenated tackifying resin (C) may be a petroleum resin or a terpene resin. In addition, the softening point of the hydrogenated tackifying resin (C) may be 80 to 200°C. In addition, the acrylic polymer (A) may contain, as a monomer unit, at least one type of monomer selected from the group consisting of N-vinyl cyclic amides, represented by the acrylic (1) described in the following general formula, and carboxyl group-containing monomers:

[Formula 1]

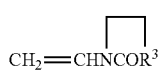
(1)

wherein, $R^3$ is a divalent organic group.

A second aspect of the present invention is an acrylic pressure-sensitive adhesive layer. The acrylic pressure-sensitive adhesive layer is made of the acrylic pressure-sensitive adhesive composition according to any one the aforementioned aspects. The acrylic pressure-sensitive adhesive layer according to this aspect may contain 40 to 90% by mass of a solvent-insoluble component.

A third embodiment of the present invention is an acrylic pressure-sensitive adhesive tape. The acrylic pressure-sensitive adhesive tape includes the acrylic pressure-sensitive adhesive layer according to any one of the aforementioned aspects.

A fourth aspect of the present invention is an acrylic pressure-sensitive adhesive layer. The acrylic pressure-sensitive adhesive layer includes a core layer and a surface layer provided on one or both sides of the core layer, in which the core layer contains an acrylic polymer and the surface layer is made of the acrylic pressure-sensitive adhesive composition according to any one of the aforementioned aspects. The surface layer according to this aspect may contain 40 to 90% by mass of a solvent-insoluble component.

A fifth aspect of the present invention is an acrylic pressure-sensitive adhesive tape. The acrylic pressure-sensitive adhesive tape includes the acrylic pressure-sensitive adhesive layer according to the aforementioned fourth aspect. The core layer may further contain a fine particle and a bubble.

BRIEF DESCRIPTION OF THE DRAWING

Embodiments will now be described, by way of example only, with reference to the accompanying drawing, which is meant to be exemplary, not limiting, in which:

FIG. 1 is a schematic sectional view illustrating the structure of an acrylic pressure-sensitive adhesive tape according to an embodiment.

DETAILED DESCRIPTION OF THE INVENTION

The invention will now be described by reference to the preferred embodiments. This does not intend to limit the scope of the present invention, but to exemplify the invention.

Embodiment 1

An acrylic pressure-sensitive adhesive composition according to the present Embodiment 1 contains: an acrylic polymer (A) as a pressure-sensitive adhesive composition; a (meth)acrylic polymer (B) as a tackifying resin, the weight average molecular weight (Mw) of which is 1000≤Mw<30000 (hereinafter, appropriately referred to as a (meth)acrylic polymer (B)); and a hydrogenated tackifying resin (C).

The content of each component in the acrylic pressure-sensitive adhesive composition according to Embodiment 1 is described below.

Acrylic Polymer (A): 100 Parts by Mass
(Meth)Acrylic Polymer (B): 1 to 70 Parts by Mass
Hydrogenated Tackifying Resin (C): 1 to 50 Parts by Mass Hereinafter, the acrylic polymer (A), the (meth)acrylic polymer (B), and the hydrogenated tackifying resin (C) will be described in detail.

[Acrylic Polymer (A)]

The acrylic polymer (A) contains, as a monomer unit, (meth)acrylic acid alkyl ester having, for example, a $C_{1-20}$ linear or branched alkyl group in an amount of 50% by mass or more. In addition, the acrylic polymer (A) may have a structure formed only by (meth)acrylic acid alkyl ester having a $C_{1-20}$ alkyl group or by a combination of two or more thereof. The acrylic polymer (A) can be obtained by subjecting the (meth)acrylic acid alkyl ester to polymerization (e.g., solution polymerization, emulsion polymerization, UV polymerization), along with a polymerization initiator.

The ratio (R) of the (meth)acrylic acid alkyl ester having a $C_{1-20}$ alkyl group to the total mass of the monomer components for preparing the acrylic polymer (A) is 50% by mass≤R≤99.9% by mass, preferably 60% by mass≤R≤98% by mass, and more preferably 70% by mass≤R≤95% by mass.

Examples of the (meth)acrylic acid alkyl ester having a $C_{1-20}$ alkyl group include, for example: (meth)acrylic acid $C_{1-20}$ alkyl esters [preferably (meth)acrylic acid $C_{2-14}$ alkyl esters, more preferably (meth)acrylic acid $C_{2-10}$ alkyl esters], such as (meth)acrylic acid methyl, (meth)acrylic acid ethyl, (meth)acrylic acid propyl, (meth)acrylic acid isopropyl, (meth)acrylic acid butyl, (meth)acrylic acid isobutyl, (meth) acrylic acid s-butyl, (meth)acrylic acid t-butyl, (meth)acrylic acid pentyl, (meth)acrylic acid isopentyl, (meth)acrylic acid hexyl, (meth)acrylic acid heptyl, (meth)acrylic acid octyl, (meth)acrylic acid 2-ethylhexyl, (meth)acrylic acid isooctyl, (meth)acrylic acid nonyl, (meth)acrylic acid isononyl, (meth) acrylic acid decyl, (meth)acrylic acid isodecyl, (meth)acrylic acid undecyl, (meth)acrylic acid dodecyl, (meth)acrylic acid tridecyl, (meth)acrylic acid tetradecyl, (meth)acrylic acid pentadecyl, (meth)acrylic acid hexadecyl, (meth)acrylic acid heptadecyl, (meth)acrylic acid octadecyl, (meth)acrylic acid nonadecyl, and (meth)acrylic acid eicosyl. In addition, the (meth)acrylic acid alkyl ester means an acrylic acid alkyl ester and/or a methacrylic acid alkyl ester, and all of the "(meth). . ." expressions have the same meaning.

Examples of (meth)acrylic acid esters other than the (meth) acrylic acid alkyl esters include, for example: (meth)acrylic acid esters having an alicyclic hydrocarbon group, such as cyclopentyl(meth)acrylate, cyclohexyl(meth)acrylate, and isobornyl(meth)acrylate; (meth)acrylic acid esters having an aromatic hydrocarbon group, such as phenyl(meth)acrylate; and (meth)acrylic acid esters obtained from terpene compound derivative alcohols, etc.

For the purpose of modifying cohesive force, heat resistance, and cross-linking property, etc., the acrylic polymer (A) may contain, if necessary, another monomer component (copolymerizable monomer) that is copolymerizable with the (meth)acrylic acid alkyl ester. Accordingly, the acrylic polymer (A) may contain a copolymerizable monomer along with the (meth)acrylic acid alkyl ester as a major component. A monomer having a polar group can be preferably used as the copolymerizable monomer.

Specific examples of the copolymerizable monomer include: carboxyl group-containing monomers, such as acrylic acid, methacrylic acid, carboxy ethyl acrylate, carboxy pentylacrylate, itaconic acid, maleic acid, fumaric acid, crotonic acid, and isocrotonic acid; hydroxyl group-containing monomers, such as (meth)acrylic acid hydroxyalkyls including (meth)acrylic acid hydroxyethyl, (meth)acrylic acid hydroxypropyl, (meth)acrylic acid hydroxybutyl, (meth) acrylic acid hydroxyhexyl, (meth)acrylic acid hydroxyoctyl, (meth)acrylic acid hydroxydecyl, (meth)acrylic acid hydroxylauryl, and (4-hydroxymethyl cyclohexyl)methyl methacrylate; acid anhydride group-containing monomers, such as maleic acid anhydride and itaconic acid anhydride; sulfonic acid group-containing monomers, such as styrene sulfonic acid, allyl sulfonic acid, 2-(meth)acrylamide-2-methylpropanesulfonic acid, (meth)acrylamide propanesulfonic acid, sulfopropyl(meth)acrylate, and (meth)acryloyloxy naphthalenesulfonic acid; phosphate group-containing monomers, such as 2-hydroxyethyl acryloyl phosphate; (N-substituted)amide monomers, such as (meth)acrylamide, N,N-dialkyl(meth)acrylamides including N,N-dimethyl (meth)acrylamide, N,N-diethyl(meth)acrylamide, N,N-dipropyl(meth)acrylamide, N,N-diisopropyl(meth)acrylamide, N,N-di(n-butyl)(meth)acrylamide, and N,N-di(t-butyl) (meth)acrylamide, N-ethyl(meth)acrylamide, N-isopropyl (meth)acrylamide, N-butyl(meth)acrylamide, N-n-butyl (meth)acrylamide, N-methylol(meth)acrylamide, N-ethylol (meth)acrylamide, N-methylol propane (meth)acrylamide, N-methoxymethyl(meth)acrylamide, N-methoxyethyl (meth)acrylamide, N-butoxymethyl(meth)acrylamide, and N-acryloylmorpholine; succinimide monomers, such as N-(meth)acryloyloxy methylene succinimide, N-(meth)acryloyl-6-oxy hexamethylene succinimide, and N-(meth)acryloyl-8-oxy hexamethylene succinimide; maleimide monomers, such as N-cyclohexylmaleimide, N-isopropylmaleimide, N-laurylmaleimide, and N-phenylmaleimide; itaconimide monomers, such as N-methylitaconimide, N-ethylitaconimide, N-butylitaconimide, N-octylitaconimide, N-2-ethylhexylitaconimide, N-cyclohexylitaconimide, and N-laurylitaconimide; vinyl esters, such as vinyl acetate and vinyl propionate; nitrogen-containing heterocyclic monomers, such as N-vinyl-2-pyrrolidone, N-methylvinylpyrrolidone, N-vinylpyridine, N-vinylpiperidone, N-vinylpyrimidine, N-vinylpiperazine, N-vinylpyrazine, N-vinylpyrrole, N-vinylimidazole, N-vinyloxazole, N-(meth)acryloyl-2-pyrrolidone, N-(meth)acryloylpiperidine, N-(meth)acryloylpyrrolidine, N-vinyl morpholine, N-vinyl-2-piperidone, N-vinyl-3-morpholine, N-vinyl-2-caprolactam, N-vinyl-1,3-oxazine-2-one, N-vinyl-3,5-morpholine dione, N-vinylpyrazole, N-vinyl isoxazole, N-vinylthiazole, N-vinylisothiazole, and N-vinylpyridazine; N-vinyl carboxylic acid amides; lactam monomers, such as N-vinyl caprolactam; cyano-containing monomers, such as acrylonitrile and methacrylonitrile; (meth)acrylic acid aminoalkyl monomers, such as (meth)acrylic acid aminoethyl, (meth)acrylic acid N,N-dimethylaminoethyl, (meth)acrylic acid N,N-dimethylaminoethyl, and (meth)acrylic acid t-butylaminoethyl; (meth)acrylic acid alkoxy alkyl monomers, such as (meth)acrylic acid methoxyethyl, (meth)acrylic acid ethoxyethyl, (meth)acrylic acid propoxyethyl, (meth) acrylic acid butoxyethyl, and (meth)acrylic acid ethoxypropyl; styrene monomers, such as styrene and α-methylstyrene; epoxy group-containing acrylic monomers, such as (meth) acrylic acid glycidyl; glycol acrylic ester monomers, such as (meth)acrylic acid polyethylene glycol, (meth)acrylic acid polypropylene glycol, (meth)acrylic acid methoxy ethylene glycol, and (meth)acrylic acid methoxy polypropylene glycol; acrylic acid ester monomers having a heterocycle, halogen atom, silicon atom, or the like, such as (meth)acrylic acid tetrahydrofurfuryl, fluorine atom-containing (meth)acrylate, and silicone(meth)acrylate; olefin monomers, such as isoprene, butadiene, and isobutylene; vinyl ether monomers, such as methyl vinyl ether and ethyl vinyl ether; vinyl esters, such as vinyl acetate and vinyl propionate aromatic vinyl compounds, such as vinyl toluene and styrene; olefins or dienes, such as ethylene, butadiene, isoprene, and isobutylene; vinyl ethers, such as vinyl alkyl ether; vinyl chloride; (meth)acrylic acid alkoxy alkyl monomers, such as (meth) acrylic acid methoxyethyl and (meth)acrylic acid ethoxyethyl; sulfonic acid group-containing monomers, such as vinyl sulfonate sodium; imide group-containing monomers, such as cyclohexyl maleimide and isopropyl maleimide; isocyanate group-containing monomers, such as 2-isocyanate ethyl(meth)acrylate; and acryloyl morpholine. These copolymerizable monomers can be used alone or in combination of two or more thereof.

Among the aforementioned nitrogen-containing heterocyclic monomers, more preferred monomers can be exemplified by N-vinyl cyclic amides represented by the following general formula (1).

[Formula 2]

(1)

wherein, $R^3$ is a divalent organic group.

When the acrylic polymer (A) contains a copolymerizable monomer along with a (meth)alkyl acid alkyl ester as a major component, carboxyl group-containing monomers can be preferably used. Among them, an acrylic acid can be preferably used. The use amount of the copolymerizable monomer is not particularly limited, but the copolymerizable monomer can be usually contained in an amount within a range of 0.1 to 40% by mass, preferably within a range of 0.5 to 30% by mass, and more preferably within a range of 1 to 20% by mass, based on the total mass of the monomer components for preparing the acrylic polymer (A).

By containing the copolymerizable monomer in an amount of 0.1% by mass or more, a decrease in the cohesive force of an acrylic pressure-sensitive adhesive tape or sheet having a pressure-sensitive adhesive layer formed of the acrylic pressure-sensitive adhesive composition can be prevented and high shear force can be obtained. Further, by containing the copolymerizable monomer in an amount of 40% by mass or less, it can be prevented that the cohesive force thereof may become too large and the tackiness at normal temperature (25° C.) can be improved.

The acrylic polymer (A) may also contain, if necessary, a polyfunctional monomer, in order to adjust the cohesive force of the acrylic pressure-sensitive adhesive composition to be formed.

Examples of the polyfunctional monomer include, for example: (poly)ethylene glycol di(meth)acrylate, (poly)propylene glycol di(meth)acrylate, neopentyl glycol di(meth) acrylate, pentaerythritol di(meth)acrylate, pentaerythritol tri (meth)acrylate, dipentaerythritol hexa(meth)acrylate, 1,2-ethylene glycol di(meth)acrylate, 1,6-hexanediol di(meth) acrylate, 1,12-dodecane diol di(meth)acrylate, trimethylolpropane tri(meth)acrylate, tetramethylol methane tri(meth)acrylate, allyl(meth)acrylate, vinyl(meth)acrylate, divinylbenzene, epoxy acrylate, polyester acrylate, urethane acrylate, butyldiol (meth)acrylate, and hexyldiol (meth)acrylate, etc. Among them, trimethylolpropane tri(meth)acrylate, hexanediol di(meth)acrylate, and dipentaerythritol hexa(meth)acrylate can be preferably used. The polyfunctional (meth)acrylates can be used alone or in combination of two or more thereof.

The use amount of the polyfunctional monomer is changed depending on the molecular weight or the number of functional groups thereof, but the polyfunctional monomer is added in an amount within a range of 0.01 to 3.0% by mass, preferably within a range of 0.02 to 2.0% by mass, and more preferably within a range of 0.03 to 1.0% by mass, based on the total mass of the monomer components for preparing the acrylic polymer (A).

If the use amount of the polyfunctional monomer is more than 3.0% by mass based on the total mass of the monomer components for preparing the acrylic polymer (A), for example, the cohesive force of the acrylic pressure-sensitive adhesive composition may become too large and accordingly there are sometimes the cases where the adhesive force is decreased. On the other hand, if the use amount thereof is less than 0.01% by mass, for example, there are sometimes the cases where the cohesive force of the acrylic pressure-sensitive adhesive composition is decreased.

<Polymerization Initiator>

In preparing the acrylic polymer (A), the acrylic polymer (A) can be easily formed by a curing reaction using heat or ultraviolet rays with the use of a polymerization initiator, such as a thermal polymerization initiator, photo-polymerization initiator (photo-initiator), or the like. In particular, a photo-polymerization initiator can be preferably used in terms of the advantage that a polymerization time can be shortened. The polymerization initiators can be used alone or in combination of two or more thereof.

Examples of the thermal polymerization initiator include, for example: azo polymerization initiators (for example, 2,2'-azobisisobutyronitrile, 2,2'-azobis-2-methylbutyronitrile, 2,2'-azobis(2-methylpropionic acid)dimethyl, 4,4'-azobis-4-cyanovalerianic acid, azobis isovaleronitrile, 2,2'-azobis(2-amidinopropane)dihydrochloride, 2,2'-azobis[2-(5-methyl-2-imidazoline-2-yl)propane]dihydrochloride, 2,2'-azobis(2-methylpropionamidine)disulfate, and 2,2'-azobis(N,N'-dimethyleneisobutylamidine)dihydrochloride, etc.); peroxide polymerization initiators (for example, dibenzoyl peroxide, t-butyl permaleate, and lauroyl peroxide, etc.); and redox polymerization initiators, etc.

The use amount of the thermal polymerization initiator is not particularly limited, and only has to be within a conventional range in which it can be used as a thermal polymerization initiator.

The photo-polymerization initiator is not particularly limited, but, for example, a benzoin ether photo-polymerization initiator, acetophenone photo-polymerization initiator, α-ketol photo-polymerization initiator, aromatic sulfonyl chloride photo-polymerization initiator, photoactive oxime photo-polymerization initiator, benzoin photo-polymerization initiator, benzyl photo-polymerization initiator, benzophenone photo-polymerization initiator, ketal photo-polymerization initiator, thioxanthone photo-polymerization initiator, acylphosphine oxide photo-polymerization initiator, or the like, can be used.

Specific examples of the benzoin ether photo-polymerization initiator include, for example: benzoin methyl ether, benzoin ethyl ether, benzoin propyl ether, benzoin isopropyl ether, benzoin isobutyl ether, 2,2-dimethoxy-1,2-diphenylethane-1-one [product name: IRGACURE 651, made by BASF], and anisoin, etc. Specific examples of the acetophenone photo-polymerization initiator include, for example: 1-hydroxycyclohexyl phenyl ketone [product name: IRGACURE 184, made by BASF], 4-phenoxy dichloroacetophenone, 4-t-butyl-dichloroacetophenone, 1-[4-(2-hydroxyethoxy)-phenyl]-2-hydroxy-2-methyl-1-propane-1-one [product name: IRGACURE 2959, made by BASF], 2-hydroxy-2-methyl-1-phenyl-propane-1-one [product name: DAROCUR 1173, made by BASF], and methoxy acetophenone, etc. Specific examples of the α-ketol photo-polymerization initiator include, for example: 2-methyl-2-hydroxy propiophenone and 1-[4-(2-hydroxyethyl)-phenyl]-2-hydroxy-2-methylpropane-1-one, etc. Specific examples of the aromatic sulfonyl chloride photo-polymerization initiator include, for example, 2-naphthalene sulfonyl chloride, etc. Specific examples of the photoactive oxime photo-polymerization initiator include, for example, 1-phenyl-1,2-propanedione-2-(O-ethoxycarbonyl)-oxime, etc.

Specific examples of the benzoin photo-polymerization initiator include, for example, benzoin, etc. Specific examples of the benzyl photo-polymerization initiator include, for example, benzyl, etc. Specific examples of the benzophenone photo-polymerization initiators include, for example, benzophenone, benzoylbenzoic acid, 3,3'-dimethyl-4-methoxybenzophenone, polyvinyl benzophenone, and α-hydroxy cyclohexyl phenyl ketone, etc. Specific examples of the ketal photo-polymerization initiator include, for example, benzyl dimethyl ketal, etc. Specific examples of the thioxanthone photo-polymerization initiator include, for example, thioxanthone, 2-chlorothioxanthone, 2-methyl thioxanthone, 2,4-dimethyl thioxanthone, isopropyl thioxanthone, 2,4-dichloro thioxanthone, 2,4-diethyl thioxanthone, isopropyl thioxanthone, 2,4-diisopropyl thioxanthone, and dodecyl thioxanthone, etc.

Examples of the acylphosphine photo-polymerization initiator include, for example: bis(2,6-dimethoxybenzoyl)phenylphosphine oxide, bis(2,6-dimethoxybenzoyl)(2,4,4-trimethylpentyl)phosphine oxide, bis(2,6-dimethoxybenzoyl)-n-butyl phosphine oxide, bis(2,6-dimethoxybenzoyl)-(2-methylpropane-1-yl)phosphine oxide, bis(2,6-dimethoxybenzoyl)-(1-methylpropane-1-yl) phosphine oxide, bis(2,6-dimethoxybenzoyl)-t-butylphosphine oxide, bis(2,6-dimethoxybenzoyl)cyclohexylphosphine oxide, bis (2,6-dimethoxybenzoyl)octylphosphine oxide, bis(2-methoxybenzoyl)(2-methylpropane-1-yl)phosphine oxide, bis(2-methoxybenzoyl)(1-methylpropane-1-yl)phosphine oxide, bis(2,6-diethoxybenzoyl)(2-methylpropane-1-yl)phosphine oxide, bis(2,6-diethoxybenzoyl)(1-methylpropane-1-yl) phosphine oxide, bis(2,6-dibutoxybenzoyl)(2-methylpropane-1-yl)phosphine oxide, bis(2,4-dimethoxybenzoyl)(2-methypropane-1-yl)phosphine oxide, bis(2,4,6-trimethylbenzoyl)(2,4-dipentoxyphenyl)phosphine oxide, bis(2,6-dimethoxybenzoyl)benzyl phosphine oxide, bis(2,6-dimethoxybenzoyl)-2-phenylpropyl phosphine oxide, bis(2, 6-dimethoxybenzoyl)-2-phenylethyl phosphine oxide, bis(2, 6-dimethoxybenzoyl)benzyl phosphine oxide, bis(2,6-dimethoxybenzoyl)-2-phenylpropyl phosphine oxide, bis(2, 6-dimethoxybenzoyl)-2-phenylethyl phosphine oxide, 2,6-dimethoxybenzoyl benzylbutylphosphine oxide, 2,6-dimethoxybenzoyl benzyloctylphosphine oxide, bis(2,4,6-trimethylbenzoyl)-2,5-diisopropylphenylphosphine oxide, bis(2,4,6-trimethylbenzoyl)-2-methylphenylphosphine oxide, bis(2,4,6-trimethylbenzoyl)-4-methylphenylphosphine oxide, bis(2,4,6-trimethylbenzoyl)-2,5-diethylphenylphosphine oxide, bis(2,4,6-trimethylbenzoyl)-2,3,5,6-tetramethylphenylphosphine oxide, bis(2,4,6-trimethyl benzoyl)-2,4-di-n-butoxy phenylphosphine oxide, 2,4,6-trimethylbenzoyl diphenylphosphine oxide, bis(2,6-dimethoxybenzoyl)-2,4,4-trimethylpentylphosphine oxide, bis(2,4,6-trimethylbenzoyl)isobutylphosphine oxide, 2,6-dimethoxybenzoyl-2,4,6-trimethylbenzoyl-n-butylphosphine oxide, bis(2,4,6-trimethylbenzoyl)phenylphosphine oxide, bis(2,4,6-trimethylbenzoyl)-2,4-dibutoxyphenylphosphine oxide, 1,10-bis[bis(2,4,6-trimethylbenzoyl)phosphine oxide]decane, and tri(2-methylbenzoyl)phosphine oxide, etc.

The use amount of the photo-polymerization initiator is not particularly limited, but the photo-polymerization initiator is combined, for example, in an amount within a range of 0.01 to 5 parts by mass, and preferably within a range of 0.05 to 3 parts by mass, based on 100 parts by mass of the monomer components for preparing the acrylic polymer (A).

If the use amount of the photo-polymerization initiator is less than 0.01 parts by mass, there are sometimes the cases where a polymerization reaction becomes insufficient. If the use amount thereof is more than 5 parts by mass, there are sometimes the cases where an ultraviolet ray does not reach the inside of the pressure-sensitive adhesive layer, because the photo-polymerization initiator absorbs an ultraviolet ray. In this case, a decrease in the rate of polymerization is caused, or the molecular weight of the generated polymer becomes small. Thereby, the cohesive force of the pressure-sensitive adhesive layer to be formed becomes small, and hence there are sometimes the cases where, when the pressure-sensitive adhesive layer is peeled off from a film, part of the layer remains on the film and accordingly the film cannot be reused. The photo-polymerization initiators may be used alone or in combination of two or more thereof.

In order to adjust the cohesive force, a cross-linking agent can also be used, other than the aforementioned polyfunctional monomers. Commonly-used cross-linking agents can be used as the cross-linking agent. Examples of the cross-linking agents include, for example: an epoxy cross-linking agent, isocyanate cross-linking agent, silicone cross-linking agent, oxazoline cross-linking agent, aziridine cross-linking agent, silane cross-linking gent, alkyl-etherified melamine cross-linking agent, and metal chelate cross-linking agent, etc. In particular, an isocyanate cross-linking agent and epoxy cross-linking agent can be preferably used.

Specific examples of the isocyanate cross-linking agent include: tolylene diisocyanate, hexamethylene diisocyanate, isophorone diisocyanate, xylylene diisocyanate, hydrogenated xylylene diisocyanate, diphenylmethane diisocyanate, hydrogenated diphenylmethane diisocyanate, tetramethyl xylylene diisocyanate, naphthalene diisocyanate, triphenylmethane triisocyanate, polymethylene polyphenyl isocyanate, and these adducts with polyols, such as trimethylolpropane. Alternatively, a compound having, in one molecule, at least one isocyanate group and one or more unsaturated bonds, specifically 2-isocyanate ethyl(meth)acrylate, etc., can also be used as the isocyanate cross-linking agent.

Examples of the epoxy cross-linking agent include: bisphenol A, epichlorohydrin type epoxy resin, ethyleneglycidylether, polyethylene glycol diglycidyl ether, glycerin diglycidyl ether, glycerin triglycidyl ether, 1,6-hexanediol glycidyl ether, trimethylolpropane triglycidyl ether, diglycidyl aniline, diamine glycidyl amine, N,N,N',N'-tetraglycidyl-m-xylylenediamine, and 1,3-bis(N,N-diglycidyl aminomethyl) cyclohexane, etc.

In the present embodiment, the acrylic polymer (A) can also be prepared as a partial polymer (acrylic polymer syrup) that can be obtained by radiating ultraviolet (UV) rays onto a mixture in which the aforementioned monomer components and the polymerization initiator have been combined, so that the monomer components are partially polymerized. An acrylic pressure-sensitive adhesive composition is prepared by combining the later-described (meth)acrylic polymer (B) into the acrylic polymer syrup, and then polymerization can also be completed by coating the pressure-sensitive adhesive composition on a predetermined object to be coated and by radiating UV rays. The weight average molecular weight (Mw) of the acrylic polymer (A) is, for example, within a range of 30000 to 5000000.

The glass transition temperature (Tg) of the acrylic polymer (A) is Tg<0° C., and preferably Tg<−10° C., and is usually −80° C. Tg.

[(Meth)Acrylic Polymer (B)]

The (meth)acrylic polymer (B) is a polymer having a weight average molecular weight smaller than that of the acrylic polymer (A), and functions as a tackifying resin and has the advantage that inhibition of polymerization is hardly caused when UV polymerization is performed. For example, the (meth)acrylic polymer (B) contains, as a monomer unit, a (meth)acrylic acid ester.

Examples of such a (meth)acrylic acid ester include: (meth)acrylic acid alkyl esters, such as (meth)acrylic acid methyl, (meth)acrylic acid ethyl, (meth)acrylic acid propyl, (meth)acrylic acid isopropyl, (meth)acrylic acid butyl, (meth)acrylic acid isobutyl, (meth)acrylic acid s-butyl, (meth)acrylic acid t-butyl, (meth)acrylic acid pentyl, (meth)acrylic acid isopentyl, (meth)acrylic acid hexyl, (meth)acrylic acid-2-ethylhexyl, (meth)acrylic acid heptyl, (meth)acrylic acid octyl, (meth)acrylic acid isooctyl, (meth)acrylic acid nonyl, (meth)acrylic acid isononyl, (meth)acrylic acid decyl, (meth)acrylic acid isodecyl, (meth)acrylic acid undecyl, and (meth)acrylic acid dodecyl; esters of (meth)acrylic acids with alicyclic alcohols, such as (meth)acrylic acid cyclohexyl and (meth)acrylic acid isobornyl; (meth)acrylic acid aryl esters, such as (meth)acrylic acid phenyl and (meth)acrylic acid benzyl; and (meth)acrylic acid esters obtained from terpene compound derivative alcohols, etc. These (meth)acrylic acid esters can be used alone or in combination of two or more thereof.

Alternatively, the (meth)acrylic polymer (B) can also be obtained by copolymerizing another monomer component (copolymerizable monomer) that is copolymerizable with the (meth)acrylic acid ester, in addition to the aforementioned (meth)acrylic acid ester component unit.

Examples of the another monomer that is copolymerizable with the (meth)acrylic acid ester include: (meth)acrylic acid alkoxy alkyl monomers, such as (meth)acrylic acid methoxyethyl, (meth)acrylic acid ethoxyethyl, (meth)acrylic acid propoxyethyl, (meth)acrylic acid butoxyethyl, and (meth)acrylic acid ethoxypropyl; salts, such as (meth)acrylic acid alkali metal salt; di(meth)acrylic acid ester monomers of (poly) alkylene glycols, such as di(meth)acrylic acid ester of ethylene glycol, di(meth)acrylic acid ester of diethylene glycol, di(meth)acrylic acid ester of triethylene glycol, di(meth)acrylic acid ester of polyethylene glycol, di(meth)acrylic acid ester of propylene glycol, di(meth)acrylic acid ester of dipropylene glycol, and di(meth)acrylic acid ester of tripropylene glycol; poly(meth)acrylic acid ester monomers, such as trimethylolpropane tri(meth)acrylic acid ester; vinyl esters, such as vinyl acetate and vinyl propionate; halogenated vinyl compounds, such as vinylidene chloride and (meth)acrylic acid-2-chloroethyl; oxazoline group-containing polymerizable compounds, such as 2-vinyl-2-oxazoline, 2-vinyl-5-methyl-2-oxazoline, and 2-isopropenyl-2-oxazoline; aziridine group-containing polymerizable compounds, such as (meth)acryloylaziridine and (meth)acrylic acid-2-aziridinylethyl; epoxy group-containing vinyl monomers, such as allyl glycidyl ether, (meth)acrylic acid glycidyl ether, and (meth)acrylic acid-2-ethyl glycidyl ether; hydroxyl group-containing vinyl monomers, such as (meth)acrylic acid-2-hydroxyethyl, (meth)acrylic acid-2-hydroxypropyl, monoesters of (meth)acrylic acids with polypropylene glycol or polyethylene glycol, and adducts of lactones with (meth)acrylic acid-2-hydroxyethyl; fluorine-containing vinyl monomers, such as fluorine-substituted (meth)acrylic acid alkyl ester; acid anhydride group-containing monomers, such as maleic acid anhydride and itaconic acid anhydride; aromatic vinyl compound monomers, such as styrene, α-methylstyrene, and vinyl toluene; reactive halogen-containing vinyl monomers, such as 2-chloroethyl vinyl ether and monochloro vinyl acetate; amide group-containing vinyl monomers, such as (meth)acrylamide, N-isopropyl(meth)acrylamide, N-butyl(meth)acrylamide, N,N-diethyl(meth)acrylamide, N,N-dimethyl(meth)acrylamide, N-methylol(meth)acrylamide, N-ethylol(meth)acrylamide, N-methylolpropane(meth)acrylamide, N-methoxyethyl (meth)acrylamide, N-butoxymethyl(meth)acrylamide, and N-acryloyl morpholine; succinimide monomers, such as N-(meth)acryloyloxy methylene succinimide, N-(meth)acryloyl-6-oxy hexamethylene succinimide, and N-(meth)acryloyl-8-oxy hexamethylene succinimide; maleimide monomers, such as N-cyclohexyl maleimide, N-isopropylmaleimide, N-lauryl maleimide, and N-phenyl maleimide; itaconimide monomers, such as N-methylitaconimide, N-ethylitaconimide, N-butylitaconimide, N-octylitaconimide, N-2-ethylhexylitaconimide, N-cyclohexylitaconimide, and N-laurylitaconimide; nitrogen-containing heterocyclic monomers, such as N-vinyl-2-pyrrolidone, N-methylvinylpyrrolidone, N-vinylpyridine, N-vinylpiperidone, N-vinylpyrimidine, N-vinylpiperazine, N-vinylpyrazine, N-vinylpyrrole, N-vinylimidazole, N-vinyloxazole, N-(meth)acryloyl-2-pyrrolidone, N-(meth)acryloylpiperidine, N-(meth)acryloylpyrrolidine, N-vinyl morpholine, N-vinyl pyrazole, N-vinyl isoxazole, N-vinyl thiazole, N-vinyl isothiazole, and N-vinyl pyridazine; N-vinyl carboxylic acid amides; lactam monomers, such as N-vinyl caprolactam; cyano-containing monomers, such as (meth)acrylonitrile; (meth)acrylic acid aminoalkyl monomers, such as (meth)acrylic acid aminoethyl, (meth)acrylic acid N,N-dimethylaminoethyl, (meth)acrylic acid N,N-dimethylaminoethyl, and (meth)acrylic acid t-butylaminoethyl; imide group-containing monomers, such as cyclohexyl maleimide and isopropyl maleimide; isocyanate group-containing monomers, such as 2-isocyanate ethyl(meth)acrylate; organic silicon-containing vinyl monomers, such as vinyltrimethoxysilane, γ-methacryloxypropyl trimethoxy silane, allyltrimethoxysilane, trimethoxysilylpropylallylamine, and 2-methoxy ethoxy trimethoxy silane; hydroxyl group-containing monomers, such as (meth)acrylic acid hydroxyalkyls including (meth)acrylic acid hydroxyethyl, (meth)acrylic acid hydroxypropyl, (meth)acrylic acid hydroxybutyl, (meth)acrylic acid hydroxyhexyl, (meth)acrylic acid hydroxyoctyl, (meth)acrylic acid hydroxydecyl, (meth)acrylic acid hydroxylauryl, and (4-hydroxymethyl cyclohexyl)methyl methacrylate; acrylic acid ester monomers having a heterocycle, halogen atom, silicon atom, or the like, such as (meth)acrylic acid tetrahydrofurfuryl, fluorine atom-containing (meth)acrylate, and silicone(meth)acrylate; olefin monomers, such as isoprene, butadiene, and isobutylene; vinyl ether monomers, such as methyl vinyl ether and ethyl vinyl ether; olefins or dienes, such as ethylene, butadiene, isoprene, and isobutylene; vinyl ethers, such as vinyl alkyl ether; vinyl chloride; and others, such as macro-monomers having a radically polymerizable vinyl group at the monomer end to which a vinyl group has been polymerized, etc. These monomers can be copolymerized, alone or in combination thereof, with the (meth)acrylic acid esters.

In the acrylic pressure-sensitive adhesive composition according to the present embodiment, examples of the (meth)acrylic polymer (B) include, for example, copolymer of cyclohexyl methacrylate (CHMA) and isobutyl methacrylate (IBMA), that of cyclohexylmethacrylate (CHMA) and isobornyl methacrylate (IBXMA), that of cyclohexyl methacrylate (CHMA) and acryloyl morpholine (ACMO), that of cyclohexyl methacrylate (CHMA) and diethylacrylamide (DEAA), that of 1-adamantyl acrylate (ADA) and methyl methacrylate (MMA), that of dicyclopentanyl methacrylate (DCPMA) and isobornyl methacrylate (IBXMA), homopolymer of dicyclopentanyl methacrylate (DCPMA), that of cyclohexyl methacrylate (CHMA), that of isobornylmethacrylate (IBXMA), that of isobornyl acrylate (IBXA), that of dicyclopentanyl acrylate (DCPA), that of 1-adamantyl methacrylate (ADMA), and that of 1-adamantyl acrylate (ADA), etc.

It is preferable that the (meth)acrylic polymer (B) contains, as a monomer unit, an acrylic monomer having a relatively bulky structure, represented by: (meth)acrylate whose alkyl group has a branched structure, such as t-butyl(meth)acrylate; ester of (meth)acrylic acid with alicyclic alcohol, such as cyclohexyl(meth)acrylate and (meth)acrylic acid isobornyl; and (meth)acrylate having a cyclic structure, such as (meth)acrylic acid aryl ester including (meth)acrylic acid phenyl and (meth)acrylic acid benzyl. By making the (meth)acrylic polymer (B) have such a bulky structure, the adhesiveness of the acrylic pressure-sensitive adhesive composition (acrylic pressure-sensitive adhesive tape) can be further improved. A monomer having a cyclic structure has a large effect in terms of bulkiness, and a monomer containing multiple rings has a larger effect. In addition, when UV polymerization is adopted in synthesizing the (meth)acrylic polymer (B) or in producing the pressure-sensitive adhesive composition, it is preferable to use a monomer having a saturated bond, in terms that polymerization inhibition is hardly caused. In that case, (meth)acrylate whose alkyl group has a branched structure, or an ester thereof with an alicyclic alcohol can be preferably used as a monomer that forms the (meth)acrylic polymer (B).

The (meth)acrylic polymer (B) may further contain, as a monomer unit, a (meth)acrylic monomer having, for example, an alicyclic structure containing three or more rings. By making the (meth)acrylic polymer (B) have a bulkier structure, such as an alicyclic structure containing three or more rings, the adhesiveness of the acrylic pressure-sensitive adhesive composition (acrylic pressure-sensitive adhesive tape) can be more improved. In particular, the adhesiveness to an adherend having low polarity made of polypropylene, or the like, can be remarkably improved. The (meth)acrylic polymer (B) may be a homopolymer of the (meth)acrylic monomer having an alicyclic structure containing three or more rings, or a copolymer of the (meth)acrylic monomer having an alicyclic structure containing three or more rings with the aforementioned (meth)acrylic acid ester monomer or copolymerizable monomer.

The (meth)acrylic monomer is a (meth)acrylic acid ester represented by, for example, the following general formula (2):

$$CH_2=C(R^1)COOR^2 \qquad (2)$$

[wherein, $R^1$ represents a hydrogen atom or a methyl group and $R^2$ an alicyclic hydrocarbon group having an alicyclic structure containing three or more rings.]

It is preferable that the alicyclic hydrocarbon group has a three-dimensional structure, such as a bridged ring structure. By making the (meth)acrylic polymer (B) have an alicyclic structure containing three or more rings and have a bridged ring structure, as stated above, the adhesiveness of the acrylic pressure-sensitive adhesive composition (acrylic pressure-sensitive adhesive tape) can be more improved. In particular, the adhesiveness to an adherend having low polarity made of polyethylene, polypropylene, or the like, can be improved more remarkably. Examples of the alicyclic hydrocarbon group having a bridged ring structure include, for example: a dicyclopentanyl group represented by the following formula (3a); a dicyclopentenyl group represented by the following formula (3b); an adamantyl group represented by the following formula (3c); a tricyclopentanyl group represented by the following formula (3d); and a tricyclopentenyl group represented by the following formula (3e), etc. When UV polymerization is adopted in synthesizing the (meth)acrylic polymer (B) or in producing the pressure-sensitive adhesive composition, in particular, a (meth)acrylic monomer having a saturated structure, such as a dicyclopentanyl group represented by the following formula (3a), an adamantyl group represented by the following formula (3c), a tricyclopentanyl group represented by the following formula (3d), or the like, can be preferably used, among the (meth)acrylic monomers having an alicyclic structure containing three or more rings and having a bridged ring structure, as a monomer that forms the (meth)acrylic polymer (B), in terms that polymerization inhibition is hardly caused.

[Formula 3]

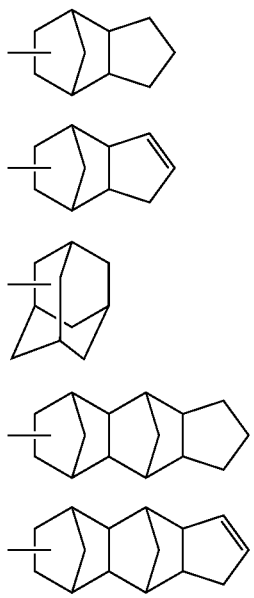

(3a)
(3b)
(3c)
(3d)
(3e)

Examples of such a (meth)acrylic monomer having an alicyclic structure containing three or more rings and having a bridged ring structure include (meth)acrylic acid esters, such as dicyclopentanyl methacrylate, dicyclopentanyl acrylate, dicyclopentanyl oxyethyl methacrylate, dicyclopentanyl oxyethyl acrylate, tricyclopentanyl methacrylate, tricyclopentanyl acrylate, 1-adamantyl methacrylate, 1-adamantyl acrylate, 2-methyl-2-adamantyl methacrylate, 2-methyl-2-adamantyl acrylate, 2-ethyl-2-adamantyl methacrylate, and 2-ethyl-2-adamantyl acrylate. This (meth)acrylic monomer can be used alone or in combination of two or more thereof.

A functional group reactive with an epoxy group or an isocyanate group may be further introduced into the (meth)acrylic polymer (B). Examples of such a functional group include a hydroxyl group, carboxyl group, amino group, amide group, and a mercapto group. When the (meth)acrylic polymer (B) is produced, it is preferable to use a monomer having such a functional group.

The weight average molecular weight (Mw) of the (meth)acrylic polymer (B) is $1000 \leq Mw < 30000$, preferably $1500 \leq Mw < 20000$, and more preferably $2000 \leq Mw < 10000$. If $30000 \leq Mw$, there are sometimes the cases where the effect of improving the pressure-sensitive adhesive force of a pressure-sensitive adhesive tape cannot be sufficiently obtained. Conversely, if $Mw < 1000$, there are sometimes the cases where, because the molecular weight is too small, the pressure-sensitive adhesive force or holding property of a pressure-sensitive adhesive tape is decreased.

The weight average molecular weight of the acrylic polymer (A) or the (meth)acrylic polymer (B) can be determined by a GPC method in terms of polystyrene. Specifically, the weight average molecular weight can be measured by using HPLC8020 and two TSKgel GMH-Hs (20) as columns, which are made by Tosoh Corporation, and under conditions in which a tetrahydrofuran solvent is used and a flow rate is approximately 0.5 ml/min.

As stated above, the content of the (meth)acrylic polymer (B) is within a range of 1 to 70 parts by mass based on 100 parts by mass of the acrylic polymer (A); however, the content is preferably within a range of 2 to 50 parts by mass, and more preferably within a range of 3 to 40 parts by mass. If the (meth)acrylic polymer (B) is added in an amount more than 70 parts by mass, the elastic modulus of a pressure-sensitive adhesive layer formed of the acrylic pressure-sensitive adhesive composition according to the present embodiment becomes large, and hence there are sometimes the cases where the adhesiveness at a low-temperature is deteriorated or the pressure-sensitive adhesive force is not exerted even at room temperature. Conversely, if the addition amount thereof is less than 1 part by mass, there are sometimes the cases where the effect of adding the (meth)acrylic polymer (B) cannot be obtained.

The glass transition temperature (Tg) of the (meth)acrylic polymer (B) is $0°C. \leq Tg \leq 300°C.$, preferably $20°C. \leq Tg \leq 300°C.$, and more preferably $40°C. \leq Tg \leq 300°C.$ If $Tg < 20°C.$, there are sometimes the cases where: the cohesive force of a pressure-sensitive adhesive layer is decreased at room temperature or higher; and accordingly the holding property and the adhesiveness at high-temperature are decreased. The glass transition temperatures of typical materials that can be used as the (meth)acrylic polymer (B) in the present embodiment are shown in Table 1. The glass transition temperatures shown there are nominal values described in documents or catalogs, etc., or values calculated based on the following Equation (4) (Fox Equation).

$$1/Tg = W1/Tg1 + W2/Tg2 + \cdots + Wn/Tgn \quad (4)$$

[wherein, Tg represents the glass transition temperature of the (meth)acrylic polymer (B) (unit: K), $Tg_i$ ($i=1, 2, \cdots, n$) represents the glass transition temperature of a homopolymer that is formed of a monomer i (unit: K), and $W_i$ ($i=1, 2, \cdots, n$) represents the mass fraction of the monomer i in the whole monomer components]. The above Equation (4) is adopted when the (meth)acrylic polymer (B) is formed of n types of monomer components of monomer 1, monomer 2, $\cdots$, monomer n.

TABLE 1

| COMPOSITION OF (METH)ACRYLIC POLYMER (B) | Tg (°C.) | REMARKS |
| --- | --- | --- |
| DCPMA | 175 | VALUES DESCRIBED IN DOCUMENTS, ETC. |
| DCPA | 120 | VALUES DESCRIBED IN DOCUMENTS, ETC. |
| IBXMA | 173 | VALUES DESCRIBED IN DOCUMENTS, ETC. |
| IBXA | 97 | VALUES DESCRIBED IN DOCUMENTS, ETC. |
| CHMA | 66 | VALUES DESCRIBED IN DOCUMENTS, ETC. |
| CHA | 15 | VALUES DESCRIBED IN DOCUMENTS, ETC. |
| IBMA | 48 | VALUES DESCRIBED IN DOCUMENTS, ETC. |
| MMA | 105 | VALUES DESCRIBED IN DOCUMENTS, ETC. |
| ADMA | 250 | VALUES DESCRIBED IN DOCUMENTS, ETC. |
| ADA | 153 | VALUES DESCRIBED IN DOCUMENTS, ETC. |
| CHMA/IBMA = 60/40 | 59 | CALCULATED VALUES (BASED ON Fox EQUATION) |

The abbreviations in Table 1 represent the following compounds.
DCPMA: Dicyclopentanyl Methacrylate
DCPA: Dicyclopentanyl Acrylate
IBXMA: Isobornyl Methacrylate IBXA: Isobornyl Acrylate
CHMA: Cyclohexyl Methacrylate
CHA: Cyclohexyl Acrylate
IBMA: Isobutyl Methacrylate
MMA: Methyl Methacrylate
ADMA: 1-Adamantyl Methacrylate
ADA: 1-Adamantyl Acrylate The aforementioned preferred aspects of the (meth)acrylic polymer (B) can be summarized as follows.

[1] The glass transition temperature (Tg) of the (meth)acrylic polymer (B) is 0° C.≤Tg≤300° C.

[2] The (meth)acrylic polymer (B) contains, as a monomer unit, a (meth)acrylic monomer having an alicyclic structure in its side chain, such as (meth)acrylic acid cyclohexyl, (meth)acrylic acid isobornyl, and (meth)acrylic acid dicyclopentanyl

[3] An alicyclic hydrocarbon group in the (meth)acrylic monomer having an alicyclic structure has a bridged ring structure.

<Method of Producing (Meth)Acrylic Polymer (B)>

The (meth)acrylic polymer (B) can be produced, for example, by subjecting the (meth)acrylic monomer having the aforementioned structure to polymerization with the use of a solution polymerization method, bulk polymerization method, emulsion polymerization method, suspension polymerization, and block polymerization, etc.

<Method of Adjusting Molecular Weight of (Meth)Acrylic Polymer (B)>

In order to adjust the molecular weight of the (meth)acrylic polymer (B), a chain transfer agent can be used while the polymer (B) is being polymerized. Examples of the chain transfer agent to be used include: compounds having a mercapt group, such as octylmercaptan, dodecyl mercaptan, t-dodecyl mercaptan, and mercaptoethanol; thioglycolic acid, ethyl thioglycolate, propyl thioglycolate, butyl thioglycolate, t-butyl thioglycolate, 2-ethylhexyl thioglycolate, octyl thioglycolate, decyl thioglycolate, dodecyl thioglycolate, thioglycolic acid ester of ethylene glycol, thioglycolic acid ester of neopentyl glycol, and thioglycolic acid ester of pentaerythritol.

The use amount of the chain transfer agent is not particularly limited, but the chain transfer agent is usually contained in an amount within a range of 0.1 to 20 parts by mass, preferably within a range of 0.2 to 15 parts by mass, and more preferably within a range of 0.3 to 10 parts by mass, based on 100 parts by mass of the (meth)acrylic monomer. By adjusting the addition amount of the chain transfer agent, as stated above, a (meth)acrylic polymer (B) having a preferred molecular weight can be obtained. The chain transfer agent can be used alone or in combination of two or more thereof.

[Hydrogenated Tackifying Resin (C)]

Specifically, the hydrogenated tackifying resin (C) can be selected from derivatives obtained by hydrogenating tackifying resins, such as a petroleum resin, terpene resin, coumarone-indene resin, styrene resin, rosin resin, alkylphenol resin, and xylene resin. For example, a hydrogenated petroleum resin can be selected from the group of aromatic systems, dicyclopentadiene systems, aliphatic systems, and aromatic-dicyclopentadiene copolymer systems, etc. In addition, a hydrogenated terpene resin can be selected from the group of a terpene phenol resin and an aromatic terpene resin, etc. Among them, in particular, a petroleum resin or a terpene resin is preferably used.

The softening point of the hydrogenated tackifying resin (C) is preferably within a range of 80 to 200° C., and more preferably within a range of 100 to 200° C. When the softening point thereof is within the range, large cohesive force can be obtained.

As stated above, the content of the hydrogenated tackifying resin (C) is within a range of 1 to 50 parts by mass, based on 100 parts by mass of the acrylic polymer (A); however, the content thereof is preferably within a range of 2 to 40 parts by mass, and more preferably within a range of 3 to 30 parts by mass. If the addition amount of the hydrogenated tackifying resin (C) is more than 50 parts by mass, there are sometimes the cases where the cohesive force is decreased. Conversely, if the addition amount thereof is less than 1 part by mass, there are sometimes the cases where the effect of improving the adhesive force cannot be obtained.

The blending ratio of the (meth)acrylic polymer (B) to the hydrogenated tackifying resin (C) is within a range of 1:0.12 to 1.7, preferably within a range of 1:0.15 to 1.6, and more preferably within a range of 1:0.2 to 1.55 (all are mass ratios). When the blending ratio of the two materials is within the range, the adhesion reliability is preferably improved. This can be assumed that, because the (meth)acrylic polymer (B) serves as a compatibilizing agent for the hydrogenated tackifying resin, the two materials are uniformly dispersed, thereby allowing the adhesion reliability to be improved.

The acrylic pressure-sensitive adhesive composition according to the present embodiment can contain, as essential components, the aforementioned acrylic polymer (A), (meth)acrylic polymer (B), and hydrogenated tackifying resin (C), and can contain, as optional components, various additives that are generally used in the field of pressure-sensitive adhesive compositions. Such optional components are exemplified by a plasticizer, softener, filler, colorant (pigment, dye, or the like), antioxidant, leveling agent, stabilizer, and antiseptic, etc. Such additives that are conventionally and publicly known can be used by ordinary methods.

In the acrylic pressure-sensitive adhesive layer containing: the acrylic polymer (A) as a pressure-sensitive adhesive composition; the (meth)acrylic polymer (B) having a weight average molecular weight (Mw) of 1000≤Mw<30000 as a tackifying resin; and the hydrogenated tackifying resin (C), the ratio of the solvent-insoluble component is within a range of 40 to 90% by mass, and preferably within a range of 45 to 85% by mass. If the ratio of the solvent-insoluble component is less than 40% by mass, the cohesive force becomes insufficient, and accordingly there are sometimes the cases where the holding property cannot be met. Conversely, if the ratio thereof is more than 90% by mass, the cohesive force becomes too large, and accordingly there are sometimes the cases where the pressure-sensitive adhesive force or resistance to resilience is decreased. A method of evaluating the ratio of the solvent-insoluble component will be described later.

Subsequently, the structure of an acrylic pressure-sensitive adhesive tape (or acrylic pressure-sensitive adhesive sheet) having a pressure-sensitive adhesive layer containing an acrylic pressure-sensitive adhesive composition with the aforementioned composition, will be described.

The acrylic pressure-sensitive adhesive tape according to the present embodiment comprises a pressure-sensitive adhesive layer containing an acrylic pressure-sensitive adhesive composition. The acrylic pressure-sensitive adhesive tape may be a so-called pressure-sensitive adhesive tape comprising a substrate, in which such a pressure-sensitive adhesive layer is provided on one or both surfaces of a sheet-shaped substrate (supporting body) in a fixed manner, i.e., without an intention of separating the pressure-sensitive adhesive layer from the substrate; or may be a so-called substrate-less pressure-sensitive adhesive tape in which the pressure-sensitive adhesive layer is provided on a substrate having a release property, such as a release liner (release paper, resin sheet whose surface has been subjected to a release treatment, or the like), so that the substrate for supporting the pressure-sensitive adhesive layer is removed when the tape is attached. The concept of the pressure-sensitive adhesive tape described herein can involve objects referred to as a pressure-sensitive adhesive sheet, pressure-sensitive adhesive label, and pressure-sensitive adhesive film, etc. The pressure-sensitive adhesive layer should not be limited to one continuously formed, but may be one formed into a regular pattern, such as, for example, a dot shape and a stripe shape, or formed into a random pattern.

The aforementioned substrate can be formed of a material appropriately selected, in accordance with the application of the pressure-sensitive adhesive tape, from the group consisting of, for example: plastic films, such as a polypropylene film, ethylene-propylene copolymer film, polyester film, and polyvinylchloride film; foam substrates, such as a polyurethane foam and polyethylene foam; paper, such as craft paper, crepe paper, and Japanese paper; cloth, such as cotton cloth and staple fiber cloth; nonwoven cloth, such as polyester nonwoven fabric and vinylon nonwoven fabric; metallic foils, such as aluminum foil and copper foil; and the like. As the aforementioned plastic films, both of a non-oriented film and an oriented (uniaxially oriented or biaxially oriented) film can be used. The surface of the substrate on which the pressure-sensitive adhesive layer is to be provided may be coated with a primer or be subjected to a surface treatment, such as a corona discharge treatment. The thickness of the substrate can be appropriately selected in accordance with the purpose, but is generally within a range of approximately 10 μm to approximately 500 μm (typically within a range of 10 μm to 200 μm).

The pressure-sensitive adhesive layer can be a layer in which the acrylic pressure-sensitive adhesive composition has been cured. That is, the pressure-sensitive adhesive layer can be formed by providing the acrylic pressure-sensitive adhesive composition to an appropriate substrate (e.g., coating) and then by appropriately subjecting the composition to a curing treatment. When two or more types of curing treatments (drying, cross-link formation, polymerization, etc.) are performed, these treatments can be performed simultaneously or in multiple stages. In the case of the pressure-sensitive adhesive composition in which a partial polymer (acrylic polymer syrup) has been used, a final copolymerization reaction is typically performed as the curing treatment (the partial polymer is subjected to a further copolymerization reaction to form a complete polymer). For example, in the case of a photo-curing pressure-sensitive adhesive composition, light radiation is performed. A curing treatment, such as cross-link formation, drying, or the like, may be performed, if necessary. For example, when a photo-curing pressure-sensitive adhesive composition needs to be dried, light radiation may be performed after the drying of the composition. In the case of the pressure-sensitive adhesive composition in which a complete polymer has been used, a treatment, such as drying (drying by heating), cross-link formation, or the like, is typically performed as the curing treatment, if necessary.

Coating of the acrylic pressure-sensitive adhesive composition can be performed by using a commonly-used coater, such as, for example, a gravure roll coater, reverse roll coater, kiss roll coater, dip roll coater, bar coater, knife coater, spray coater, or the like. In the case of the pressure-sensitive adhesive tape comprising a substrate, a pressure-sensitive adhesive layer may be formed by directly providing a pressure-sensitive adhesive composition to the substrate, or a pressure-sensitive adhesive layer formed on a release liner may be transferred to the substrate.

The thickness of the pressure-sensitive adhesive layer is not particularly limited, but is usually, for example, 10 μm or more, preferably 20 μm or more, and more preferably 30 μm or more. Thereby, sufficient adhesiveness can be achieved. It is proper to set the thickness of the pressure-sensitive adhesive layer to be, for example, within a range of approximately 10 to approximately 250 μm.

The acrylic pressure-sensitive adhesive tape according to the present embodiment can be preferably used in the application in which members made of both various resins including, for example, PE (polyethylene), PP (polypropylene), ABS (acrylonitrile-butadiene-styrene copolymer), SBS (styrene-butadiene-styrene block copolymer), PC (polycarbonate), PVC (vinyl chloride), and an acrylic resin, such as PMMA (polymethyl methacrylate resin), and metals, such as SUS and aluminum, are joined (fixed) to the surfaces of automobiles (coatings of the bodies), house and building materials, and home electronic appliances, etc.

The acrylic pressure-sensitive adhesive tape according to the present embodiment can be preferably used in the application in which various optical members are attached to, for example, liquid crystal cells, optical polyester films, and touch panel members, etc. Accordingly, the technique described herein includes a laminated body in which a pressure-sensitive adhesive layer containing the acrylic pressure-sensitive adhesive composition is provided on an optical member. This laminated body typically has an aspect in which the pressure-sensitive adhesive layer on the optical member is protected by a release liner. The optical member on which such a pressure-sensitive adhesive layer is provided can be easily attached to the surface, etc., of a plastic cover lens panel, glass, or liquid crystal cell. The optical member is not particularly limited, but can be a polarizing film, phase difference film, transparent conductive film (ITO film), etc. Such an optical member may have a single-layer structure made of the same material, or may have a multiple-layer structure made of a plurality of materials. As a method of forming the pressure-sensitive adhesive layer on the optical member, a method of directly providing the pressure-sensitive adhesive layer thereto or a method of transferring the pressure-sensitive adhesive layer thereto can be appropriately adopted, in the same way as in the case where the pressure-sensitive adhesive layer is formed on a substrate. Typically, the pressure-sensitive adhesive layer formed on a release liner is transferred to the base surface of the optical member.

As stated above, the acrylic pressure-sensitive adhesive composition according to the present embodiment contains: the acrylic polymer (A) as a pressure-sensitive adhesive composition; and as tackifying resins, the (meth)acrylic polymer (B) as well as the hydrogenated tackifying resin (C). Thereby, when a pressure-sensitive adhesive layer is formed by using the acrylic pressure-sensitive adhesive composition, the adhesiveness of the acrylic pressure-sensitive adhesive tape to an adherend having low polarity can be improved; which finally leads to the fact that the adhesion reliability of the acrylic pressure-sensitive adhesive tape to various adherends each having surface polarity different from the others, including an adherend having low polarity, can be improved, thereby allowing the acrylic pressure-sensitive adhesive tape to be used for various joint applications in the fields of automobiles and home electric appliances, etc.

As the reason for the improvement in the adhesiveness of the acrylic pressure-sensitive adhesive tape to an adherend having low polarity, it can be assumed that the (meth)acrylic polymer (B) is compatibilized with the hydrogenated tackifying resin (C) and also with the acrylic polymer (A). That is, it can be assumed that, as a result of the fact that the (meth)acrylic polymer (B) has served as a compatibilizing agent for the hydrogenated tackifying resin (C) such that both of the two have been uniformly dispersed, the adhesion reliability has been improved.

It can be assumed that, when the (meth)acrylic polymer (B) has an alicyclic structure, the compatibility with the hydrogenated tackifying resin (C) is particularly enhanced due to the alicyclic structure, while the main chain of the (meth)acrylic polymer (B) is compatibilized with the acrylic polymer.

The acrylic pressure-sensitive adhesive composition according to the present embodiment can be designed so as not to contain an acidic group in the monomer that forms the acrylic polymer (A). In this case, an acrylic pressure-sensitive adhesive tape can be obtained, in which an influence of metallic corrosion that is caused by an acidic group, etc., has been reduced. Even when the monomer that forms the acrylic polymer (A) contains an acidic group, the adhesiveness of the acrylic pressure-sensitive adhesive tape can be similarly improved.

EXAMPLE 1

Hereinafter, the present embodiment will be described in detail based on Examples, but the present invention should not be limited at all by these Examples.

Components of the acrylic pressure-sensitive adhesive compositions according to Examples 1-1 to 1-11 and Comparative Examples 1-1 to 1-8 are shown in Table 2.

TABLE 2

| | COMPOSITION OF 100 PARTS OF ACRYLIC POLYMER (A) COMPOSITION | COMPOSITION OF (METH) ACRYLIC POLYMER (B) | | | |
|---|---|---|---|---|---|
| | | COMPOSITION | MOLECULAR WEIGHT | Tg (° C.) | PARTS |
| EXAMPLE 1-1 | 2EHA/NVP = 86/14 | CHMA/IBMA = 60/40 | 4,000 | 59 | 8 |
| EXAMPLE 1-2 | 2EHA/NVP = 86/14 | CHMA/IBMA = 60/40 | 4,000 | 59 | 15 |
| EXAMPLE 1-3 | 2EHA/NVP = 86/14 | CHMA/IBMA = 60/40 | 4,000 | 59 | 20 |
| EXAMPLE 1-4 | 2EHA/NVP = 86/14 | CHMA/IBMA = 60/40 | 4,000 | 59 | 12 |
| EXAMPLE 1-5 | 2EHA/NVP = 86/14 | CHMA/IBMA = 60/40 | 4,000 | 59 | 12 |
| EXAMPLE 1-6 | 2EHA/NVP/HEAA = 86/13/1 | CHMA/IBMA = 60/40 | 4,000 | 59 | 12 |
| EXAMPLE 1-7 | 2EHA/NVP/HEAA = 86/13/1 | CHMA/IBMA = 60/40 | 4,000 | 59 | 12 |
| EXAMPLE 1-8 | 2EHA/NVP = 86/14 | DCPMA | 4,600 | 175 | 12 |
| EXAMPLE 1-9 | 2EHA/AA = 94/6 | CHMA/IBMA = 60/40 | 4,000 | 59 | 12 |
| EXAMPLE 1-10 | 2EHA/AA = 94/6 | DCPMA (LOW) | 3,000 | 175 | 12 |
| EXAMPLE 1-11 | 2EHA/AA = 94/6 | CHMA/IBMA = 60/40 | 4,000 | 59 | 12 |
| COMPARATIVE EXAMPLE 1-1 | 2EHA/NVP = 86/14 | — | — | — | — |
| COMPARATIVE EXAMPLE 1-2 | 2EHA/AA = 94/6 | — | — | — | — |
| COMPARATIVE EXAMPLE 1-3 | 2EHA/NVP = 86/14 | CHMA/IBMA = 60/40 | 4,000 | 59 | 20 |
| COMPARATIVE EXAMPLE 1-4 | 2EHA/AA = 94/6 | CHMA/IBMA = 60/40 | 4,000 | 59 | 20 |
| COMPARATIVE EXAMPLE 1-5 | 2EHA/NVP = 86/14 | — | — | — | — |
| COMPARATIVE EXAMPLE 1-6 | 2EHA/NVP = 86/14 | — | — | — | — |
| COMPARATIVE EXAMPLE 1-7 | 2EHA/AA = 94/6 | — | — | — | — |
| COMPARATIVE EXAMPLE 1-8 | 2EHA/NVP = 86/14 | CHMA/IBMA = 60/40 | 4,000 | 59 | 12 |

| | HYDROGENATED TACKIFYING RESIN (C) | | | PARTS OF CROSS-LINKING AGENT (TMPTA) | RATIO OF SOLVENT-INSOLUBLE COMPONENT [% BY MASS] |
|---|---|---|---|---|---|
| | TYPE | SOFTENING POINT (° C.) | PARTS | | |
| EXAMPLE 1-1 | ALCON P125 | 125 | 12 | 0.12 | 69.8 |
| EXAMPLE 1-2 | ALCON P125 | 125 | 15 | 0.18 | 67.7 |
| EXAMPLE 1-3 | ALCON P125 | 125 | 5 | 0.2 | 71.3 |
| EXAMPLE 1-4 | ALCON P125 | 125 | 8 | 0.15 | 71.9 |
| EXAMPLE 1-5 | ALCON P100 | 100 | 8 | 0.15 | 71.1 |
| EXAMPLE 1-6 | CLEARON P135 | 135 | 8 | 0.15 | 61.1 |
| EXAMPLE 1-7 | I-MARV P125 | 125 | 8 | 0.12 | 75.0 |
| EXAMPLE 1-8 | ALCON P125 | 125 | 8 | 0.1 | 63.4 |
| EXAMPLE 1-9 | I-MARV P125 | 125 | 8 | 0.11 | 62.5 |
| EXAMPLE 1-10 | ALCON P125 | 125 | 8 | 0.14 | 65.7 |
| EXAMPLE 1-11 | ALCON P125 | 125 | 8 | 0.12 | 61.3 |
| COMPARATIVE EXAMPLE 1-1 | — | — | — | (HDDA) 0.045 | 77.4 |
| COMPARATIVE EXAMPLE 1-2 | — | — | — | (HDDA) 0.07 | 75.2 |

TABLE 2-continued

| | | | | | |
|---|---|---|---|---|---|
| COMPARATIVE EXAMPLE 1-3 | — | — | — | 0.12 | 73.4 |
| COMPARATIVE EXAMPLE 1-4 | — | — | — | 0.14 | 67.3 |
| COMPARATIVE EXAMPLE 1-5 | ALCON P125 | 125 | 8 | 0.08 | 75.0 |
| COMPARATIVE EXAMPLE 1-6 | ALCON P125 | 125 | 20 | 0.12 | 71.7 |
| COMPARATIVE EXAMPLE 1-7 | ALCON P125 | 125 | 20 | 0.15 | 67.3 |
| COMPARATIVE EXAMPLE 1-8 | (NON-HYDROGENATED TYPE) MIGHTY ACE K-125 | 125 | 8 | 0.25 | 74.7 |

The abbreviations in Table 2 represent the following compounds.
 2EHA: 2-Ethylhexyl Acrylate
 NVP: N-Vinyl-2-Pyrrolidone
 HEAA: N-Hydroxyethyl Acrylamide
 AA: Acrylic Acid
 DCPMA: Dicyclopentanyl Methacrylate
 DCPMA (Low): Dicyclopentanyl Methacrylate having a lower degree of polymerization than that of DCPMA (Example 1-8)
 CHMA: Cyclohexyl Methacrylate
 IBMA: Isobutyl Methacrylate
 TMPTA: Trimethylolpropane Triacrylate
 HDDA: 1,6-Hexanediol Diacrylate
(Measurement of Ratio of Solvent-Insoluble Component)

A ratio of a solvent-insoluble component was determined in the following way: after 0.1 g of a pressure-sensitive adhesive composition was sampled and precisely weighed (mass before dipping), the sampled composition was dipped in 50 ml of ethyl acetate at room temperature (20 to 25° C.) for 1 week; a solvent (ethyl acetate) insoluble component was taken out to be dried at 130° C. for 2 hours and then weighed (mass after dipping and drying); and the ratio was calculated by using an equation for calculating a "ratio of solvent-insoluble component (mass %)=[(mass after dipping and drying)/(mass before dipping)]×100".

(Preparation of Acrylic Polymer Syrup 1 (2EHA/NVP=86/14) as (A) Component)

Eighty six parts by mass of 2-ethylhexyl acrylate (2EHA), 14 parts by mass of N-vinyl-2-pyrrolidone (NVP), 0.05 parts by mass of a photo-polymerization initiator (product name: IRGACURE 184, made by BASF), and 0.05 parts by mass of a photo-polymerization initiator (product name: IRGACURE 651, made by BASF) were placed into a 4-neck flask. A partial polymer (acrylic polymer syrup 1) having a rate of polymerization of approximately 11% by mass was obtained by exposing the mixture to UV rays under a nitrogen atmosphere such that the mixture was partially photo-polymerized.

(Preparation of Acrylic Polymer Syrup 2 (2EHA/AA=94/6) as (A) Component)

Ninety four parts by mass of 2-ethylhexyl acrylate (2EHA), 6 parts by mass of acrylic acid (AA), 0.05 parts by mass of a photo-polymerization initiator (product name: IRGACURE 184, made by BASF), and 0.05 parts by mass of a photo-polymerization initiator (product name: IRGACURE 651, made by BASF) were placed into a 4-neck flask. A partial polymer (acrylic polymer syrup 2) having a rate of polymerization of approximately 8% by mass was obtained by exposing the mixture to UV rays under a nitrogen atmosphere such that the mixture was partially photo-polymerized.

(Preparation of Acrylic Polymer Syrup 3 (2EHA/NVP/HEAA=86/13/1) as (A) Component)

Eighty six parts by mass of 2-ethylhexyl acrylate (2EHA), 13 parts by mass of N-vinyl-2-pyrrolidone (NVP), 1 part by mass of N-hydroxyethyl acrylamide (HEAA), 0.05 parts by mass of a photo-polymerization initiator (product name: IRGACURE 184, made by BASF), and 0.05 parts by mass of a photo-polymerization initiator (product name: IRGACURE 651, made by BASF) were placed into a 4-neck flask. A partial polymer (acrylic polymer syrup 3) having a rate of polymerization of approximately 10% by mass was obtained by exposing the mixture to UV rays under a nitrogen atmosphere such that the mixture was partially photo-polymerized.

(Preparation of (Meth)Acrylic Polymer 1 (CHMA/IBMA=60/40) as (B) Component)

After cyclohexyl methacrylate (CHMA, 60 parts by mass), isobutyl methacrylate (IBMA, 40 parts by mass), and thioglycolic acid (4.0 parts by mass) were combined, dissolved oxygen was removed by blowing nitrogen gas thereinto. After the mixture was heated to 90° C., PERHEXYL O (made by NOF CORPORATION, 0.005 parts by mass) and PERHEXYL D (made by NOF CORPORATION, 0.01 parts by mass) were mixed. After being further stirred at 90° C. for 1 hour, the mixture was heated to 150° C. in 1 hour and stirred at the temperature for 1 hour. Subsequently, the mixture was heated to 170° C. in 1 hour and stirred at the temperature for 60 minutes.

The pressure under which the mixture was placed was reduced at 170° C. and the mixture was stirred for 1 hour to remove remaining monomers, thereby allowing (meth) acrylic polymer 1 to be obtained. The glass transition temperature of the obtained (meth)acrylic polymer 1 was 59° C. (calculated by Fox Equation) and the weight average molecular weight thereof was 4000.

(Preparation of (Meth)Acrylic Polymer 2 (DCPMA) as (B) Component)

One hundred parts by mass of toluene, 100 parts by mass of dicyclopentanyl methacrylate (DCPMA) (product name: FA-513M, made by Hitachi Chemical Co., Ltd.), and 3 parts by mass of thioglycolic acid (GSH acid), as a chain transfer agent, were placed into a 4-neck flask. After they were stirred under a nitrogen atmosphere at 70° C. for 1 hour, 0.2 parts by mass of azobisisobutyronitrile were placed therein as a thermal polymerization initiator to react with them at 70° C. for 2 hours, and subsequently they were reacted together at 80° C. for 2 hours. Thereafter, the reaction liquid was placed under a temperature atmosphere of 130° C. to dry and remove the toluene, chain transfer agent, and unreacted monomer, thereby allowing a solid (meth)acrylic polymer 2 to be obtained. The glass transition temperature of the obtained (meth)acrylic polymer 2 was 175° C. and the weight average molecular weight thereof was 4600.

(Preparation of (Meth)Acrylic Polymer 3 (DCPMA (Low)) as (B) Component)

One hundred parts by mass of toluene, 100 parts by mass of dicyclopentanyl methacrylate (DCPMA) (product name: FA-513M, made by Hitachi Chemical Co., Ltd.), and 5 parts by mass of thioglycolic acid (GSH acid), as a chain transfer agent, were placed into a 4-neck flask. After they were stirred under a nitrogen atmosphere at 75° C. for 1 hour, 0.2 parts by mass of azobisisobutyronitrile were placed therein as a thermal polymerization initiator to react with them at 75° C. for 2 hours, and subsequently they were reacted together at 80° C. for 2 hours. Thereafter, the reaction liquid was placed under a temperature atmosphere of 130° C. to dry and remove the toluene, chain transfer agent, and unreacted monomer, thereby allowing a solid (meth)acrylic polymer 3 to be obtained. The glass transition temperature of the obtained (meth)acrylic polymer 3 was 175° C. and the weight average molecular weight thereof was 3000.

EXAMPLE 1-1

Preparation of Acrylic Pressure-Sensitive Adhesive Composition

After 8 parts by mass of the aforementioned (meth)acrylic polymer 1, 12 parts by mass of Alcon P125 (hydrogenated petroleum resin, softening point: 125° C., made by ARAKAWA CHEMICAL INDUSTRIES, LTD.), and 0.12 parts by mass of trimethylolpropane triacrylate were added to 100 parts by mass of the aforementioned acrylic polymer syrup 1, these were uniformly mixed together to prepare an acrylic pressure-sensitive adhesive composition.

(Production of Pressure-Sensitive Adhesive Layer Sheet)

A coated layer having a final thickness of 50 μm was formed by coating the aforementioned acrylic pressure-sensitive adhesive composition on one surface of a polyester film having a thickness of 38 μm (product name: MRF, made by Mitsubishi Plastics Inc.), the one surface having been subjected to a release treatment with silicone. Subsequently, the surface of the coated acrylic pressure-sensitive adhesive composition was covered with one surface of a polyester film having a thickness of 38 μm (product name: MRN, made by Mitsubishi Plastics Inc.), the one surface having been subjected to a release treatment with silicone, so that the one surface of the film was located near to the coated layer. Thereby, oxygen was blocked from the coated layer of the acrylic pressure-sensitive adhesive composition (pressure-sensitive adhesive layer). The pressure-sensitive adhesive layer sheet thus obtained was irradiated, for 360 seconds, with UV rays with an illumination intensity of 5 mW/cm$^2$ (measured by TOPCON UVR-T1 having a maximum sensitivity at approximately 350 nm), the UV rays being created by using a black light lamp (made by TOSHIBA CORPORATION). The ratio of the solvent-insoluble component of the pressure-sensitive adhesive layer made of the acrylic pressure-sensitive adhesive composition thus obtained was 69.8% by mass. The polyester film covering each of the surfaces of the pressure-sensitive adhesive layer functions as a release liner.

EXAMPLE 1-2

An acrylic pressure-sensitive adhesive composition and a pressure-sensitive adhesive layer sheet were obtained in the same way as in Example 1-1, except that 15 parts by mass of the aforementioned (meth)acrylic polymer 1, 15 parts by mass of Alcon P125 (hydrogenated petroleum resin, softening point: 125° C., made by ARAKAWA CHEMICAL INDUSTRIES, LTD.), and 0.18 parts by mass of trimethylolpropane triacrylate were added to 100 parts by mass of the aforementioned acrylic polymer syrup 1. The ratio of the solvent-insoluble component of the obtained pressure-sensitive adhesive layer was 67.7% by mass.

EXAMPLE 1-3

An acrylic pressure-sensitive adhesive composition and a pressure-sensitive adhesive layer sheet were obtained in the same way as in Example 1-1, except that 20 parts by mass of the aforementioned (meth)acrylic polymer 1, 5 parts by mass of Alcon P125 (hydrogenated petroleum resin, softening point: 125° C., made by ARAKAWA CHEMICAL INDUSTRIES, LTD.), and 0.2 parts by mass of trimethylolpropane triacrylate were added to 100 parts by mass of the aforementioned acrylic polymer syrup 1. The ratio of the solvent-insoluble component of the obtained pressure-sensitive adhesive layer was 71.3% by mass.

EXAMPLE 1-4

An acrylic pressure-sensitive adhesive composition and a pressure-sensitive adhesive layer sheet were obtained in the same way as in Example 1-1, except that 12 parts by mass of the aforementioned (meth)acrylic polymer 1, 8 parts by mass of Alcon P125 (hydrogenated petroleum resin, softening point: 125° C., made by ARAKAWA CHEMICAL INDUSTRIES, LTD.), and 0.15 parts by mass of trimethylolpropane triacrylate were added to 100 parts by mass of the aforementioned acrylic polymer syrup 1. The ratio of the solvent-insoluble component of the obtained pressure-sensitive adhesive layer was 71.9% by mass.

EXAMPLE 1-5

An acrylic pressure-sensitive adhesive composition and a pressure-sensitive adhesive layer sheet were obtained in the same way as in Example 1-1, except that 12 parts by mass of the aforementioned (meth)acrylic polymer 1, 8 parts by mass of Alcon P100 (hydrogenated petroleum resin, softening point: 100° C., made by ARAKAWA CHEMICAL INDUSTRIES, LTD.), and 0.15 parts by mass of trimethylolpropane triacrylate were added to 100 parts by mass of the aforementioned acrylic polymer syrup 1. The ratio of the solvent-insoluble component of the obtained pressure-sensitive adhesive layer was 71.1% by mass.

EXAMPLE 1-6

An acrylic pressure-sensitive adhesive composition and a pressure-sensitive adhesive layer sheet were obtained in the same way as in Example 1-1, except that 12 parts by mass of the aforementioned (meth)acrylic polymer 1, 8 parts by mass of Clearon P135 (hydrogenated terpene resin, softening point: 135° C., made by YASUHARA CHEMICAL CO., LTD.), and 0.15 parts by mass of trimethylolpropane triacrylate were added to 100 parts by mass of the aforementioned acrylic polymer syrup 3. The ratio of the solvent-insoluble component of the obtained pressure-sensitive adhesive layer was 61.1% by mass.

EXAMPLE 1-7

An acrylic pressure-sensitive adhesive composition and a pressure-sensitive adhesive layer sheet were obtained in the same way as in Example 1-1, except that 12 parts by mass of the aforementioned (meth)acrylic polymer 1, 8 parts by mass of I-MARV P125 (hydrogenated petroleum resin (dicyclopentadiene aromatic copolymer), softening point: 125° C., made by Idemitsu Kosan Co., Ltd.), and 0.12 parts by mass of trimethylolpropane triacrylate were added to 100 parts by mass of the aforementioned acrylic polymer syrup 3. The ratio of the solvent-insoluble component of the obtained pressure-sensitive adhesive layer was 75.0% by mass.

EXAMPLE 1-8

An acrylic pressure-sensitive adhesive composition and a pressure-sensitive adhesive layer sheet were obtained in the same way as in Example 1-1, except that 12 parts by mass of the aforementioned (meth)acrylic polymer 2, 8 parts by mass of Alcon P125 (hydrogenated petroleum resin, softening point: 125° C., made by ARAKAWA CHEMICAL INDUSTRIES, LTD.), and 0.1 parts by mass of trimethylolpropane triacrylate were added to 100 parts by mass of the aforementioned acrylic polymer syrup 1. The ratio of the solvent-insoluble component of the obtained pressure-sensitive adhesive layer was 63.4% by mass.

EXAMPLE 1-9

An acrylic pressure-sensitive adhesive composition and a pressure-sensitive adhesive layer sheet were obtained in the same way as in Example 1-1, except that 12 parts by mass of the aforementioned (meth)acrylic polymer 1, 8 parts by mass of I-MARV P125 (hydrogenated petroleum resin (dicyclopentadiene aromatic copolymer), softening point: 125° C., made by Idemitsu Kosan Co., Ltd.), and 0.11 parts by mass of trimethylolpropane triacrylate were added to 100 parts by mass of the aforementioned acrylic polymer syrup 2. The ratio of the solvent-insoluble component of the obtained pressure-sensitive adhesive layer was 62.5% by mass.

EXAMPLE 1-10

An acrylic pressure-sensitive adhesive composition and a pressure-sensitive adhesive layer sheet were obtained in the same way as in Example 1-1, except that 12 parts by mass of the aforementioned (meth)acrylic polymer 3, 8 parts by mass of Alcon P125 (hydrogenated petroleum resin, softening point: 125° C., made by ARAKAWA CHEMICAL INDUSTRIES, LTD.), and 0.14 parts by mass of trimethylolpropane triacrylate were added to 100 parts by mass of the aforementioned acrylic polymer syrup 2. The ratio of the solvent-insoluble component of the obtained pressure-sensitive adhesive layer was 65.7% by mass.

EXAMPLE 1-11

An acrylic pressure-sensitive adhesive composition and a pressure-sensitive adhesive layer sheet were obtained in the same way as in Example 1-1, except that 12 parts by mass of the aforementioned (meth)acrylic polymer 1, 8 parts by mass of Alcon P125 (hydrogenated petroleum resin, softening point: 125° C., made by ARAKAWA CHEMICAL INDUSTRIES, LTD.), and 0.12 parts by mass of trimethylolpropane triacrylate were added to 100 parts by mass of the aforementioned acrylic polymer syrup 2. The ratio of the solvent-insoluble component of the obtained pressure-sensitive adhesive layer was 61.3% by mass.

COMPARATIVE EXAMPLE 1-1

An acrylic pressure-sensitive adhesive composition and a pressure-sensitive adhesive layer sheet were obtained in the same way as in Example 1-1, except that 0.045 parts by mass of 1,6-hexanediol diacrylate were added to 100 parts by mass of the aforementioned acrylic polymer syrup 1. The ratio of the solvent-insoluble component of the obtained pressure-sensitive adhesive layer was 77.4% by mass.

COMPARATIVE EXAMPLE 1-2

An acrylic pressure-sensitive adhesive composition and a pressure-sensitive adhesive layer sheet were obtained in the same way as in Example 1-1, except that 0.07 parts by mass of 1,6-hexanediol diacrylate were added to 100 parts by mass of the aforementioned acrylic polymer syrup 2. The ratio of the solvent-insoluble component of the obtained pressure-sensitive adhesive layer was 75.2% by mass.

COMPARATIVE EXAMPLE 1-3

An acrylic pressure-sensitive adhesive composition and a pressure-sensitive adhesive layer sheet were obtained in the same way as in Example 1-1, except that 20 parts by mass of the aforementioned (meth)acrylic polymer 1 and 0.12 parts by mass of trimethylolpropane triacrylate were added to 100 parts by mass of the aforementioned acrylic polymer syrup 1. The ratio of the solvent-insoluble component of the obtained pressure-sensitive adhesive layer was 73.4% by mass.

COMPARATIVE EXAMPLE 1-4

An acrylic pressure-sensitive adhesive composition and a pressure-sensitive adhesive layer sheet were obtained in the same way as in Example 1-1, except that 20 parts by mass of the aforementioned (meth)acrylic polymer 1 and 0.14 parts by mass of trimethylolpropane triacrylate were added to 100 parts by mass of the aforementioned acrylic polymer syrup 2. The ratio of the solvent-insoluble component of the obtained pressure-sensitive adhesive layer was 67.3% by mass.

COMPARATIVE EXAMPLE 1-5

An acrylic pressure-sensitive adhesive composition and a pressure-sensitive adhesive layer sheet were obtained in the same way as in Example 1-1, except that 8 parts by mass of Alcon P125 (hydrogenated petroleum resin, softening point: 125° C., made by ARAKAWA CHEMICAL INDUSTRIES, LTD.) and 0.08 parts by mass of trimethylolpropane triacrylate were added to 100 parts by mass of the aforementioned acrylic polymer syrup 1. The ratio of the solvent-insoluble component of the obtained pressure-sensitive adhesive layer was 75.0% by mass.

COMPARATIVE EXAMPLE 1-6

An acrylic pressure-sensitive adhesive composition and a pressure-sensitive adhesive layer sheet were obtained in the same way as in Example 1-1, except that 20 parts by mass of Alcon P125 (hydrogenated petroleum resin, softening point: 125° C., made by ARAKAWA CHEMICAL INDUSTRIES, LTD.) and 0.12 parts by mass of trimethylolpropane triacrylate were added to 100 parts by mass of the aforementioned acrylic polymer syrup 1. The ratio of the solvent-insoluble component of the obtained pressure-sensitive adhesive layer was 71.7% by mass.

COMPARATIVE EXAMPLE 1-7

An acrylic pressure-sensitive adhesive composition and a pressure-sensitive adhesive layer sheet were obtained in the same way as in Example 1-1, except that 20 parts by mass of Alcon P125 (hydrogenated petroleum resin, softening point: 125° C., made by ARAKAWA CHEMICAL INDUSTRIES, LTD.) and 0.15 parts by mass of trimethylolpropane triacrylate were added to 100 parts by mass of the aforementioned acrylic polymer syrup 2. The ratio of the solvent-insoluble component of the obtained pressure-sensitive adhesive layer was 67.3% by mass.

COMPARATIVE EXAMPLE 1-8

An acrylic pressure-sensitive adhesive composition and a pressure-sensitive adhesive layer sheet were obtained in the same way as in Example 1-1, except that 12 parts by mass of the aforementioned (meth)acrylic polymer 1, 8 parts by mass of Mighty Ace K-125 (terpene phenol resin, softening point: 125° C., made by YASUHARA CHEMICAL CO., LTD.), and 0.25 parts by mass of trimethylolpropane triacrylate were added to 100 parts by mass of the aforementioned acrylic polymer syrup 1. The ratio of the solvent-insoluble component of the obtained pressure-sensitive adhesive layer was 74.7% by mass.

(Test Method)

[180° Peeling-Off Pressure-Sensitive Adhesive Force Test]

After the release liner (polyester films) on one surface of the acrylic pressure-sensitive adhesive layer sheet according to each of Examples and Comparative Examples was peeled off, a polyethylene terephthalate film having a thickness of 50 μm was attached. The obtained sheet was cut into a piece having a width of 25 mm, which was used as a test specimen. In addition, a polypropylene plate (part number: 1600, made by Takiron Co., Ltd.) and an acrylic plate (ACRYLITE, made by Mitsubishi Rayon Co., Ltd.), which had been cleaned with isopropyl alcohol and had a thickness of 2 mm, were prepared. After the release liner (polyester film) on the other surface of the pressure-sensitive adhesive layer sheet was peeled off, the pressure-sensitive adhesive surface of the sheet was attached to the polypropylene plate and acrylic plate by reciprocating a 2-kg roller. After the pressure-sensitive adhesive sheet was attached to each of the polypropylene plate and the acrylic plate, the sample was left uncontrolled under a 23° C.-environment for 30 minutes (initial condition). In addition, after the pressure-sensitive adhesive sheet was attached to each of the polypropylene plate and the acrylic plate, the sample was left uncontrolled under a 40° C.-environment for 48 hours and then under a 23° C.-environment for 30 minutes (normal condition). The pressure-sensitive adhesive force (resistance force) (unit: N/25 mm) of each of the pressure-sensitive adhesive layer sheets under the initial condition and the normal condition to an adherend was measured by peeling off the other end of the sheet in the 180° peeling-off direction at a speed of 300 mm/min. The case where, with respect to both the initial condition and the normal condition, the pressure-sensitive adhesive force to each of the polypropylene plate and the acrylic plate was 16 N/25 mm or more was evaluated as good (°), while the case where the pressure-sensitive adhesive force was less than 16 N/25 mm was evaluated as bad (x). Results of the measurement are shown in Table 3.

[Resistance to Resilience Test]

The pressure-sensitive adhesive layer sheet according to each of Examples and Comparative Examples was cut into a piece having a width of 10 mm and a length of 90 mm, and the piece was attached to a clean aluminum plate having a thickness of 0.5 mm, a width of 10 mm, and a length of 90 mm, which was used as a test specimen. Subsequently, the test specimen was curved so as to have a curvature of R=50 mm by making the test specimen near to the aluminum plate follow a cylinder. Thereafter, the release liner (polyester film) on the other side of the pressure-sensitive adhesive layer sheet was peeled off, and then the test specimen was laminated onto each of the aforementioned polypropylene plate and the acrylic plate. After the test specimen, in the state of being laminated onto each of the polypropylene plate and the acrylic plate, was left uncontrolled at room temperature (25° C.) for 1 hour, the distance created by pop-off of the pressure-sensitive adhesive layer sheet, i.e., the distance between the surface of each of the polypropylene plate and the acrylic plate and the pressure-sensitive adhesive layer (average of the heights at both ends) (unit: mm) was measured. The case where the distance of the pop-off was 10 mm or less was evaluated as good (°), while the case where the distance thereof was more than 10 mm was evaluated as bad (x). Results of the measurement are shown in Table 3. Herein, the values shown in Table 3 are average values with respect to arbitrary multiple points.

[Holding Property Test]

After the release liners (polyester films) on one surface of the pressure-sensitive adhesive layer sheet according to each of Examples and Comparative Examples was peeled off, a polyethylene terephthalate film having a thickness of 50 μm was attached. The obtained sheet was cut into a piece having a width of 10 mm, which was used as a test specimen. The pressure-sensitive adhesive surface of the test specimen having the area of 10 mm in width×20 mm in length was attached to a bakelite plate that had been cleaned with toluene, and the test specimen was left uncontrolled under a 60° C.-environment for 30 minutes. Thereafter, a weight was hung from one end of the test specimen such that a 500-g load was applied in the shear direction, and the test specimen, in the state of the weight being hung, was left uncontrolled under a 60° C.-environment for 1 hour, and a holding property was evaluated. The case where the test specimen had not dropped was evaluated as good (°), while the case where the test specimen had dropped was evaluated as bad (x). Results of the measurement are shown in Table 3.

TABLE 3

| | 180° PEELING-OFF PRESSURE-SENSITIVE ADHESIVE FORCE TEST [N/25 mm] | | | | RESISTANCE TO RESILIENCE TEST | | |
|---|---|---|---|---|---|---|---|
| | PP | | ACRYLIC | | DISTANCE OF POP-OFF [mm] | | HOLDING PROPERTY TEST |
| | INITIAL CONDITION | NORMAL CONDITION | INITIAL CONDITION | NORMAL CONDITION | PP | ACRYLIC | |
| EXAMPLE 1-1 | 16.9(o) | 19.6(o) | 19.4(o) | 20.6(o) | 4.9(o) | 0.5(o) | o |
| EXAMPLE 1-2 | 16.4(o) | 21.8(o) | 18.7(o) | 20.6(o) | 5.3(o) | 0.9(o) | o |
| EXAMPLE 1-3 | 18.0(o) | 19.6(o) | 22.4(o) | 23.3(o) | 2.4(o) | 0.8(o) | o |

TABLE 3-continued

| | 180° PEELING-OFF PRESSURE-SENSITIVE ADHESIVE FORCE TEST [N/25 mm] | | | | RESISTANCE TO RESILIENCE TEST | | HOLDING PROPERTY TEST |
|---|---|---|---|---|---|---|---|
| | PP | | ACRYLIC | | DISTANCE OF POP-OFF [mm] | | |
| | INITIAL CONDITION | NORMAL CONDITION | INITIAL CONDITION | NORMAL CONDITION | PP | ACRYLIC | |
| EXAMPLE 1-4 | 17.8(○) | 19.3(○) | 20.1(○) | 20.8(○) | 5.3(○) | 0.9(○) | ○ |
| EXAMPLE 1-5 | 16.9(○) | 19.7(○) | 19.6(○) | 20.1(○) | 3.8(○) | 0.8(○) | ○ |
| EXAMPLE 1-6 | 17.1(○) | 21.6(○) | 18.8(○) | 20.5(○) | 0.0(○) | 1.3(○) | ○ |
| EXAMPLE 1-7 | 16.4(○) | 19.6(○) | 19.8(○) | 21.7(○) | 1.6(○) | 1.0(○) | ○ |
| EXAMPLE 1-8 | 21.2(○) | 24.8(○) | 27.3(○) | 26.6(○) | 0.3(○) | 0.0(○) | ○ |
| EXAMPLE 1-9 | 16.2(○) | 20.3(○) | 21.3(○) | 22.8(○) | 2.7(○) | 0.5(○) | ○ |
| EXAMPLE 1-10 | 19.8(○) | 24.6(○) | 23.6(○) | 26.8(○) | 2.8(○) | 0.0(○) | ○ |
| EXAMPLE 1-11 | 16.6(○) | 20.9(○) | 19.9(○) | 21.8(○) | 5.8(○) | 0.7(○) | ○ |
| COMPARATIVE EXAMPLE 1-1 | 11(x) | 12.4(x) | 15.2(x) | 15.6(x) | 11.3(x) | 0.4(○) | ○ |
| COMPARATIVE EXAMPLE 1-2 | 10.7(x) | 11.7(x) | 18.1(○) | 20.1(○) | 11.0(x) | 0.3(○) | ○ |
| COMPARATIVE EXAMPLE 1-3 | 15.5(x) | 15.4(x) | 23.4(○) | 23.3(○) | 1.5(○) | 0.2(○) | ○ |
| COMPARATIVE EXAMPLE 1-4 | 15.25(x) | 15.9(x) | 24.6(○) | 24.6(○) | 3.4(○) | 0.6(○) | ○ |
| COMPARATIVE EXAMPLE 1-5 | 15.0(x) | 16.7(○) | 16.2(○) | 16.5(○) | 10.9(x) | 1.1(○) | ○ |
| COMPARATIVE EXAMPLE 1-6 | 14.8(x) | 19.6(○) | 13.7(x) | 16.5(○) | 11.5(x) | 11.3(x) | ○ |
| COMPARATIVE EXAMPLE 1-7 | 8.0(x) | 9.9(x) | 12.6(x) | 12.6(x) | 12.0(x) | 5.4(○) | ○ |
| COMPARATIVE EXAMPLE 1-8 | 13.1(x) | 17.6(○) | 15.8(x) | 16.7(○) | 0.6(○) | 0.3(○) | ○ |

As shown in Table 3, the pressure-sensitive adhesive force of each of Comparative Examples 1-1 to 1-4 and 1-7 to the polypropylene plate was bad with respect to both the initial condition and the normal condition. That of each of Comparative Examples 1-5, 1-6, and 1-8 to the acrylic plate was good with respect to the normal condition, but was bad with respect to the initial condition. That of each of Comparative Examples 1-1 and 1-7 to the acrylic plate was bad with respect to both the initial condition and the normal condition. That of each of Comparative Examples 1-6 and 1-8 to the acrylic plate was good with respect to the normal condition, but was bad with respect to the initial condition. On the other hand, the pressure-sensitive adhesive force of each of Examples 1-1 to 1-11 to each of the polypropylene plate and the acrylic plate was good with respect to both the initial condition and the normal condition. That is, it has been confirmed that the adhesiveness of each of Examples was more improved in comparison with those of Comparative Examples 1-1 to 1-8.

The resistance to resilience of Comparative Example 1-6 was bad in both the polypropylene plate and the acrylic plate. That of each of Comparative Examples 1-1, 1-2, 1-5, and 1-7 was bad in the polypropylene plate. On the other hand, the resistance to resilience of each of Examples was good in both the polypropylene plate and the acrylic plate.

Good holding property (cohesive force) was observed in each of Examples and Comparative Examples. Accordingly, it has been confirmed that each of Examples 1-1 to 1-11 has excellent pressure-sensitive adhesive force, excellent resistance to resilience, and an excellent holding property.

From the summarization of the above results, it has been confirmed that, by containing, as tackifying resins to be added to the acrylic polymer (A) as a pressure-sensitive adhesive composition, both the (meth)acrylic polymer (B) and the hydrogenated tackifying resin (C), an effect that has not been achieved before can be obtained, in which all of the pressure-sensitive adhesive force to adherends including an adherend having low polarity, resistance to resilience, and a holding property can be made good.

Embodiment 2

FIG. 1 is a schematic sectional view illustrating the structure of an acrylic pressure-sensitive adhesive tape according to Embodiment 2. An acrylic pressure-sensitive adhesive tape 10 comprises a core layer 20, a surface layer 30a provided on one surface of the core layer 20, and a surface layer 30b provided on the other surface of the core layer. Hereinafter, the surface layers 30a and 30b are collectively referred to as a surface layer 30.

(Core Layer)

The core layer 20 contains an acrylic polymer (D), and if necessary, contains a fine particle (E) and a bubble (F). Hereinafter, each component of the core layer 20 will be described in detail.

[Acrylic Polymer (D)]

The acrylic polymer (D) is used as a pressure-sensitive adhesive composition that forms the core layer 20. For example, the acrylic polymer (D) contains, as a monomer unit, 50% by mass or more of (meth)acrylic acid alkyl ester having a $C_{1-20}$ linear or branched alkyl group. The acrylic polymer (D) can be formed of the (meth)acrylic acid alkyl ester having a $C_{1-20}$ alkyl group alone or in combination of two or more thereof. The acrylic polymer (D) can be obtained by polymerizing (for example, solution polymerization, emulsion polymerization, or UV polymerization) the (meth) acrylic acid alkyl ester along with a polymerization initiator.

The ratio (R) of the (meth)acrylic acid alkyl ester having a $C_{1-20}$ alkyl group to the total mass of the monomer components for preparing the acrylic polymer (D) is 50% by mass≤R≤99.9% by mass, preferably 60% by mass≤R≤98% by mass, and more preferably 70% by mass≤R≤95% by mass.

Examples of the (meth)acrylic acid alkyl ester having a $C_{1-20}$ alkyl group include, for example: (meth)acrylic acid $C_{1-20}$ alkyl esters [preferably (meth)acrylic acid $C_{2-14}$ alkyl esters, more preferably (meth)acrylic acid $C_{2-10}$ alkyl esters], such as (meth)acrylic acid methyl, (meth)acrylic acid ethyl, (meth)acrylic acid propyl, (meth)acrylic acid isopropyl, (meth)acrylic acid butyl, (meth)acrylic acid isobutyl, (meth)acrylic acid s-butyl, (meth)acrylic acid t-butyl, (meth)acrylic acid pentyl, (meth)acrylic acid isopentyl, (meth)acrylic acid hexyl, (meth)acrylic acid heptyl, (meth)acrylic acid octyl, (meth)acrylic acid 2-ethylhexyl, (meth)acrylic acid isooctyl, (meth)acrylic acid nonyl, (meth)acrylic acid isononyl, (meth)acrylic acid decyl, (meth)acrylic acid isodecyl, (meth)acrylic acid undecyl, (meth)acrylic acid dodecyl, (meth)acrylic acid tridecyl, (meth)acrylic acid tetradecyl, (meth)acrylic acid pentadecyl, (meth)acrylic acid hexadecyl, (meth)acrylic acid heptadecyl, (meth)acrylic acid octadecyl, (meth)acrylic acid nonadecyl, and (meth)acrylic acid eicosyl. In addition, the (meth)acrylic acid alkyl ester means an acrylic acid alkyl ester and/or a methacrylic acid alkyl ester, and all of the "(meth) . . . " expressions have the same meaning.

Examples of the (meth)acrylic acid esters other than the (meth)acrylic acid alkyl esters include, for example: (meth)acrylic acid esters having an alicyclic hydrocarbon group, such as cyclopentyl(meth)acrylate, cyclohexyl(meth)acrylate, and isobornyl(meth)acrylate; (meth)acrylic acid esters having an aromatic hydrocarbon group, such as phenyl(meth)acrylate; and (meth)acrylic acid esters obtained from terpene compound derivative alcohols, etc.

For the purpose of modifying cohesive force, heat resistance, and cross-linking property, etc., the acrylic polymer (D) may contain, if necessary, another monomer component (copolymerizable monomer) that is copolymerizable with the (meth)acrylic acid alkyl esters. Accordingly, the acrylic polymer (D) may contain a copolymerizable monomer along with the (meth)acrylic acid alkyl ester as a major component. A monomer having a polar group can be preferably used as the copolymerizable monomer.

Specific examples of the copolymerizable monomer include: carboxyl group-containing monomers, such as acrylic acid, methacrylic acid, carboxy ethyl acrylate, carboxy pentylacrylate, itaconic acid, maleic acid, fumaric acid, crotonic acid, and isocrotonic acid; hydroxyl group-containing monomers, such as (meth)acrylic acid hydroxyalkyls including (meth)acrylic acid hydroxyethyl, (meth)acrylic acid hydroxypropyl, (meth)acrylic acid hydroxybutyl, (meth)acrylic acid hydroxyhexyl, (meth)acrylic acid hydroxyoctyl, (meth)acrylic acid hydroxydecyl, (meth)acrylic acid hydroxylauryl, and (4-hydroxymethyl cyclohexyl)methyl methacrylate; acid anhydride group-containing monomers, such as maleic acid anhydride and itaconic acid anhydride; sulfonic acid group-containing monomers, such as styrene sulfonic acid, allyl sulfonic acid, 2-(meth)acrylamide-2-methylpropanesulfonic acid, (meth)acrylamide propanesulfonic acid, sulfopropyl(meth)acrylate, and (meth)acryloyloxy naphthalenesulfonic acid; phosphate group-containing monomers, such as 2-hydroxyethyl acryloyl phosphate; (N-substituted)amide monomers, such as (meth)acrylamide, N,N-dialkyl(meth)acrylamides including N,N-dimethyl (meth)acrylamide, N,N-diethyl(meth)acrylamide, N,N-dipropyl(meth)acrylamide, N,N-diisopropyl(meth)acrylamide, N,N-di(n-butyl)(meth)acrylamide, and N,N-di(t-butyl)(meth)acrylamide, etc., N-ethyl(meth)acrylamide, N-isopropyl(meth)acrylamide, N-butyl(meth)acrylamide, N-n-butyl(meth)acrylamide, N-methylol(meth)acrylamide, N-ethylol(meth)acrylamide, N-methylol propane (meth)acrylamide, N-methoxymethyl(meth)acrylamide, N-methoxyethyl(meth)acrylamide, N-butoxymethyl(meth)acrylamide, and N-acryloylmorpholine; succinimide monomers, such as N-(meth)acryloyloxy methylene succinimide, N-(meth)acryloyl-6-oxy hexamethylene succinimide, and N-(meth)acryloyl-8-oxy hexamethylene succinimide; maleimide monomers, such as N-cyclohexylmaleimide, N-isopropylmaleimide, N-laurylmaleimide, and N-phenylmaleimide; itaconimide monomers, such as N-methylitaconimide, N-ethylitaconimide, N-butylitaconimide, N-octylitaconimide, N-2-ethylhexylitaconimide, N-cyclohexylitaconimide, and N-laurylitaconimide; nitrogen-containing heterocyclic monomers, such as N-vinyl-2-pyrrolidone, N-methylvinylpyrrolidone, N-vinylpyridine, N-vinylpiperidone, N-vinylpyrimidine, N-vinylpiperazine, N-vinylpyrazine, N-vinylpyrrole, N-vinylimidazole, N-vinyloxazole, N-(meth)acryloyl-2-pyrrolidone, N-(meth)acryloylpiperidine, N-(meth)acryloylpyrrolidine, N-vinyl morpholine, N-vinyl-2-piperidone, N-vinyl-3-morpholine, N-vinyl-2-caprolactam, N-vinyl-1,3-oxazine-2-one, N-vinyl-3,5-morpholine dione, N-vinylpyrazole, N-vinyl isoxazole, N-vinylthiazole, N-vinylisothiazole, and N-vinylpyridazine; N-vinyl carboxylic acid amides; lactam monomers, such as N-vinyl caprolactam; cyano-containing monomers, such as acrylonitrile and methacrylonitrile; (meth)acrylic acid aminoalkyl monomers, such as (meth)acrylic acid aminoethyl, (meth)acrylic acid N,N-dimethylaminoethyl, (meth)acrylic acid N,N-dimethylaminoethyl, and (meth)acrylic acid t-butylaminoethyl; (meth)acrylic acid alkoxy alkyl monomers, such as (meth)acrylic acid methoxyethyl, (meth)acrylic acid ethoxyethyl, (meth)acrylic acid propoxyethyl, (meth)acrylic acid butoxyethyl, and (meth)acrylic acid ethoxypropyl; styrene monomers, such as styrene and α-methylstyrene; epoxy group-containing acrylic monomers, such as (meth)acrylic acid glycidyl; glycol acrylic ester monomers, such as (meth)acrylic acid polyethylene glycol, (meth)acrylic acid polypropylene glycol, (meth)acrylic acid methoxy ethylene glycol, and (meth)acrylic acid methoxy polypropylene glycol; acrylic acid ester monomers having a heterocycle, halogen atom, silicon atom, or the like, such as (meth)acrylic acid tetrahydrofurfuryl, fluorine atom-containing (meth)acrylate, and silicone(meth)acrylate; olefin monomers, such as isoprene, butadiene, and isobutylene; vinyl ether monomers, such as methyl vinyl ether and ethyl vinyl ether; vinyl esters, such as vinyl acetate and vinyl propionate aromatic vinyl compounds, such as vinyl toluene and styrene; olefins or dienes, such as ethylene, butadiene, isoprene, and isobutylene; vinyl ethers, such as vinyl alkyl ether; vinyl chloride; (meth)acrylic acid alkoxy alkyl monomers, such as (meth)acrylic acid methoxyethyl and (meth)acrylic acid ethoxyethyl; sulfonic acid group-containing monomers, such as vinyl sulfonate sodium; imide group-containing monomers, such as cyclohexyl maleimide and isopropyl maleimide; isocyanate group-containing monomers, such as 2-isocyanate ethyl(meth)acrylate; and amide group-containing vinyl monomers, such as N-acryloyl morpholine, etc. These copolymerizable monomers can be used alone or in combination of two or more thereof.

When the acrylic polymer (D) contains the copolymerizable monomer along with the (meth)acrylic acid alkyl ester as a major component, carboxyl group-containing monomers can be preferably used. Among them, an acrylic acid can be preferably used. The use amount of the copolymerizable monomer is not particularly limited, but the monomer can be used usually in an amount within a range of 0.1 to 40% by mass, preferably within a range of 0.5 to 30% by mass, and more preferably within a range of 1 to 20% by mass, based on the total mass of the monomer components for preparing the acrylic polymer (D).

By containing 0.1% by mass or more of the copolymerizable monomer, a decrease in the cohesive force of the acrylic pressure-sensitive adhesive that forms the core layer 20 can be prevented and large shear force can be obtained. Also, by containing 40% by mass or less of the copolymerizable monomer, it can be prevented that the cohesive force of the acrylic pressure-sensitive adhesive that forms the core layer 20 may become too large, and accordingly the tackiness at normal temperature (25° C.) can be improved.

A polyfunctional monomer may be contained, if necessary, in the acrylic polymer (D) in order to adjust the cohesive force of the acrylic pressure-sensitive adhesive tape.

Examples of the polyfunctional monomer include, for example: (poly)ethylene glycol di(meth)acrylate, (poly)propylene glycol di(meth)acrylate, neopentyl glycol di(meth) acrylate, pentaerythritol di(meth)acrylate, pentaerythritol tri(meth)acrylate, dipentaerythritol hexa(meth)acrylate, 1,2-ethylene glycol di(meth)acrylate, 1,6-hexanediol di(meth) acrylate, 1,12-dodecane diol di(meth)acrylate, trimethylolpropane tri(meth)acrylate, tetramethylol methane tri(meth)acrylate, allyl(meth)acrylate, vinyl(meth)acrylate, divinylbenzene, epoxy acrylate, polyester acrylate, urethane acrylate, butyldiol (meth)acrylate, and hexyldiol (meth)acrylate, etc. Among them, trimethylolpropane tri(meth)acrylate, hexanediol di(meth)acrylate, and dipentaerythritol hexa(meth)acrylate can be preferably used. The polyfunctional (meth)acrylates can be used alone or in combination of two or more thereof.

The use amount of the polyfunctional monomer is changed depending on the molecular weight or the number of functional groups thereof, but the polyfunctional monomer is added in an amount within a range of 0.01 to 3.0% by mass, preferably within a range of 0.02 to 2.0% by mass, and more preferably within a range of 0.03 to 1.0% by mass, based on the total mass of the monomer components for preparing the acrylic polymer (D).

If the use amount of the polyfunctional monomer is more than 3.0% by mass based on the total mass of the monomer components for preparing the acrylic polymer (D), there are sometimes the cases where, for example, the cohesive force of the acrylic pressure-sensitive adhesive that forms the core layer 20 becomes too large and accordingly the adhesive force is decreased. On the other hand, if the use amount thereof is less than 0.01% by mass, there are sometimes the cases where, for example, the cohesive force of the acrylic pressure-sensitive adhesive that forms the core layer 20 is decreased.

<Polymerization Initiator>

In preparing the acrylic polymer (D), the acrylic polymer (D) can be easily formed by a curing reaction using heat or ultraviolet rays with the use of a polymerization initiator, such as a thermal polymerization initiator, photo-polymerization initiator (photo-initiator), or the like. In particular, a photo-polymerization initiator can be preferably used in terms of the advantage that a polymerization time can be shortened. The polymerization initiators can be used alone or in combination of two or more thereof.

Examples of the thermal polymerization initiator include, for example: azo polymerization initiators (for example, 2,2'-azobisisobutyronitrile, 2,2'-azobis-2-methylbutyronitrile, 2,2'-azobis(2-methylpropionic acid)dimethyl, 4,4'-azobis-4-cyanovalerianic acid, azobis isovaleronitrile, 2,2'-azobis(2-amidinopropane)dihydrochloride, 2,2'-azobis[2-(5-methyl-2-imidazoline-2-yl) propane]dihydrochloride, 2,2'-azobis(2-methylpropionamidine)disulfate, and 2,2'-azobis(N,N'-dimethyleneisobutylamidine)dihydrochloride, etc.); peroxide polymerization initiators (for example, dibenzoyl peroxide, t-butyl permaleate, and lauroyl peroxide, etc.); and redox polymerization initiators, etc.

The use amount of the thermal polymerization initiator is not particularly limited, and only has to be within a conventional range in which it can be used as a thermal polymerization initiator.

The photo-polymerization initiator is not particularly limited, but, for example, a benzoin ether photo-polymerization initiator, acetophenone photo-polymerization initiator, α-ketol photo-polymerization initiator, aromatic sulfonyl chloride photo-polymerization initiator, photoactive oxime photo-polymerization initiator, benzoin photo-polymerization initiator, benzyl photo-polymerization initiator, benzophenone photo-polymerization initiator, ketal photo-polymerization initiator, thioxanthone photo-polymerization initiator, acylphosphine oxide photo-polymerization initiator, or the like, can be used.

Specific examples of the benzoin ether photo-polymerization initiator include, for example: benzoin methyl ether, benzoin ethyl ether, benzoin propyl ether, benzoin isopropyl ether, benzoin isobutyl ether, 2,2-dimethoxy-1,2-diphenylethane-1-one [product name: IRGACURE 651, made by BASF], and anisoin, etc. Specific examples of the acetophenone photo-polymerization initiator include, for example: 1-hydroxycyclohexyl phenyl ketone [product name: IRGACURE 184, made by BASF], 4-phenoxy dichloroacetophenone, 4-t-butyl-dichloroacetophenone, 1-[4-(2-hydroxyethoxy)-phenyl]-2-hydroxy-2-methyl-1-propane-1-one [product name: IRGACURE 2959, made by BASF], 2-hydroxy-2-methyl-1-phenyl-propane-1-one [product name: DAROCUR 1173, made by BASF], and methoxy acetophenone, etc. Specific examples of the α-ketol photo-polymerization initiator include, for example: 2-methyl-2-hydroxy propiophenone and 1-[4-(2-hydroxyethyl)-phenyl]-2-hydroxy-2-methylpropane-1-one, etc. Specific examples of the aromatic sulfonyl chloride photo-polymerization initiator include, for example, 2-naphthalene sulfonyl chloride, etc. Specific examples of the photoactive oxime photo-polymerization initiator include, for example, 1-phenyl-1,2-propanedione-2-(O-ethoxycarbonyl)-oxime, etc.

Specific examples of the benzoin photo-polymerization initiator include, for example, benzoin, etc. Specific examples of the benzyl photo-polymerization initiator include, for example, benzyl, etc. Specific examples of the benzophenone photo-polymerization initiators include, for example, benzophenone, benzoylbenzoic acid, 3,3'-dimethyl-4-methoxybenzophenone, polyvinyl benzophenone, and α-hydroxy cyclohexyl phenyl ketone, etc. Specific examples of the ketal photo-polymerization initiator include, for example, benzyl dimethyl ketal, etc. Specific examples of the thioxanthone photo-polymerization initiator include, for example, thioxanthone, 2-chlorothioxanthone, 2-methyl thioxanthone, 2,4-dimethyl thioxanthone, isopropyl thioxanthone, 2,4-dichloro thioxanthone, 2,4-diethyl thioxanthone, isopropyl thioxanthone, 2,4-diisopropyl thioxanthone, and dodecyl thioxanthone, etc.

Examples of the acylphosphine photo-polymerization initiator include, for example: bis(2,6-dimethoxybenzoyl)phenylphosphine oxide, bis(2,6-dimethoxybenzoyl)(2,4,4-trimethylpentyl)phosphine oxide, bis(2,6-dimethoxybenzoyl)-n-butyl phosphine oxide, bis(2,6-dimethoxybenzoyl)-(2-methylpropane-1-yl)phosphine oxide, bis(2,6-dimethoxybenzoyl)-(1-methylpropane-1-yl)phosphine oxide, bis(2,6-dimethoxybenzoyl)-t-butylphosphine oxide, bis(2,6-dimethoxybenzoyl)cyclohexylphosphine oxide, bis (2,6-dimethoxybenzoyl)octylphosphine oxide, bis(2-methoxybenzoyl)(2-methylpropane-1-yl)phosphine oxide, bis(2-methoxybenzoyl)(1-methylpropane-1-yl)phosphine oxide, bis(2,6-diethoxybenzoyl)(2-methylpropane-1-yl)phosphine oxide, bis(2,6-diethoxybenzoyl)(1-methylpropane-1-yl) phosphine oxide, bis(2,6-dibutoxybenzoyl)(2-methylpropane-1-yl)phosphine oxide, bis(2,4-dimethoxybenzoyl)(2-methypropane-1-yl)phosphine oxide, bis(2,4,6-trimethylbenzoyl)(2,4-dipentoxyphenyl)phosphine oxide, bis(2,6-dimethoxybenzoyl)benzyl phosphine oxide, bis(2,6-dimethoxybenzoyl)-2-phenylpropyl phosphine oxide, bis(2,6-dimethoxybenzoyl)-2-phenylethyl phosphine oxide, bis(2,6-dimethoxybenzoyl)benzyl phosphine oxide, bis(2,6-dimethoxybenzoyl)-2-phenylpropyl phosphine oxide, bis(2,6-dimethoxybenzoyl)-2-phenylethyl phosphine oxide, 2,6-dimethoxybenzoyl benzylbutylphosphine oxide, 2,6-dimethoxybenzoyl benzyloctylphosphine oxide, bis(2,4,6-trimethylbenzoyl)-2,5-diisopropylphenylphosphine oxide, bis(2,4,6-trimethylbenzoyl)-2-methylphenylphosphine oxide, bis(2,4,6-trimethylbenzoyl)-4-methylphenylphosphine oxide, bis(2,4,6-trimethylbenzoyl)-2,5-diethylphenylphosphine oxide, bis(2,4,6-trimethylbenzoyl)-2,3,5,6-tetramethylphenylphosphine oxide, bis(2,4,6-trimethyl benzoyl)-2,4-di-n-butoxy phenylphosphine oxide, 2,4,6-trimethylbenzoyl diphenylphosphine oxide, bis(2,6-dimethoxybenzoyl)-2,4,4-trimethylpentylphosphine oxide, bis(2,4,6-trimethylbenzoyl)isobutylphosphine oxide, 2,6-dimethoxybenzoyl-2,4,6-trimethylbenzoyl-n-butylphosphine oxide, bis(2,4,6-trimethylbenzoyl)phenylphosphine oxide, bis(2,4,6-trimethylbenzoyl)-2,4-dibutoxyphenylphosphine oxide, 1,10-bis[bis(2,4,6-trimethylbenzoyl)phosphine oxide]decane, and tri(2-methylbenzoyl)phosphine oxide, etc.

The use amount of the photo-polymerization initiator is not particularly limited, but the photo-polymerization initiator is combined, for example, in an amount within a range of 0.01 to 5 parts by mass, and preferably within a range of 0.05 to 3 parts by mass, based on 100 parts by mass of the monomer components for preparing the acrylic polymer (D).

If the use amount of the photo-polymerization initiator is less than 0.01 parts by mass, there are sometimes the cases where a polymerization reaction becomes insufficient. If the use amount thereof is more than 5 parts by mass, there are sometimes the cases where an ultraviolet ray does not reach the inside of the pressure-sensitive adhesive layer, because the photo-polymerization initiator absorbs an ultraviolet ray. In this case, a decrease in the rate of polymerization is caused, or the molecular weight of the generated polymer becomes small. Thereby, the cohesive force of the acrylic pressure-sensitive adhesive that forms the core layer 20 becomes small, and hence there are sometimes the cases where, when the film is peeled off from the core layer 20, part of the acrylic pressure-sensitive adhesive remains on the film and accordingly the film cannot be reused. The photo-polymerization initiators may be used alone or in combination of two or more thereof.

In order to adjust the cohesive force, a cross-linking agent can also be used, other than the aforementioned polyfunctional monomers. Commonly-used cross-linking agents can be used as the cross-linking agent. Examples of the cross-linking agents include, for example: an epoxy cross-linking agent, isocyanate cross-linking agent, silicone cross-linking agent, oxazoline cross-linking agent, aziridine cross-linking agent, silane cross-linking gent, alkyl-etherified melamine cross-linking agent, and metal chelate cross-linking agent, etc. In particular, an isocyanate cross-linking agent and epoxy cross-linking agent can be preferably used.

Specific examples of the isocyanate cross-linking agent include: tolylene diisocyanate, hexamethylene diisocyanate, isophorone diisocyanate, xylylene diisocyanate, hydrogenated xylylene diisocyanate, diphenylmethane diisocyanate, hydrogenated diphenylmethane diisocyanate, tetramethyl xylylene diisocyanate, naphthalene diisocyanate, triphenylmethane triisocyanate, polymethylene polyphenyl isocyanate, and these adducts with polyols, such as trimethylolpropane. Alternatively, a compound having, in one molecule, at least one isocyanate group and one or more unsaturated bonds, specifically 2-isocyanate ethyl(meth)acrylate, etc., can also be used as the isocyanate cross-linking agent.

Examples of the epoxy cross-linking agent include: bisphenol A, epichlorohydrin type epoxy resin, ethyleneglycidylether, polyethylene glycol diglycidyl ether, glycerin diglycidyl ether, glycerin triglycidyl ether, 1,6-hexanediol glycidyl ether, trimethylolpropane triglycidyl ether, diglycidyl aniline, diamine glycidyl amine, N,N,N',N'-tetraglycidyl-m-xylylenediamine, and 1,3-bis(N,N-diglycidyl aminomethyl) cyclohexane, etc.

In the present embodiment, the acrylic polymer (D) can also be prepared as a partial polymer (acrylic polymer syrup) that can be obtained by radiating ultraviolet (UV) rays onto a mixture in which the aforementioned monomer components and the polymerization initiator have been combined, so that the monomer components are partially polymerized. The weight average molecular weight (Mw) of the acrylic polymer (D) is, for example, within a range of 30000 to 5000000.

[Fine Particle (E)]

In the present embodiment, fine particles (E) can be added to the acrylic polymer (D) that forms the core layer. The fine particle (E) has operational effects of improving the shear adhesive force and processability of the acrylic pressure-sensitive adhesive tape.

Examples of the fine particles (E) include: metallic particles, such as copper, nickel, aluminum, chromium, iron, and stainless steel, and metal oxide particles thereof; carbide particles, such as silicon carbide, boron carbide, and carbon nitride; nitride particles, such as aluminum nitride, silicon nitride, and boron nitride; ceramic particles represented by oxides, such as glass, alumina, and zirconium; inorganic fine particles, such as calcium carbide, aluminum hydroxide, glass, and silica; natural material particles, such as volcanic Shirasu and sand; polymer particles of polystyrene, polymethyl methacrylate, phenol resin, benzoguanamine resin, urea resin, silicone resin, nylon, polyester, polyurethane, polyethylene, polypropylene, polyamide, and polyimide, etc.; organic hollow bodies of vinylidene chloride and acrylic, etc.; and organic spheres, such as nylon bead, acrylic bead, and silicone bead.

Hollow fine particles can be preferably used as the fine particle (E). Among the hollow fine particles, hollow inorganic fine particles can be preferably used in terms of the efficiency of the polymerization using an ultraviolet reaction and weight. Examples of the hollow inorganic fine particles include: glass microspheres, such as hollow glass microspheres; hollow balloons made of a metallic compound, such as hollow alumina microspheres; and hollow microspheres made of porcelain, such as hollow ceramic microspheres. By using the aforementioned hollow glass microspheres, the high-temperature adhesive force of the acrylic pressure-sensitive adhesive tape can be improved without impairing other properties such as shear force and holding force.

Examples of the hollow glass microspheres include, for example, ones: with a product name of Glass Microballoon (made by FUJI SILYSIA CHEMICAL LTD.); with product names of CEL-STAR Z-20, CEL-STAR Z-27, CEL-STAR CZ-31T, CEL-STAR Z-36, CEL-STAR Z-39, CEL-STAR T-36, and CEL-STAR PZ-6000 (each of them is made by Tokai Kogyo Co., Ltd.); and with a product name of SILUX*FINE BALLOON (made by FINE-BALLOON Ltd.), etc.

The size of the fine particle (E) (average particle size) is not particularly limited, but can be selected from a range of, for example, 1 to 500 μm, preferably from a range of 5 to 200 μm, and more preferably from a range of 10 to 150 μm.

The specific gravity of the fine particle (E) is not particularly limited, but can be selected from a range of, for example, 0.1 to 1.8 g/cm$^3$, preferably from a range of 0.2 to 1.5 g/cm$^3$, and more preferably from a range of 0.2 to 0.5 g/cm$^3$.

If the specific gravity of the fine particle (E) is smaller than 0.1 g/cm$^3$, floating of the fine particles (E) becomes large when the fine particles are combined into the acrylic pressure-sensitive adhesive and they are mixed, and accordingly there are sometimes the cases where it is difficult to uniformly scatter the fine particles. In addition, because the strength of the glass becomes low, it will easily crack. Conversely, if the specific gravity thereof is larger than 1.8 g/cm$^3$, the transmission rate of an ultraviolet ray is decreased, and accordingly there is the fear that the efficiency of the ultraviolet reaction may be decreased. In addition, because the weight of the acrylic pressure-sensitive adhesive that forms the core layer 20 becomes large, workability becomes poor.

The use amount of the fine particles (E) is not particularly limited. If the use amount thereof is less than, for example, 10% by volume based on the whole volume of the core layer 20, the effect of the addition of the fine particles (E) is low. On the other hand, if the use amount thereof is more than 50% by volume, there are sometimes the cases where the adhesive force of the acrylic pressure-sensitive adhesive that forms the core layer 20 is decreased.

[Bubble (F)]

In the present embodiment, the bubbles (F) can be added to the acrylic polymer (D) that forms the core layer. By containing the bubbles (F) in the core layer 20, the acrylic pressure-sensitive adhesive tape 10 can exhibit good adhesiveness to a curved surface and concave-convex surface, and also exhibit good resistance to resilience.

It is desirable that the bubbles (F) contained in the core layer 20 are basically closed-cell type bubbles, but closed-cell type bubbles and interconnected-cell type bubbles may coexist.

Although the bubble (F) usually has a spherical shape (in particular, a true spherical shape), the shape does not necessarily have to have a true spherical shape and accordingly there may be concavities and convexities on the surface. The average bubble size (diameter) of the bubble (F) is not particularly limited, but can be selected, for example, from a range of 1 to 1000 μm, preferably from a range of 10 to 500 μm, and more preferably from a range of 30 to 300 μm.

A gas component contained in the bubble (F) (gas component that forms the bubble (F); hereinafter, appropriately referred to as a bubble-forming gas) is not particularly limited, but various gas components, such as inactive gases including nitrogen, carbon dioxide, and argon, and air, can be used. When a polymerization reaction is performed in a state where a bubble-forming gas is contained, it is important that the gas that forms the bubble (F) does not hamper the reaction. Nitrogen can be preferably used as a bubble-forming gas in terms of not hampering a polymerization reaction and cost.

The amount of the bubbles (F) contained in the core layer 20 is not particularly limited, but can be appropriately selected in accordance with the application of the tape. The amount of the bubbles (F) contained in the core layer 20 is, for example, within a range of 5 to 50% by volume, and preferably within a range of 8 to 40% by volume, based on the whole volume of the core layer 20 containing the bubbles (F). If the mixing amount of the bubbles is less than 5% by volume, the effect of mixing the bubbles (F) cannot be obtained. Conversely, if the mixing amount thereof is more than 50% by volume, the possibility that the bubbles each penetrating the core layer 20 may be present is increased, and hence there are sometimes the cases where the adhesive performance or the appearance is deteriorated.

A method of forming the core layer 20 containing the bubbles (F) is not particularly limited. The core layer 20 containing the bubbles (F) may be formed, for example, by using a core layer material into which a bubble-forming gas has been mixed in advance, or (2) by mixing a foaming agent into a core layer material into which a bubble-forming gas has not been mixed. In the case of (2), the foaming agent to be used is not particularly limited, but can be appropriately selected from, for example, publicly-known foaming agents. For example, heat-expandable microspheres can be used as such a foaming agent.

<Other Components>

Other than the aforementioned components, a thickener, a thixotropic agent, and fillers, etc., may be added to the core layer 20, if necessary. Examples of the thickener include acrylic rubber, epichlorohydrin rubber, and butyl rubber, etc. Examples of the thixotropic agent include colloid silica and polyvinylpyrrolidone, etc. Examples of the fillers include calcium carbonate, titanium oxide, and clay, etc. Other than those, a plasticizer, anti-aging agent, antioxidant, etc., may be appropriately added to the core layer 20.

(Surface Layer)

The surface layer 30 contains: the acrylic polymer (A) as a pressure-sensitive adhesive composition; and as tackifying resins, the (meth)acrylic polymer (B) having a weight average molecular weight (Mw) of $1000 \leq Mw < 30000$ (hereinafter, appropriately referred to as the (meth)acrylic polymer (B)) and the hydrogenated tackifying resin (C).

The content of each component in the acrylic pressure-sensitive adhesive composition contained in the surface layer 30 is described below.

Acrylic Polymer (A): 100 Parts by Mass
(Meth)Acrylic Polymer (B): 1 to 70 Parts by Mass
Hydrogenated Tackifying Resin (C): 1 to 50 Parts by Mass Hereinafter, the acrylic polymer (A), the (meth)acrylic polymer (B), and the hydrogenated tackifying resin (C) will be described in detail.

[Acrylic Polymer (A)]

The acrylic polymer (A) to be used in the surface layer 30 as a pressure-sensitive adhesive composition can be selected from the compounds (various monomer components) by which the acrylic polymer (D) in the core layer 20 is exemplified. The acrylic polymer (A) to be used in the surface layer 30 may or may not have the similar components and composition ratio as in the acrylic polymer (D) in the core layer 20.

When the acrylic polymer (A) contains a nitrogen-containing heterocyclic monomer as a constituent unit, more preferred monomers can be exemplified by N-vinyl cyclic amides represented by the following general formula (1):

[Formula 4]

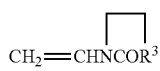

(1)

wherein, R$^3$ is a divalent organic group.

The glass transition temperature (Tg) of the acrylic polymer (A) is Tg<0° C., and preferably Tg<−10° C., and usually −80° C.≤Tg.

In the present embodiment, the acrylic polymer (A) that forms the surface layer can also be prepared as a partial polymer (acrylic polymer syrup) that can be obtained by radiating ultraviolet (UV) rays onto a mixture in which the aforementioned monomer components and the polymerization initiator have been combined, so that the monomer components are partially polymerized. An acrylic pressure-sensitive adhesive composition is prepared by combining the later-described (meth)acrylic polymer (B) and the hydrogenated tackifying resin (C) into the acrylic polymer syrup, and then polymerization can also be completed by coating the pressure-sensitive adhesive composition on a predetermined object to be coated and by radiating UV rays. The weight average molecular weight (Mw) of the acrylic polymer (A) is, for example, within a range of 30000 to 5000000. In the present embodiment, the polymerization initiators described in the preparation of the acrylic polymer (D) can be appropriately used when the acrylic polymer (A) that forms the surface layer is prepared. Also, the cross-linking agents described in the preparation of the acrylic polymer (D) can be appropriately used in order to adjust the cohesive force of the surface layer 30.

[(Meth)Acrylic Polymer (B)]

The (meth)acrylic polymer (B) is a polymer having a weight average molecular weight smaller than that of the acrylic polymer (A), and functions as a tackifying resin and has the advantage that inhibition of polymerization is hardly caused when UV polymerization is performed. For example, the (meth)acrylic polymer (B) contains, as a monomer unit, a (meth)acrylic acid ester.

Examples of such a (meth)acrylic acid ester include: (meth)acrylic acid alkyl esters, such as (meth)acrylic acid methyl, (meth)acrylic acid ethyl, (meth)acrylic acid propyl, (meth)acrylic acid isopropyl, (meth)acrylic acid butyl, (meth)acrylic acid isobutyl, (meth)acrylic acid s-butyl, (meth)acrylic acid t-butyl, (meth)acrylic acid pentyl, (meth)acrylic acid isopentyl, (meth)acrylic acid hexyl, (meth)acrylic acid-2-ethylhexyl, (meth)acrylic acid heptyl, (meth)acrylic acid octyl, (meth)acrylic acid isooctyl, (meth)acrylic acid nonyl, (meth)acrylic acid isononyl, (meth)acrylic acid decyl, (meth)acrylic acid isodecyl, (meth)acrylic acid undecyl, and (meth)acrylic acid dodecyl; esters of (meth)acrylic acids with alicyclic alcohols, such as (meth)acrylic acid cyclohexyl and (meth)acrylic acid isobornyl; (meth)acrylic acid aryl esters, such as (meth)acrylic acid phenyl and (meth)acrylic acid benzyl; and (meth)acrylic acid esters obtained from terpene compound derivative compounds, etc. These (meth)acrylic acid esters can be used alone or in combination of two or more thereof.

Alternatively, the (meth)acrylic polymer (B) can also be obtained by copolymerizing another monomer component (copolymerizable monomer) that is copolymerizable with the (meth)acrylic acid ester, in addition to the aforementioned (meth)acrylic acid ester component unit.

Examples of the another monomer that is copolymerizable with the (meth)acrylic acid ester include: (meth)acrylic acid alkoxy alkyl monomers, such as (meth)acrylic acid methoxyethyl, (meth)acrylic acid ethoxyethyl, (meth)acrylic acid propoxyethyl, (meth)acrylic acid butoxyethyl, and (meth)acrylic acid ethoxypropyl; salts, such as (meth)acrylic acid alkali metal salt; di(meth)acrylic acid ester monomers of (poly) alkylene glycols, such as di(meth)acrylic acid ester of ethylene glycol, di(meth)acrylic acid ester of diethylene glycol, di(meth)acrylic acid ester of triethylene glycol, di(meth) acrylic acid ester of polyethylene glycol, di(meth)acrylic acid ester of propylene glycol, di(meth)acrylic acid ester of dipropylene glycol, and di(meth)acrylic acid ester of tripropylene glycol; poly(meth)acrylic acid ester monomers, such as trimethylolpropane tri(meth)acrylic acid ester; vinyl esters, such as vinyl acetate and vinyl propionate; halogenated vinyl compounds, such as vinylidene chloride and (meth)acrylic acid-2-chloroethyl; oxazoline group-containing polymerizable compounds, such as 2-vinyl-2-oxazoline, 2-vinyl-5-methyl-2-oxazoline, and 2-isopropenyl-2-oxazoline; aziridine group-containing polymerizable compounds, such as (meth)acryloylaziridine and (meth)acrylic acid-2-aziridinylethyl; epoxy group-containing vinyl monomers, such as allyl glycidyl ether, (meth)acrylic acid glycidyl ether, and (meth)acrylic acid-2-ethyl glycidyl ether; hydroxyl group-containing vinyl monomers, such as (meth)acrylic acid-2-hydroxyethyl, (meth)acrylic acid-2-hydroxypropyl, monoesters of (meth)acrylic acids with polypropylene glycol or polyethylene glycol, and adducts of lactones with (meth) acrylic acid-2-hydroxyethyl; fluorine-containing vinyl monomers, such as fluorine-substituted (meth)acrylic acid alkyl ester; acid anhydride group-containing monomers, such as maleic acid anhydride and itaconic acid anhydride; aromatic vinyl compound monomers, such as styrene, α-methylstyrene, and vinyl toluene; reactive halogen-containing vinyl monomers, such as 2-chloroethyl vinyl ether and monochloro vinyl acetate; amide group-containing vinyl monomers, such as (meth)acrylamide, N-isopropyl(meth) acrylamide, N-butyl(meth)acrylamide, N,N-diethyl(meth) acrylamide, N,N-dimethyl(meth)acrylamide, N-methylol (meth)acrylamide, N-ethylol(meth)acrylamide, N-methylolpropane(meth)acrylamide, N-methoxyethyl (meth)acrylamide, N-butoxymethyl(meth)acrylamide, and N-acryloyl morpholine; succinimide monomers, such as N-(meth)acryloyloxy methylene succinimide, N-(meth)acryloyl-6-oxy hexamethylene succinimide, and N-(meth)acryloyl-8-oxy hexamethylene succinimide; maleimide monomers, such as N-cyclohexyl maleimide, N-isopropylmaleimide, N-lauryl maleimide, and N-phenyl maleimide; itaconimide monomers, such as N-methylitaconimide, N-ethylitaconimide, N-butylitaconimide, N-octylitaconimide, N-2-ethylhexylitaconimide, N-cyclohexylitaconimide, and N-laurylitaconimide; nitrogen-containing heterocyclic monomers, such as N-vinyl-2-pyrrolidone, N-methylvinylpyrrolidone, N-vinylpyridine, N-vinylpiperidone, N-vinylpyrimidine, N-vinylpiperazine, N-vinylpyrazine, N-vinylpyrrole, N-vinylimidazole, N-vinyloxazole, N-(meth)acryloyl-2-pyrrolidone, N-(meth)acryloylpiperidine, N-(meth)acryloylpyrrolidine, N-vinyl morpholine, N-vinyl pyrazole, N-vinyl isoxazole, N-vinyl thiazole, N-vinyl isothiazole, and N-vinyl pyridazine; N-vinyl carboxylic acid amides; lactam monomers, such as N-vinyl caprolactam; cyano-containing monomers, such as (meth)acrylonitrile; (meth)acrylic acid aminoalkyl monomers, such as (meth) acrylic acid aminoethyl, (meth)acrylic acid N,N-dimethylaminoethyl, (meth)acrylic acid N,N-dimethylaminoethyl, and (meth)acrylic acid t-butylaminoethyl; imide group-containing monomers, such as cyclohexyl maleimide and isopropyl maleimide; isocyanate group-containing monomers, such as 2-isocyanate ethyl(meth)acrylate; organic silicon-containing vinyl monomers, such as vinyltrimethoxysilane, γ-methacryloxpropyl trimethoxy silane, allyltrimethoxysilane, trimethoxysilylpropylallylamine, and 2-methoxy ethoxy trimethoxy silane; hydroxyl group-containing monomers, such as (meth)acrylic acid hydroxyalkyls including (meth) acrylic acid hydroxyethyl, (meth)acrylic acid hydroxypropyl, (meth)acrylic acid hydroxybutyl, (meth)acrylic acid hydroxyhexyl, (meth)acrylic acid hydroxyoctyl, (meth)acrylic acid hydroxydecyl, (meth)acrylic acid hydroxylauryl, and (4-hydroxymethyl cyclohexyl)methyl methacrylate; acrylic acid ester monomers having a heterocycle, halogen atom, silicon atom, or the like, such as (meth)acrylic acid tetrahydrofurfuryl, fluorine atom-containing (meth)acrylate, and silicone(meth)acrylate; olefin monomers, such as isoprene, butadiene, and isobutylene; vinyl ether monomers, such as methyl vinyl ether and ethyl vinyl ether; olefins or dienes, such as ethylene, butadiene, isoprene, and isobutylene; vinyl ethers, such as vinyl alkyl ether; vinyl chloride; and others, such as macro-monomers having a radically polymerizable vinyl group at the monomer end to which a vinyl group has been polymerized, etc. These monomers can be copolymerized, alone or in combination thereof, with the (meth)acrylic acid esters.

In the acrylic pressure-sensitive adhesive composition according to the present embodiment, examples of the (meth)acrylic polymer (B) include, for example, copolymer of cyclohexyl methacrylate (CHMA) and isobutyl methacrylate (IBMA), that of cyclohexylmethacrylate (CHMA) and isobornyl methacrylate (IBXMA), that of cyclohexyl methacrylate (CHMA) and acryloyl morpholine (ACMO), that of cyclohexyl methacrylate (CHMA) and diethylacrylamide (DEAA), that of 1-adamantyl acrylate (ADA) and methyl methacrylate (MMA), that of dicyclopentanyl methacrylate (DCPMA) and isobornyl methacrylate (IBXMA), homopolymer of dicyclopentanyl methacrylate (DCPMA), that of cyclohexyl methacrylate (CHMA), that of isobornyl-methacrylate (IBXMA), that of isobornyl acrylate (IBXA), that of dicyclopentanyl acrylate (DCPA), that of 1-adamantyl methacrylate (ADMA), and that of 1-adamantyl acrylate (ADA), etc.

It is preferable that the (meth)acrylic polymer (B) contains, as a monomer unit, an acrylic monomer having a relatively bulky structure, represented by: (meth)acrylate whose alkyl group has a branched structure, such as t-butyl(meth)acrylate; ester of (meth)acrylic acid with alicyclic alcohol, such as cyclohexyl(meth)acrylate and (meth)acrylic acid isobornyl; and (meth)acrylate having a cyclic structure, such as (meth)acrylic acid aryl ester including (meth)acrylic acid phenyl and (meth)acrylic acid benzyl. By making the (meth)acrylic polymer (B) have such a bulky structure, the adhesiveness of the acrylic pressure-sensitive adhesive composition (acrylic pressure-sensitive adhesive tape) can be further improved. A monomer having a cyclic structure has a large effect in terms of bulkiness, and a monomer containing multiple rings has a larger effect. In addition, when UV polymerization is adopted in synthesizing the (meth)acrylic polymer (B) or in producing the pressure-sensitive adhesive composition, it is preferable to use a monomer having a saturated bond, in terms that polymerization inhibition is hardly caused. In that case, (meth)acrylate whose alkyl group has a branched structure, or an ester thereof with an alicyclic alcohol can be preferably used as a monomer that forms the (meth)acrylic polymer (B).

The (meth)acrylic polymer (B) may further contain, as a monomer unit, a (meth)acrylic monomer having, for example, an alicyclic structure containing three or more rings. By making the (meth)acrylic polymer (B) have a bulkier structure, such as an alicyclic structure containing three or more rings, the adhesiveness of the acrylic pressure-sensitive adhesive composition (acrylic pressure-sensitive adhesive tape) can be more improved. In particular, the adhesiveness to an adherend having low polarity made of polypropylene, or the like, can be remarkably improved. The (meth)acrylic polymer (B) may be a homopolymer of the (meth)acrylic monomer having an alicyclic structure containing three or more rings, or a copolymer of the (meth)acrylic monomer having an alicyclic structure containing three or more rings with the aforementioned (meth)acrylic acid ester monomer or copolymerizable monomer.

The (meth)acrylic monomer is a (meth)acrylic acid ester represented by, for example, the following general formula (2):

$$CH_2=C(R^1)COOR^2 \qquad (2)$$

[wherein, $R^1$ represents a hydrogen atom or a methyl group and $R^2$ an alicyclic hydrocarbon group having an alicyclic structure containing three or more rings.]

It is preferable that the alicyclic hydrocarbon group has a three-dimensional structure, such as a bridged ring structure. By making the (meth)acrylic polymer (B) have an alicyclic structure containing three or more rings and have a bridged ring structure, as stated above, the adhesiveness of the acrylic pressure-sensitive adhesive composition (acrylic pressure-sensitive adhesive tape) can be more improved. In particular, the adhesiveness to an adherend having low polarity made of polyethylene, polypropylene, or the like, can be improved more remarkably. Examples of the alicyclic hydrocarbon group having a bridged ring structure include, for example: a dicyclopentanyl group represented by the following formula (3a); a dicyclopentenyl group represented by the following formula (3b); an adamantyl group represented by the following formula (3c); a tricyclopentanyl group represented by the following formula (3d); and a tricyclopentenyl group represented by the following formula (3e), etc. When UV polymerization is adopted in synthesizing the (meth)acrylic polymer (B) or in producing the pressure-sensitive adhesive composition, in particular, a (meth)acrylic monomer having a saturated structure, such as a dicyclopentanyl group represented by the following formula (3a), an adamantyl group represented by the following formula (3c), a tricyclopentanyl group represented by the following formula (3d), or the like, can be preferably used, among the (meth)acrylic monomers having an alicyclic structure containing three or more rings and having a bridged ring structure, as the monomer that forms the (meth)acrylic polymer (B), in terms that polymerization inhibition is hardly caused.

[Formula 5]

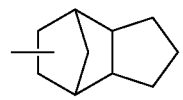

(3a)

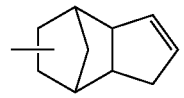

(3b)

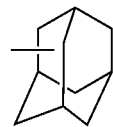

(3c)

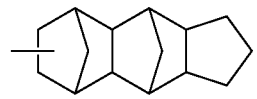

(3d)

(3e)

Examples of such a (meth)acrylic monomer having an alicyclic structure containing three or more rings and having a bridged ring structure include (meth)acrylic acid esters, such as dicyclopentanyl methacrylate, dicyclopentanyl acrylate, dicyclopentanyl oxyethyl methacrylate, dicyclopentanyl oxyethyl acrylate, tricyclopentanyl methacrylate, tricyclopentanyl acrylate, 1-adamantyl methacrylate, 1-adamantyl acrylate, 2-methyl-2-adamantyl methacrylate, 2-methyl-2-adamantyl acrylate, 2-ethyl-2-adamantyl methacrylate, and 2-ethyl-2-adamantyl acrylate. This (meth)acrylic monomer can be used alone or in combination of two or more thereof.

A functional group reactive with an epoxy group or an isocyanate group may be further introduced into the (meth) acrylic polymer (B). Examples of such a functional group include a hydroxyl group, carboxyl group, amino group, amide group, and a mercapto group. When the (meth)acrylic polymer (B) is produced, it is preferable to use (copolymerize) a monomer having such a functional group.

The weight average molecular weight (Mw) of the (meth) acrylic polymer (B) is 1000≤Mw<30000, preferably 1500≤Mw<20000, and more preferably 2000≤Mw<10000. If 30000≤Mw, there are sometimes the cases where the effect of improving the pressure-sensitive adhesive force of a pressure-sensitive adhesive tape cannot be sufficiently obtained. Conversely, if Mw<1000, there are sometimes the cases where, because the molecular weight is too small, the pressure-sensitive adhesive force or holding property of a pressure-sensitive adhesive tape is decreased.

The weight average molecular weight of the acrylic polymer (D), the acrylic polymer (A), or the (meth)acrylic polymer (B) can be determined by a GPC method in terms of polystyrene. Specifically, the weight average molecular weight can be measured by using HPLC8020 and two TSKgel GMH-Hs (20) as columns, which are made by Tosoh Corporation, and under conditions in which a tetrahydrofuran solvent is used and a flow rate is approximately 0.5 ml/min.

As stated above, the content of the (meth)acrylic polymer (B) is within a range of 1 to 70 parts by mass based on 100 parts by mass of the acrylic polymer (A); however, the content is preferably within a range of 2 to 50 parts by mass, and more preferably within a range of 3 to 40 parts by mass. If the (meth)acrylic polymer (B) is added in an amount more than 70 parts by mass, the elastic modulus of a pressure-sensitive adhesive layer formed of the acrylic pressure-sensitive adhesive composition according to the present embodiment becomes large, and hence there are sometimes the cases where the adhesiveness at a low-temperature is deteriorated or the pressure-sensitive adhesive force is not exerted even at room temperature. Conversely, if the addition amount thereof is less than 1 part by mass, there are sometimes the cases where the effect of adding the (meth)acrylic polymer (B) cannot be obtained.

The glass transition temperature (Tg) of the (meth)acrylic polymer (B) is 0° C.≤Tg≤300° C., preferably 20° C.≤Tg≤300° C., and more preferably 40° C.≤Tg≤300° C. If Tg<20° C., there are sometimes the cases where: the cohesive force of a pressure-sensitive adhesive layer is decreased at room temperature or higher; and accordingly the holding property and the adhesiveness at high-temperature are decreased. The glass transition temperatures of typical materials that can be used as the (meth)acrylic polymer (B) in the present embodiment are shown in Table 4. The glass transition temperatures shown there are nominal values described in documents or catalogs, etc., or values calculated based on the following Equation (4) (Fox Equation).

$$1/Tg = W1/Tg1 + W2/Tg2 + \cdots + Wn/Tgn \quad (4)$$

[wherein, Tg represents the glass transition temperature of the (meth)acrylic polymer (B) (unit: K), Tgi (i=1, 2, *, n) represents the glass transition temperature of a homopolymer that is formed of a monomer i (unit: K), and Wi (i=1, 2, *, n) represents the mass fraction of the monomer i in the whole monomer components]. The above Equation (4) is adopted when the (meth)acrylic polymer (B) is formed of n types of monomer components of monomer 1, monomer 2, ***, monomer n.

TABLE 4

| COMPOSITION OF (METH)ACRYLIC POLYMER (B) | Tg (°C.) | REMARKS |
|---|---|---|
| DCPMA | 175 | VALUES DESCRIBED IN DOCUMENTS, ETC. |
| DCPA | 120 | VALUES DESCRIBED IN DOCUMENTS, ETC. |
| IBXMA | 173 | VALUES DESCRIBED IN DOCUMENTS, ETC. |
| IBXA | 97 | VALUES DESCRIBED IN DOCUMENTS, ETC. |
| CHMA | 66 | VALUES DESCRIBED IN DOCUMENTS, ETC. |
| CHA | 15 | VALUES DESCRIBED IN DOCUMENTS, ETC. |
| IBMA | 48 | VALUES DESCRIBED IN DOCUMENTS, ETC. |
| MMA | 105 | VALUES DESCRIBED IN DOCUMENTS, ETC. |
| ADMA | 250 | VALUES DESCRIBED IN DOCUMENTS, ETC. |
| ADA | 153 | VALUES DESCRIBED IN DOCUMENTS, ETC. |
| CHMA/IBMA = 60/40 | 59 | CALCULATED VALUES (BASED ON Fox EQUATION) |

The abbreviations in Table 4 represent the following compounds.

DCPMA: Dicyclopentanyl Methacrylate
DCPA: Dicyclopentanyl Acrylate
IBXMA: Isobornyl Methacrylate
IBXA: Isobornyl Acrylate
CHMA: Cyclohexyl Methacrylate
CHA: Cyclohexyl Acrylate
IBMA: Isobutyl Methacrylate
MMA: Methyl Methacrylate
ADMA: 1-Adamantyl Methacrylate
ADA: 1-Adamantyl Acrylate
CHMA/IBMA=60/40: Copolymer of 60 parts by mass of CHMA and 40 parts by mass of IBMA The aforementioned preferred aspects of the (meth)acrylic polymer (B) can be summarized as follows.

[1] The glass transition temperature (Tg) of the (meth)acrylic polymer (B) is 0° C.≤Tg≤300° C.

[2] The (meth)acrylic polymer (B) contains, as a monomer unit, a (meth)acrylic monomer having an alicyclic structure in its side chain, such as (meth)acrylic acid cyclohexyl, (meth)acrylic acid isobornyl, and (meth)acrylic acid dicyclopentanyl

[3] An alicyclic hydrocarbon group in the (meth)acrylic monomer having an alicyclic structure has a bridged ring structure.

<Method of Producing (Meth)Acrylic Polymer (B)>

The (meth)acrylic polymer (B) can be produced, for example, by subjecting the (meth)acrylic monomer having the aforementioned structure to polymerization with the use of a solution polymerization method, bulk polymerization method, emulsion polymerization method, suspension polymerization, and block polymerization, etc.

<Method of Adjusting Molecular Weight of (Meth)Acrylic Polymer (B)>

In order to adjust the molecular weight of the (meth)acrylic polymer (B), a chain transfer agent can be used while the polymer (B) is being polymerized. Examples of the chain transfer agent to be used include: compounds having a mercapt group, such as octylmercaptan, dodecyl mercaptan, t-dodecyl mercaptan, and mercaptoethanol; thioglycolic acid, ethyl thioglycolate, propyl thioglycolate, butyl thioglycolate, t-butyl thioglycolate, 2-ethylhexyl thioglycolate, octyl thioglycolate, decyl thioglycolate, dodecyl thioglycolate, thioglycolic acid ester of ethylene glycol, thioglycolic acid ester of neopentyl glycol, and thioglycolic acid ester of pentaerythritol.

The use amount of the chain transfer agent is not particularly limited, but the chain transfer agent is usually contained in an amount within a range of 0.1 to 20 parts by mass, preferably within a range of 0.2 to 15 parts by mass, and more preferably within a range of 0.3 to 10 parts by mass, based on 100 parts by mass of the (meth)acrylic monomer. By adjusting the addition amount of the chain transfer agent, as stated above, a (meth)acrylic polymer (B) having a preferred molecular weight can be obtained. The chain transfer agent can be used alone or in combination of two or more thereof.

[Hydrogenated Tackifying Resin (C)]

Specifically, the hydrogenated tackifying resin (C) can be selected from derivatives obtained by hydrogenating tackifying resins, such as a petroleum resin, terpene resin, coumarone-indene resin, styrene resin, rosin resin, alkylphenol resin, and xylene resin. For example, a hydrogenated petroleum resin can be selected from the group of aromatic systems, dicyclopentadiene systems, aliphatic systems, and aromatic-dicyclopentadiene copolymer systems, etc. In addition, a hydrogenated terpene resin can be selected from the group of a terpene phenol resin and an aromatic terpene resin, etc. Among them, in particular, a petroleum resin or a terpene resin is preferably used.

The softening point of the hydrogenated tackifying resin (C) is preferably within a range of 80 to 200° C., and more preferably within a range of 100 to 200° C. When the softening point thereof is within the range, large cohesive force can be obtained.

As stated above, the content of the hydrogenated tackifying resin (C) is within a range of 1 to 50 parts by mass, based on 100 parts by mass of the acrylic polymer (A); however, the content thereof is preferably within a range of 2 to 40 parts by mass, and more preferably within a range of 3 to 30 parts by mass. If the addition amount of the hydrogenated tackifying resin (C) is more than 50 parts by mass, there are sometimes the cases where the cohesive force is decreased. Conversely, if the addition amount thereof is less than 1 part by mass, there are sometimes the cases where the effect of improving the adhesive force cannot be obtained.

The blending ratio of the (meth)acrylic polymer (B) (oligomer) to the hydrogenated tackifying resin (C) is within a range of 1:0.12 to 1.7, preferably within a range of 1:0.15 to 1.6, and more preferably within a range of 1:0.2 to 1.55 (all are mass ratios). When the blending ratio of the two materials is within the range, the adhesion reliability is preferably improved. This can be assumed that, because the (meth) acrylic polymer (B) serves as a compatibilizing agent for the hydrogenated tackifying resin, the two materials are uniformly dispersed, thereby allowing the adhesion reliability to be improved.

In the surface layer 30 containing: the acrylic polymer (A) as a pressure-sensitive adhesive composition; the (meth)acrylic polymer (B) having a weight average molecular weight (Mw) of 1000≤Mw<30000 as a tackifying resin; and the hydrogenated tackifying resin (C), the ratio of the solvent-insoluble component is within a range of 40 to 90% by mass, and preferably within a range of 45 to 85% by mass. If the ratio of the solvent-insoluble component is less than 40% by mass, the cohesive force becomes insufficient, and accordingly there are sometimes the cases where the holding property cannot be met. Conversely, if the ratio thereof is more than 90% by mass, the cohesive force becomes too large, and accordingly there are sometimes the cases where the pressure-sensitive adhesive force or resistance to resilience is decreased. A method of evaluating the ratio of the solvent-insoluble component will be described later.

(Ratio of Layer Thickness)

The ratio of the thickness of the surface layer 30a (or the surface layer 30b) to the total of the thickness of the core layer 20 and that of the surface layer 30a (or the surface layer 30b) is preferably within a range of 3 to 70%. If the ratio is less than 3%, there are sometimes the cases where desired adhesiveness cannot be obtained. Conversely, if the ratio is more than 70%, there are sometimes the cases where the effects that can be expected when the core layer 20 containing the bubbles (E) is included, such as a stress relaxation property and level-difference absorption property as a pressure-sensitive adhesive tape, cannot be obtained. Although not particularly limited, the total thickness of the acrylic pressure-sensitive adhesive tape 10 (the total of the thickness of the core layer 20 and that of the surface layer 30) is within a range of 0.4 mm to 4.0 mm, and preferably within a range of 0.5 mm to 2.5 mm.

(Method of Forming Multi-Layers)

A method of laminating the core layer 20 and the surface layer 30 is not particularly limited, but, for example, the methods described below can be used.

(1) Method of forming multi-layers by laminating the surface layer 30a on one surface of the core layer 20 and laminating the surface layer 30b on the other surface thereof, after the core layer 20 and the surface layer 30 have been separately cured: this method has the advantage that the accuracy of each layer thickness can be enhanced.

(2) Method of curing the core layer 20 after being coated onto the surface layer 30a (or the surface layer 30b) that has been cured in advance and then by curing the surface layer 30b (or the surface layer 30a) after being coated onto the core layer 20, or method of curing the surface layer 30a (or the surface layer 30b) after being coated onto one surface of the core layer 20 that has been cured in advance and then by curing the surface layer 30b (or the surface layer 30a) after being coated onto the other surface of the core layer 20: in this method, because one layer is coated onto another layer that has been cured, the accuracy of each layer thickness can be enhanced. Further, because one layer can be collectively coated onto another layer that has been cured, production steps can be simplified and production time can be shortened.

(3) Method of curing the surface layer 30 (or the core layer 20) and the core layer 20 (or the surface layer 30) after the core layer 20 (or the surface layer 30) has been sequentially or simultaneously coated onto the coated surface layer 30 (or the core layer 20): in this method, both the surface layer 30 and the core layer 20 can be collectively coated.

For the formation of each layer, a coating roll, such as a roll coater or comma coater, may be used, or a slot die may be used. In particular, in the aforementioned method (3), a multi-layer slot die for coating each layer may also be used.

(Example of Method of Producing Acrylic Pressure-Sensitive Adhesive Tape)

[Preparation of Core Layer Composition]

The aforementioned (meth)acrylic acid alkyl ester and copolymerizable monomer are partially polymerized by mixing the two materials and a polymerization initiator. Thereby, a partial polymer (acrylic polymer syrup) having a predetermined rate of polymerization is produced. Subsequently, a predetermined amount of hollow glass microspheres (product name: CEL-STAR Z-27, made by Tokai Kogyo Co., Ltd.) are added to the acrylic polymer syrup. A precursor of the core layer composition is prepared by adding a fluorochemical surfactant (product name: Surflon S-393, made by AGC SEIMI CHEMICAL CO., LTD.; acrylic copolymer having a polyoxyethylene group and a fluorinated hydrocarbon group in its side chain; MW=8300, 0.5 parts by mass) to the above syrup to which the hollow glass microspheres had been added. In the precursor of the core layer composition, the ratio of the volume of the hollow glass microspheres to the whole volume of the precursor of the core layer composition is, for example, approximately 1.5% by volume.

An apparatus, provided with both a stator on which minute teeth are provided on a disk having a through-hole at its center and a rotor that faces the stator and on which teeth that are as minute as those on the stator are provided on a disk, is prepared. The precursor of the core layer composition is introduced between the teeth on the stator and those on the rotor in the apparatus, and nitrogen gas is introduced into the precursor of the core layer composition through the through-hole, while the rotor is being rotated at high speed. Thereby, the core layer composition is obtained by mixing bubbles into the precursor of the core layer composition. The bubbles are mixed thereinto in an amount of, for example, approximately 20% by volume based on the whole volume of the core layer composition.

[Preparation of Surface Layer Composition]

The surface layer (meth)acrylic polymer (B) is prepared by combining the aforementioned (meth)acrylic monomer, chain transfer agent, polymerization initiator, and, if necessary, a copolymerizable monomer into a predetermined solvent. Subsequently, the aforementioned acrylic polymer syrup (partial polymer), the obtained (meth)acrylic polymer (B), and the hydrogenated tackifying resin (C) are mixed together to obtain a surface layer composition.

[Production of Core Layer]

The core layer composition is coated, with, for example, a roll coater, on one surface of a polyester film (release liner), the one surface having been subjected to a release treatment. Subsequently, a release liner of the same type is attached to the other surface of the coated core layer composition. In this case, the two are attached to each other such that the surface of the release liner, the surface having been subjected to a release treatment, faces the other surface of the core layer composition. Subsequently, ultraviolet rays are radiated by using, for example, a black light lamp. The core layer 20 is produced through the above procedures.

[Production of Surface Layer]

The surface layer composition is coated, with, for example, a roll coater, on one surface of a polyester film (release liner), the one surface having been subjected to a release treatment. Subsequently, a release liner of the same type is attached to the other surface of the coated surface layer composition. In this case, the two are attached to each other such that the surface of the release liner, the surface having been subjected to a release treatment, faces the other surface of the surface layer composition. Subsequently, ultraviolet rays are radiated by using, for example, a black light lamp. The surface layer 30 is produced through the above procedures.

[Attachment of Core Layer/Surface Layer]

The release liner attached to one surface of each of the core layer 20 and the surface layer 30, which have been obtained through the aforementioned procedures, is peeled off such that the pressure-sensitive adhesive surfaces of both of them are attached to each other. Thereby, the acrylic pressure-sensitive adhesive tape 10 in which the surface layer 30 is provided on both sides of the core layer 20 is produced.

The surface layer composition and the core layer composition can contain, as optional components, various additives that are generally used in the field of pressure-sensitive adhesive compositions. Such optional components are exemplified by a plasticizer, softener, filler, colorant (pigment, dye, or the like), antioxidant, leveling agent, stabilizer, and antiseptic, etc. Such additives that are conventionally and publicly known can be used by ordinary methods.

The acrylic pressure-sensitive adhesive tape according to the present embodiment may be a so-called pressure-sensitive adhesive tape comprising a substrate, in which the pressure-sensitive adhesive layer disclosed herein is provided on one or both surfaces of a sheet-shaped substrate (supporting body) in a fixed manner, i.e., without an intention of separating the pressure-sensitive adhesive layer from the substrate. More specifically, examples of the structure of the pressure-sensitive adhesive tape having such a form include, for example: a structure of sheet-shaped substrate/core layer/surface layer; a structure of sheet-shaped substrate/surface layer/core layer/surface layer; a structure of surface layer/core layer/sheet-shaped substrate/core layer/surface layer; and a structure of surface layer/core layer/surface layer/sheet-shaped substrate/surface layer/core layer/surface layer, etc. The concept of the pressure-sensitive adhesive tape described herein can involve objects referred to as a pressure-sensitive adhesive sheet, pressure-sensitive adhesive label, and pressure-sensitive adhesive film, etc.

The aforementioned substrate can be formed of a material appropriately selected, in accordance with the application of the pressure-sensitive adhesive tape, from the group consisting of, for example: plastic films, such as a polypropylene film, ethylene-propylene copolymer film, polyester film, and polyvinylchloride film; foam substrates, such as a polyurethane foam and polyethylene foam; paper, such as craft paper, crepe paper, and Japanese paper; cloth, such as cotton cloth and staple fiber cloth; nonwoven cloth, such as polyester nonwoven fabric and vinylon nonwoven fabric; metallic foils, such as aluminum foil and copper foil; and the like. As the aforementioned plastic films, both of a non-oriented film and an oriented (uniaxially oriented or biaxially oriented) film can be used. The surface of the substrate on which the pressure-sensitive adhesive layer is to be provided may be coated with a primer or be subjected to a surface treatment, such as a corona discharge treatment. The thickness of the substrate can be appropriately selected in accordance with the purpose, but is generally within a range of approximately 10 μm to approximately 500 μm (typically within a range of 10 μm to 200 μm).

The acrylic pressure-sensitive adhesive tape according to the present embodiment can be preferably used in the application in which members made of both various resins including, for example, PE (polyethylene), PP (polypropylene), ABS (acrylonitrile-butadiene-styrene copolymer), SBS (styrene-butadiene-styrene block copolymer), PC (polycarbonate), PVC (vinyl chloride), and an acrylic resin, such as PMMA (polymethyl methacrylate resin), and metals, such as SUS and aluminum, are joined (fixed) to the surfaces of automobiles (coatings of the bodies), house and building materials, and home electronic appliances, etc.

The acrylic pressure-sensitive adhesive tape according to the present embodiment can be preferably used in the applications in which various optical members are attached to, for example, liquid crystal cells, optical polyester films, and touch panel members, etc. Accordingly, the technique described herein includes a laminated body in which the pressure-sensitive adhesive layer containing the acrylic pressure-sensitive adhesive composition is provided on an optical member. This laminated body typically has an aspect in which the pressure-sensitive adhesive layer on the optical member is protected by a release liner. The optical member on which such a pressure-sensitive adhesive layer is provided can be easily attached to the surface, etc., of a plastic cover lens panel, glass, or liquid crystal cell. The optical member is not particularly limited, but can be a polarizing film, phase difference film, transparent conductive film (ITO film), etc. Such an optical member may have a single-layer structure made of the same material, or may have a multiple-layer structure made of a plurality of materials. As a method of forming the pressure-sensitive adhesive layer on the optical member, a method of directly providing the pressure-sensitive adhesive layer thereto or a method of transferring the pressure-sensitive adhesive layer thereto can be appropriately adopted, in the same way as in the case where the pressure-sensitive adhesive layer is formed on a substrate. Typically, the pressure-sensitive adhesive layer formed on a release liner is transferred to the base surface of the optical member.

As stated above, the acrylic pressure-sensitive adhesive tape according to the present embodiment comprises the core layer 20 and the surface layer 30 provided on one or both sides of the core layer 20. The core layer 20 contains the acrylic polymer (D), and the surface layer 30 contains: 100 parts by mass of the acrylic polymer (A) as a pressure-sensitive adhesive composition; and as tackifying resins, 1 to 70 parts by mass of the (meth)acrylic polymer (B) having a weight average molecular weight (Mw) of $1000 \leq Mw < 30000$ and 1 to 50 parts by mass of the hydrogenated tackifying resin (C). Thereby, the adhesiveness of the acrylic pressure-sensitive adhesive tape to an adherend having low polarity can be improved, which finally leads to the fact that the adhesion reliability of the acrylic pressure-sensitive adhesive tape to various adherends each having surface polarity different from the others can be improved, thereby allowing the acrylic pressure-sensitive adhesive tape to be used for various joint applications in the fields of automobiles and home electric appliances, etc.

As the reason for the improvement in the adhesiveness of the acrylic pressure-sensitive adhesive tape to an adherend having low polarity, it can be assumed that the (meth)acrylic polymer (B) is compatibilized with the hydrogenated tackifying resin (C) and also with the acrylic polymer (A). That is, it can be assumed that, as a result of the fact that the (meth)acrylic polymer (B) has served as a compatibilizing agent for the hydrogenated tackifying resin (C) such that both of the two have been uniformly dispersed, the adhesion reliability has been improved.

It can be assumed that, when the (meth)acrylic polymer (B) has an alicyclic structure, the compatibility with the hydrogenated tackifying resin (C) is particularly enhanced due to the alicyclic structure, while the main chain of the (meth)acrylic polymer (B) is compatibilized with the acrylic polymer.

The surface layer in the acrylic pressure-sensitive adhesive tape according to the present embodiment can be designed so as not to contain an acidic group in the monomer that forms the acrylic polymer (A). In this case, an acrylic pressure-sensitive adhesive tape can be obtained, in which an influence of metallic corrosion that is caused by an acidic group, etc., has been reduced. Even when the monomer that forms the acrylic polymer (A) contains an acidic group, the adhesiveness of the acrylic pressure-sensitive adhesive tape can be similarly improved.

Although both the surface layers 30a and 30b are provided on both sides of the core layer 20 in the acrylic pressure-sensitive adhesive tape 10 according to the aforementioned embodiments, either of the surface layers 30a and 30b may only be provided on the core layer 20. In addition, although the core layer 20 contains the acrylic polymer (D) as a pressure-sensitive adhesive composition, the fine particle (E), and the bubble (F), but may contain at least the acrylic polymer (D).

EXAMPLE 2

Hereinafter, the present embodiment will be described in detail based on Examples, but the present invention should not be limited at all by these Examples.

Components of the surface layer compositions in the acrylic pressure-sensitive adhesive tapes according to Examples 2-1 to 2-12 and Comparative Examples 2-1 to 2-7.

TABLE 5

| | COMPOSITION OF 100 PARTS OF ACRYLIC POLYMER (B) COMPOSITION | COMPOSITION OF (METH) ACRYLIC POLYMER (C) | | | |
|---|---|---|---|---|---|
| | | COMPOSITION | MOLECULAR WEIGHT | Tg (° C.) | PARTS |
| EXAMPLE 2-1 | 2EHA/NVP = 86/14 | CHMA/IBMA = 60/40 | 4,000 | 59 | 8 |
| EXAMPLE 2-2 | 2EHA/NVP = 86/14 | CHMA/IBMA = 60/40 | 4,000 | 59 | 15 |
| EXAMPLE 2-3 | 2EHA/NVP = 86/14 | CHMA/IBMA = 60/40 | 4,000 | 59 | 20 |
| EXAMPLE 2-4 | 2EHA/NVP = 86/14 | CHMA/IBMA = 60/40 | 4,000 | 59 | 12 |
| EXAMPLE 2-5 | 2EHA/NVP = 86/14 | CHMA/IBMA = 60/40 | 4,000 | 59 | 12 |
| EXAMPLE 2-6 | 2EHA/NVP/HEAA = 86/13/1 | CHMA/IBMA = 60/40 | 4,000 | 59 | 12 |
| EXAMPLE 2-7 | 2EHA/NVP/HEAA = 86/13/1 | CHMA/IBMA = 60/40 | 4,000 | 59 | 12 |
| EXAMPLE 2-8 | 2EHA/NVP = 86/14 | DCPMA | 4,600 | 175 | 12 |
| EXAMPLE 2-9 | 2EHA/AA = 94/6 | CHMA/IBMA = 60/40 | 4,000 | 59 | 12 |
| EXAMPLE 2-10 | 2EHA/AA = 94/6 | CHMA/IBMA = 60/40 | 4,000 | 59 | 12 |
| EXAMPLE 2-11 | 2EHA/AA = 94/6 | CHMA/IBMA = 60/40 | 4,000 | 59 | 12 |
| EXAMPLE 2-12 | 2EHA/AA = 94/6 | DCPMA(LOW) | 3,000 | 175 | 12 |

TABLE 5-continued

| | | | | | |
|---|---|---|---|---|---|
| COMPARATIVE EXAMPLE 2-1 | 2EHA/NVP = 86/14 | — | — | — | — |
| COMPARATIVE EXAMPLE 2-2 | 2EHA/AA = 94/6 | — | — | — | — |
| COMPARATIVE EXAMPLE 2-3 | 2EHA/NVP = 86/14 | CHMA/IBMA = 60/40 | 4,000 | 59 | 20 |
| COMPARATIVE EXAMPLE 2-4 | 2EHA/AA = 94/6 | CHMA/IBMA = 60/40 | 4,000 | 59 | 20 |
| COMPARATIVE EXAMPLE 2-5 | 2EHA/NVP = 86/14 | — | — | — | — |
| COMPARATIVE EXAMPLE 2-6 | 2EHA/AA = 94/6 | — | — | — | — |
| COMPARATIVE EXAMPLE 2-7 | 2EHA/NVP = 86/14 | CHMA/IBMA = 60/40 | 4,000 | 59 | 12 |

| | HYDROGENATED TACKIFYING RESIN (D) | | | PARTS OF CROSS-LINKING AGENT (TMPTA) | RATIO OF SOLVENT-INSOLUBLE COMPONENT [% BY MASS] |
|---|---|---|---|---|---|
| | TYPE | SOFTENING POINT (° C.) | PARTS | | |
| EXAMPLE 2-1 | ALCON P125 | 125 | 12 | 0.12 | 69.8 |
| EXAMPLE 2-2 | ALCON P125 | 125 | 15 | 0.18 | 67.7 |
| EXAMPLE 2-3 | ALCON P125 | 125 | 5 | 0.2 | 71.3 |
| EXAMPLE 2-4 | ALCON P125 | 125 | 8 | 0.15 | 71.9 |
| EXAMPLE 2-5 | ALCON P100 | 100 | 8 | 0.15 | 71.1 |
| EXAMPLE 2-6 | CLEARON P135 | 135 | 8 | 0.15 | 61.1 |
| EXAMPLE 2-7 | I-MARV P125 | 125 | 8 | 0.12 | 75.0 |
| EXAMPLE 2-8 | ALCON P125 | 125 | 8 | 0.1 | 63.4 |
| EXAMPLE 2-9 | ALCON P125 | 125 | 8 | 0.14 | 67.3 |
| EXAMPLE 2-10 | I-MARV P125 | 125 | 8 | 0.11 | 62.5 |
| EXAMPLE 2-11 | I-MARV P140 | 140 | 8 | 0.11 | 65.8 |
| EXAMPLE 2-12 | ALCON P125 | 125 | 8 | 0.14 | 65.7 |
| COMPARATIVE EXAMPLE 2-1 | — | — | — | (HDDA) 0.045 | 77.4 |
| COMPARATIVE EXAMPLE 2-2 | — | — | — | (HDDA) 0.07 | 75.2 |
| COMPARATIVE EXAMPLE 2-3 | — | — | — | 0.12 | 73.4 |
| COMPARATIVE EXAMPLE 2-4 | — | — | — | 0.14 | 67.3 |
| COMPARATIVE EXAMPLE 2-5 | ALCON P125 | 125 | 20 | 0.12 | 71.7 |
| COMPARATIVE EXAMPLE 2-6 | ALCON P125 | 125 | 20 | 0.15 | 67.3 |
| COMPARATIVE EXAMPLE 2-7 | (NON-HYDROGENATED TYPE) MIGHTY ACE K-125 | 125 | 8 | 0.25 | 74.7 |

The abbreviations in Table 5 represent the following compounds.

2EHA: 2-Ethylhexyl Acrylate
NVP: N-Vinyl-2-Pyrrolidone
HEAA: N-Hydroethyl Acrylamide
AA: Acrylic Acid
DCPMA: Dicyclopentanyl Methacrylate
DCPMA (Low): Dicyclopentanyl Methacrylate having a lower degree of polymerization than that of DCPMA (Example 2-8)
CHMA: Cyclohexyl Methacrylate
IBMA: Isobutyl Methacrylate
TMPTA: Trimethylolpropane Triacrylate
HDDA: 1,6-Hexanediol Diacrylate (Measurement of Ratio of Solvent-Insoluble Component)

A ratio of a solvent-insoluble component was determined in the following way: after 0.1 g of a surface layer was sampled and precisely weighed (mass before dipping), the sampled surface layer was dipped in 50 ml of ethyl acetate at room temperature (20 to 25° C.) for 1 week; a solvent (ethyl acetate) insoluble component was taken out to be dried at 130° C. for 2 hours and then weighed (mass after dipping and drying); and the ratio was calculated by using an equation for calculating a "ratio of solvent-insoluble component (mass %)=[(mass after dipping and drying)/(mass before dipping)]× 100".

(Preparation of Acrylic Polymer Syrup 1 (2EHA/NVP=86/14) as (A) Component)

Eighty six parts by mass of 2-ethylhexyl acrylate (2EHA), 14 parts by mass of N-vinyl-2-pyrrolidone (NVP), 0.05 parts by mass of a photo-polymerization initiator (product name: IRGACURE 184, made by BASF), and 0.05 parts by mass of a photo-polymerization initiator (product name: IRGACURE 651, made by BASF) were placed into a 4-neck flask. A partial polymer (acrylic polymer syrup 1) having a rate of polymerization of approximately 11% by mass was obtained by exposing the mixture to UV rays under a nitrogen atmosphere such that the mixture was partially photo-polymerized.

(Preparation of Acrylic Polymer Syrup 2 (2EHA/AA=94/6) as (A) Component)

Ninety four parts by mass of 2-ethylhexyl acrylate (2EHA), 6 parts by mass of acrylic acid (AA), 0.05 parts by mass of a photo-polymerization initiator (product name: IRGACURE 184, made by BASF), and 0.05 parts by mass of a photo-polymerization initiator (product name: IRGACURE 651, made by BASF) were placed into a 4-neck flask. A partial polymer (acrylic polymer syrup 2) having a rate of polymerization of approximately 8% by mass was obtained by exposing the mixture to UV rays under a nitrogen atmosphere such that the mixture was partially photo-polymerized.

(Preparation of Acrylic Polymer Syrup 3 (2EHA/NVP/HEAA=86/13/1) as (A) Component)

Eighty six parts by mass of 2-ethylhexyl acrylate (2EHA), 13 parts by mass of N-vinyl-2-pyrrolidone (NVP), 1 part by mass of N-hydroxyethyl acrylamide (HEAA), 0.05 parts by mass of a photo-polymerization initiator (product name: IRGACURE 184, made by BASF), and 0.05 parts by mass of a photo-polymerization initiator (product name: IRGACURE 651, made by BASF) were placed into a 4-neck flask. A partial polymer (acrylic polymer syrup 3) having a rate of polymerization of approximately 10% by mass was obtained by exposing the mixture to UV rays under a nitrogen atmosphere such that the mixture was partially photo-polymerized.

(Preparation of (Meth)Acrylic Polymer 1 (CHMA/IBMA=60/40) as (B) Component)

After cyclohexyl methacrylate (CHMA, 60 parts by mass), isobutyl methacrylate (IBMA, 40 parts by mass), and thioglycolic acid (4.0 parts by mass) were combined, dissolved oxygen was removed by blowing nitrogen gas thereinto. After the mixture was heated to 90° C., PERHEXYL O (made by NOF CORPORATION, 0.005 parts by mass) and PERHEXYL D (made by NOF CORPORATION, 0.01 parts by mass) were mixed. After being further stirred at 90° C. for 1 hour, the mixture was heated to 150° C. in 1 hour and stirred at the temperature for 1 hour. Subsequently, the mixture was heated to 170° C. in 1 hour and stirred at the temperature for 60 minutes.

The pressure under which the mixture was placed was reduced at 170° C. and the mixture was stirred for 1 hour to remove remaining monomers, thereby allowing (meth)acrylic polymer 1 to be obtained. The glass transition temperature of the obtained (meth)acrylic polymer 1 was 59° C. (calculated by Fox Equation) and the weight average molecular weight thereof was 4000.

(Preparation of (Meth)Acrylic Polymer 2 (DCPMA) as (B) Component)

One hundred parts by mass of toluene, 100 parts by mass of dicyclopentanyl methacrylate (DCPMA) (product name: FA-513M, made by Hitachi Chemical Co., Ltd.), and 3 parts by mass of thioglycolic acid (GSH acid), as a chain transfer agent, were placed into a 4-neck flask. After they were stirred under a nitrogen atmosphere at 70° C. for 1 hour, 0.2 parts by mass of azobisisobutyronitrile were placed therein as a thermal polymerization initiator to react with them at 70° C. for 2 hours, and subsequently they were reacted together at 80° C. for 2 hours. Thereafter, the reaction liquid was placed under a temperature atmosphere of 130° C. to dry and remove the toluene, chain transfer agent, and unreacted monomer, thereby allowing a solid (meth)acrylic polymer 2 to be obtained. The glass transition temperature of the obtained (meth)acrylic polymer 2 was 175° C. and the weight average molecular weight thereof was 4600.

(Preparation of (Meth)Acrylic Polymer 3 (DCPMA (Low)) as (B) Component)

One hundred parts by mass of toluene, 100 parts by mass of dicyclopentanyl methacrylate (DCPMA) (product name: FA-513M, made by Hitachi Chemical Co., Ltd.), and 5 parts by mass of thioglycolic acid (GSH acid), as a chain transfer agent, were placed into a 4-neck flask. After they were stirred under a nitrogen atmosphere at 75° C. for 1 hour, 0.2 parts by mass of azobisisobutyronitrile were placed therein as a thermal polymerization initiator to react with them at 75° C. for 2 hours, and subsequently they were reacted together at 80° C. for 2 hours. Thereafter, the reaction liquid was placed under a temperature atmosphere of 130° C. to dry and remove the toluene, chain transfer agent, and unreacted monomer, thereby allowing a solid (meth)acrylic polymer 3 to be obtained. The glass transition temperature of the obtained (meth)acrylic polymer 3 was 175° C. and the weight average molecular weight thereof was 3000.

(Preparation of Acrylic Polymer Syrup 4 (2EHA/AA=90/10) as (D) Component)

A monomer mixture formed of 90 parts by mass of 2-ethylhexyl acrylate (2EHA) and 10 parts by mass of acrylic acid (AA) was combined with 0.05 parts by mass of a photo-polymerization initiator (product name: IRGACURE 651, made by BASF) and 0.05 parts by weight of a photo-polymerization initiator (product name: IRGACURE 184, made by BASF). A partial polymer (acrylic polymer syrup 4) was obtained by radiating UV rays before the viscosity of the mixture (BH viscometer, No. 5 rotor, 10 rpm, measurement temperature: 30° C.) became 15 Pa*s.

EXAMPLE 2-1

(Preparation of Surface Layer Composition)

After 8 parts by mass of the aforementioned (meth)acrylic polymer 1, 12 parts by mass of Alcon P125 (hydrogenated petroleum resin, softening point: 125° C., made by ARAKAWA CHEMICAL INDUSTRIES, LTD.), and 0.12 parts by mass of trimethylolpropane triacrylate were added to 100 parts by mass of the aforementioned acrylic polymer syrup 1, these were uniformly mixed together to prepare a surface layer composition.

(Production of Surface Layer)

A coated layer having a final thickness of 50 μm was formed by coating the aforementioned surface layer composition on one surface of a polyester film having a thickness of 38 μm (product name: Diafoil MRF, made by Mitsubishi Plastics Inc.), the one surface having been subjected to a release treatment with silicone. Subsequently, the surface of the coated surface layer composition was covered with one surface of a polyester film having a thickness of 38 μm (product name: Diafoil MRN, made by Mitsubishi Plastics Inc.), the one surface having been subjected to a release treatment with silicone, so that the one surface of the film was located near to the coated layer. Thereby, oxygen was blocked from the coated layer of the surface layer composition (surface layer pressure-sensitive adhesive layer). The surface layer pressure-sensitive adhesive layer sheet thus obtained was irradiated, for 360 seconds, with UV rays with an illumination intensity of 5 mW/cm$^2$ (measured by TOPCON UVR-T1 having a maximum sensitivity at approximately 350 nm), the UV rays being created by using a black light lamp (made by TOSHIBA CORPORATION). A surface layer made of an acrylic pressure-sensitive adhesive layer having a thickness of 50 μm was obtained in this way. The ratio of the solvent-insoluble component of the surface layer pressure-sensitive adhesive layer was 69.8% by mass. The polyester film covering each of the surfaces of the pressure-sensitive adhesive layer functions as a release liner.

[Preparation of Core Layer Composition]

After 0.08 parts by mass of 1,6-hexanediol diacrylate were added to 100 parts by mass of the aforementioned acrylic polymer syrup 4, hollow glass microspheres (product name: CEL-STAR Z-27, made by Tokai Kogyo Co., Ltd.) were further added to the syrup, the amount of the microspheres being 9.5 parts by mass based on the mass of the syrup.

A precursor of the core layer composition was prepared by adding a fluorochemical surfactant (product name: Surflon S-393, made by AGC SEIMI CHEMICAL CO., LTD.; acrylic copolymer having a polyoxyethylene group and a fluorinated hydrocarbon group in its side chain; MW=8300, 0.5 parts by mass) to the above syrup to which the hollow glass microspheres had been added. In the precursor of the core layer composition, the ratio of the volume of the hollow glass microspheres to the whole volume of the precursor of the core layer composition was approximately 26% by volume.

An apparatus, provided with both a stator on which minute teeth are provided on a disk having a through-hole at its center and a rotor that faces the stator and on which teeth that are as minute as those on the stator are provided on a disk, was prepared. The obtained precursor of the core layer composition was introduced between the teeth on the stator and those on the rotor in the apparatus. Thereafter, nitrogen gas was introduced into the precursor of the core layer composition through the through-hole, while the rotor was being rotated at high speed, in order to mix bubbles into the precursor thereof. Thereby, the core layer composition was obtained. The bubbles were mixed thereinto in an amount of approximately 20% by volume based on the whole volume of the core layer composition.

[Production of Core Layer]

The obtained core layer composition was coated, with a roll coater, on one surface of a polyester film (release liner made of polyester) having a thickness of 38 µm, the one surface having been subjected to a release treatment, so that the thickness of the obtained core layer composition was 1.2 mm. Subsequently, a release liner of the same type, made of polyester, was attached to the surface of the coated core layer composition such that one surface of the release liner, the surface having been subjected to a release treatment, was located near to the core layer composition. Subsequently, ultraviolet rays with an illumination intensity of 5 mW/cm$^2$ were radiated, by using a black light lamp, from both the surfaces for 3 minutes. A core layer made of an acrylic pressure-sensitive adhesive layer having a thickness of 1.2 mm was obtained.

(Attachment of Core Layer/Surface Layer)

The release liner attached to the one surface of each of the core layer and the surface layer, which had been obtained through the aforementioned procedures, was peeled off such that the pressure-sensitive adhesive surfaces of both of them were attached to each other. Thereby, the acrylic pressure-sensitive adhesive tape according to Example 2-1, having the structure of surface layer/core layer/surface layer, was obtained.

EXAMPLE 2-2

An acrylic pressure-sensitive adhesive tape was obtained in the same way as in Example 2-1, except that 15 parts by mass of the aforementioned (meth)acrylic polymer 1, 15 parts by mass of Alcon P125 (hydrogenated petroleum resin, softening point: 125° C., made by ARAKAWA CHEMICAL INDUSTRIES, LTD.), and 0.18 parts by mass of trimethylolpropane triacrylate were added to 100 parts by mass of the aforementioned acrylic polymer syrup 1. The ratio of the solvent-insoluble component of the obtained surface layer pressure-sensitive adhesive layer was 67.7% by mass.

EXAMPLE 2-3

An acrylic pressure-sensitive adhesive tape was obtained in the same way as in Example 2-1, except that 20 parts by mass of the aforementioned (meth)acrylic polymer 1, 5 parts by mass of Alcon P125 (hydrogenated petroleum resin, softening point: 125° C., made by ARAKAWA CHEMICAL INDUSTRIES, LTD.), and 0.2 parts by mass of trimethylolpropane triacrylate were added to 100 parts by mass of the aforementioned acrylic polymer syrup 1. The ratio of the solvent-insoluble component of the obtained surface layer pressure-sensitive adhesive layer was 71.3% by mass.

EXAMPLE 2-4

An acrylic pressure-sensitive adhesive tape was obtained in the same way as in Example 2-1, except that 12 parts by mass of the aforementioned (meth)acrylic polymer 1, 8 parts by mass of Alcon P125 (hydrogenated petroleum resin, softening point: 125° C., made by ARAKAWA CHEMICAL INDUSTRIES, LTD.), and 0.15 parts by mass of trimethylolpropane triacrylate were added to 100 parts by mass of the aforementioned acrylic polymer syrup 1. The ratio of the solvent-insoluble component of the obtained surface layer pressure-sensitive adhesive layer was 71.9% by mass.

EXAMPLE 2-5

An acrylic pressure-sensitive adhesive tape was obtained in the same way as in Example 2-1, except that 12 parts by mass of the aforementioned (meth)acrylic polymer 1, 8 parts by mass of Alcon P100 (hydrogenated petroleum resin, softening point: 100° C., made by ARAKAWA CHEMICAL INDUSTRIES, LTD.), and 0.15 parts by mass of trimethylolpropane triacrylate were added to 100 parts by mass of the aforementioned acrylic polymer syrup 1. The ratio of the solvent-insoluble component of the obtained surface layer pressure-sensitive adhesive layer was 71.1% by mass.

EXAMPLE 2-6

An acrylic pressure-sensitive adhesive tape was obtained in the same way as in Example 2-1, except that 12 parts by mass of the aforementioned (meth)acrylic polymer 1, 8 parts by mass of Clearon P135 (hydrogenated terpene resin, softening point: 135° C., made by YASUHARA CHEMICAL CO., LTD.), and 0.15 parts by mass of trimethylolpropane triacrylate were added to 100 parts by mass of the aforementioned acrylic polymer syrup 3. The ratio of the solvent-insoluble component of the obtained surface layer pressure-sensitive adhesive layer was 61.1% by mass.

EXAMPLE 2-7

An acrylic pressure-sensitive adhesive was obtained in the same way as in Example 2-1, except that 12 parts by mass of the aforementioned (meth)acrylic polymer 1, 8 parts by mass of I-MARV P125 (hydrogenated petroleum resin (dicyclopentadiene aromatic copolymer), softening point: 125° C., made by Idemitsu Kosan Co., Ltd.), and 0.12 parts by mass of trimethylolpropane triacrylate were added to 100 parts by mass of the aforementioned acrylic polymer syrup 3. The ratio of the solvent-insoluble component of the obtained surface layer pressure-sensitive adhesive layer was 75.0% by mass.

EXAMPLE 2-8

An acrylic pressure-sensitive adhesive tape was obtained in the same way as in Example 2-1, except that 12 parts by mass of the aforementioned (meth)acrylic polymer 2, 8 parts by mass of Alcon P125 (hydrogenated petroleum resin, softening point: 125° C., made by ARAKAWA CHEMICAL INDUSTRIES, LTD.), and 0.1 parts by mass of trimethylolpropane triacrylate were added to 100 parts by mass of the aforementioned acrylic polymer syrup 1. The ratio of the solvent-insoluble component of the obtained surface layer pressure-sensitive adhesive layer was 63.4% by mass.

EXAMPLE 2-9

An acrylic pressure-sensitive adhesive tape was obtained in the same way as in Example 2-1, except that 12 parts by mass of the aforementioned (meth)acrylic polymer 1, 8 parts by mass of Alcon P125 (hydrogenated petroleum resin, softening point: 125° C., made by ARAKAWA CHEMICAL INDUSTRIES, LTD.), and 0.14 parts by mass of trimethylolpropane triacrylate were added to 100 parts by mass of the aforementioned acrylic polymer syrup 2. The ratio of the solvent-insoluble component of the obtained surface layer pressure-sensitive adhesive layer was 67.3% by mass.

EXAMPLE 2-10

An acrylic pressure-sensitive adhesive tape was obtained in the same way as in Example 2-1, except that 12 parts by mass of the aforementioned (meth)acrylic polymer 1, 8 parts by mass of I-MARV P125 (hydrogenated petroleum resin (dicyclopentadiene aromatic copolymer), softening point: 125° C., made by Idemitsu Kosan Co., Ltd.), and 0.11 parts by mass of trimethylolpropane triacrylate were added to 100 parts by mass of the aforementioned acrylic polymer syrup 2. The ratio of the solvent-insoluble component of the obtained surface layer pressure-sensitive adhesive layer was 62.5% by mass.

EXAMPLE 2-11

An acrylic pressure-sensitive adhesive tape was obtained in the same way as in Example 2-1, except that 12 parts by mass of the aforementioned (meth)acrylic polymer 1, 8 parts by mass of I-MARV P140 (hydrogenated petroleum resin (dicyclopentadiene aromatic copolymer), softening point: 140° C., made by Idemitsu Kosan Co., Ltd.), and 0.11 parts by mass of trimethylolpropane triacrylate were added to 100 parts by mass of the aforementioned acrylic polymer syrup 2. The ratio of the solvent-insoluble component of the obtained surface layer pressure-sensitive adhesive layer was 65.8% by mass.

EXAMPLE 2-12

An acrylic pressure-sensitive adhesive tape was obtained in the same way as in Example 2-1, except that 12 parts by mass of the aforementioned (meth)acrylic polymer 3, 8 parts by mass of Alcon P125 (hydrogenated petroleum resin, softening point: 125° C., made by ARAKAWA CHEMICAL INDUSTRIES, LTD.), and 0.14 parts by mass of trimethylolpropane triacrylate were added to 100 parts by mass of the aforementioned acrylic polymer syrup 2. The ratio of the solvent-insoluble component of the obtained surface layer pressure-sensitive adhesive layer was 65.7% by mass.

COMPARATIVE EXAMPLE 2-1

An acrylic pressure-sensitive adhesive tape was obtained in the same way as in Example 2-1, except that 0.045 parts by mass of 1,6-hexanediol diacrylate were added to 100 parts by mass of the aforementioned acrylic polymer syrup 1. The ratio of the solvent-insoluble component of the obtained surface layer pressure-sensitive adhesive layer was 77.4% by mass.

COMPARATIVE EXAMPLE 2-2

An acrylic pressure-sensitive adhesive tape was obtained in the same way as in Example 2-1, except that 0.07 parts by mass of 1,6-hexanediol diacrylate were added to 100 parts by mass of the aforementioned acrylic polymer syrup 2. The ratio of the solvent-insoluble component of the obtained surface layer pressure-sensitive adhesive layer was 75.2% by mass.

COMPARATIVE EXAMPLE 2-3

An acrylic pressure-sensitive adhesive tape was obtained in the same way as in Example 2-1, except that 20 parts by mass of the aforementioned (meth)acrylic polymer 1 and 0.12 parts by mass of trimethylolpropane triacrylate were added to 100 parts by mass of the aforementioned acrylic polymer syrup 1. The ratio of the solvent-insoluble component of the obtained surface layer pressure-sensitive adhesive layer was 73.4% by mass.

COMPARATIVE EXAMPLE 2-4

An acrylic pressure-sensitive adhesive tape was obtained in the same way as in Example 2-1, except that 20 parts by mass of the aforementioned (meth)acrylic polymer 1 and 0.14 parts by mass of trimethylolpropane triacrylate were added to 100 parts by mass of the aforementioned acrylic polymer syrup 2. The ratio of the solvent-insoluble component of the obtained surface layer pressure-sensitive adhesive layer was 67.3% by mass.

COMPARATIVE EXAMPLE 2-5

An acrylic pressure-sensitive adhesive tape was obtained in the same way as in Example 2-1, except that 20 parts by mass of Alcon P125 (hydrogenated petroleum resin, softening point: 125° C., made by ARAKAWA CHEMICAL INDUSTRIES, LTD.) and 0.12 parts by mass of trimethylolpropane triacrylate were added to 100 parts by mass of the aforementioned acrylic polymer syrup 1. The ratio of the solvent-insoluble component of the obtained surface layer pressure-sensitive adhesive layer was 71.7% by mass.

COMPARATIVE EXAMPLE 2-6

An acrylic pressure-sensitive adhesive tape was obtained in the same way as in Example 2-1, except that 20 parts by mass of Alcon P125 (hydrogenated petroleum resin, softening point: 125° C., made by ARAKAWA CHEMICAL INDUSTRIES, LTD.) and 0.15 parts by mass of trimethylolpropane triacrylate were added to 100 parts by mass of the aforementioned acrylic polymer syrup 2. The ratio of the solvent-insoluble component of the obtained surface layer pressure-sensitive adhesive layer was 67.3% by mass.

COMPARATIVE EXAMPLE 2-7

An acrylic pressure-sensitive adhesive tape was obtained in the same way as in Example 2-1, except that 12 parts by mass of the aforementioned (meth)acrylic polymer 1, 8 parts by mass of Mighty Ace K-125 (terpene phenol resin, softening point: 125° C., made by YASUHARA CHEMICAL CO., LTD.), and 0.25 parts by mass of trimethylolpropane triacrylate were added to 100 parts by mass of the aforementioned acrylic polymer syrup 1. The ratio of the solvent-insoluble component of the obtained surface layer pressure-sensitive adhesive layer was 74.7% by mass.
(Test Method)
[180° Peeling-Off Pressure-Sensitive Adhesive Force Test]

After the release liner on one side of the acrylic pressure-sensitive adhesive tape according to each of Examples and Comparative Examples was peeled off, a polyethylene terephthalate film having a thickness of 50 μm on which a primer treatment has been performed was attached thereto. The obtained tape was cut into a piece having a width of 25 mm, which was used as a test specimen. In addition, a polypropylene plate (part number: 1600, made by Takiron Co., Ltd.) and an acrylic plate (ACRYLITE, made by Mitsubishi Rayon Co., Ltd.), which had been cleaned with isopropyl alcohol and had a thickness of 2 mm, were prepared. After the release liner (polyester film) on the other side thereof was peeled off, the pressure-sensitive adhesive surface on the surface layer side was attached to the polypropylene plate and acrylic plate by one way pressure bonding with the use of a 5-kg roller. After the acrylic pressure-sensitive adhesive tape was attached to each of the polypropylene plate and the acrylic plate, the sample was left uncontrolled under a 23° C.-environment for 30 minutes. Thereafter, pressure-sensitive adhesive force (resistance force) (unit: N/25 mm) of the acrylic pressure-sensitive adhesive tape to an adherend was measured by peeling off the other end of the tape in the 180° peeling-off direction at a speed of 50 mm/min. The case where the pressure-sensitive adhesive force to each of the polypropylene plate and the acrylic plate was 40 N/25 mm or more was evaluated as good (°), while the case where the pressure-sensitive adhesive force was less than 40 N/25 mm was evaluated as bad (x). Results of the measurement are shown in Table 6.
[Resistance to Resilience Test]

The acrylic pressure-sensitive adhesive tape according to each of Examples and Comparative Examples was cut into a piece having a width of 10 mm and a length of 90 mm. The release liner on one side of the acrylic pressure-sensitive adhesive tape according to each of Examples and Comparative Examples was peeled off and attached to a clean aluminum plate having a thickness of 0.5 mm, a width of 10 mm, and a length of 90 mm, which was used as a test specimen. Subsequently, the test specimen was curved so as to have a curvature of R=50 mm by making the test specimen near to the aluminum plate follow a cylinder. Thereafter, the release liner (polyester film) on the other side thereof was peeled off, and then the test specimen was laminated onto the aforementioned polypropylene plate. After the test specimen, in the state of being laminated onto the polypropylene plate, was left uncontrolled at room temperature (25° C.) for 7 hours, the distance created by pop-off of the acrylic pressure-sensitive adhesive tape, i.e., the distance between the surface of the polypropylene plate and the acrylic pressure-sensitive adhesive tape (average of the heights at both ends) (unit: mm) was measured. The case where the distance of the pop-off was 5 mm or less was evaluated as good (°), while the case where the distance thereof was more than 5 mm was evaluated as bad (x). Results of the measurement are shown in Table 6. Herein, the values shown in Table 6 are average values with respect to arbitrary multiple points.
[Holding Property Test]

After the release liner on one side of the acrylic pressure-sensitive adhesive tape according to each of Examples and Comparative Examples was peeled off, a polyethylene terephthalate film having a thickness of 50 μm on which a primer treatment had been performed was attached. The obtained tape was cut into a piece having a width of 10 mm, which was used as a test specimen. After the release liner (polyester film) on the other side thereof was peeled off, the pressure-sensitive adhesive surface of the test specimen having the area of 10 mm in width×20 mm in length was attached to a bakelite plate that had been cleaned with toluene, and the test specimen was left uncontrolled under a 60° C.-environment for 30 minutes. Thereafter, a weight was hung from one end of the test specimen such that a 500-g load was applied in the shear direction, and the test specimen, in the state of the weight being hung, was left uncontrolled under a 60° C.-environment for 1 hour, and a holding property was evaluated. The case where the test specimen had not dropped was evaluated as good (°), while the case where the test specimen had dropped was evaluated as bad (x). Results of the measurement are shown in Table 6.

TABLE 6

| | 180° PEELING-OFF PRESSURE-SENSITIVE ADHESIVE FORCE TEST [N/25 min] | | | | RESISTANCE TO | |
| | PP | | ACRYLIC | | RESILIENCE TEST | HOLDING |
| | INITIAL CONDITION | NORMAL CONDITION | INITIAL CONDITION | NORMAL CONDITION | DISTANCE OF POP-OFF [mm] | PROPERTY TEST |
|---|---|---|---|---|---|---|
| EXAMPLE 2-1 | 62.0(○) | 68.9(○) | 61.8(○) | 70.2(○) | 2.9(○) | ○ |
| EXAMPLE 2-2 | 66.3(○) | 68.8(○) | 61.2(○) | 66.6(○) | 1.1(○) | ○ |
| EXAMPLE 2-3 | 41.8(○) | 67.1(○) | 58.7(○) | 65.2(○) | 0.9(○) | ○ |
| EXAMPLE 2-4 | 47.9(○) | 66.8(○) | 65.3(○) | 57.7(○) | 2.4(○) | ○ |
| EXAMPLE 2-5 | 41.8(○) | 69.1(○) | 55.8(○) | 53.2(○) | 2.2(○) | ○ |
| EXAMPLE 2-6 | 52.4(○) | 68.8(○) | 56.8(○) | 65.6(○) | 3.3(○) | ○ |
| EXAMPLE 2-7 | 42.0(○) | 63.4(○) | 62.8(○) | 52.6(○) | 2.5(○) | ○ |
| EXAMPLE 2-8 | 60.7(○) | 75.4(○) | 60.3(○) | 71.2(○) | 0.8(○) | ○ |
| EXAMPLE 2-9 | 44.5(○) | 64.5(○) | 64.3(○) | 63.6(○) | 0.1(○) | ○ |
| EXAMPLE 2-10 | 43.3(○) | 48.3(○) | 58.2(○) | 64.2(○) | 3.5(○) | ○ |
| EXAMPLE 2-11 | 41.0(○) | 48.1(○) | 58.3(○) | 61.8(○) | 3.5(○) | ○ |
| EXAMPLE 2-12 | 57.0(○) | 74.0(○) | 63.2(○) | 70.2(○) | 1.3(○) | ○ |
| COMPARATIVE EXAMPLE 2-1 | 18.3(x) | 17(x) | 44.3(○) | 31(x) | 9.6(x) | ○ |
| COMPARATIVE EXAMPLE 2-2 | 17.9(x) | 18(x) | 37.8(x) | 41.0(○) | 8.8(x) | ○ |

TABLE 6-continued

| | 180° PEELING-OFF PRESSURE-SENSITIVE ADHESIVE FORCE TEST [N/25 min] | | | | RESISTANCE TO | |
|---|---|---|---|---|---|---|
| | PP | | ACRYLIC | | RESILIENCE TEST | HOLDING |
| | INITIAL CONDITION | NORMAL CONDITION | INITIAL CONDITION | NORMAL CONDITION | DISTANCE OF POP-OFF [mm] | PROPERTY TEST |
| COMPARATIVE EXAMPLE 2-3 | 34.1(x) | 34.3(x) | 59.9(o) | 49.7(o) | 3.2(o) | o |
| COMPARATIVE EXAMPLE 2-4 | 33.1(x) | 33.6(x) | 61.8(o) | 64.0(o) | 2.0(o) | o |
| COMPARATIVE EXAMPLE 2-5 | 52.4(o) | 67.1(o) | 55.6(o) | 48.8(o) | 7.8(x) | o |
| COMPARATIVE EXAMPLE 2-6 | 32.4(x) | 40.5(o) | 54.2(o) | 61.4(o) | 6.3(x) | o |
| COMPARATIVE EXAMPLE 2-7 | 28.9(x) | 26.6(x) | 58.5(o) | 67.6(o) | 1.9(o) | o |

As shown in Table 6, the pressure-sensitive adhesive force of each of Comparative Examples 2-1 to 2-4 and 2-7 to the polypropylene plate was bad with respect to both the initial condition and the normal condition. That of Comparative Examples 2-6 to the acrylic plate was good with respect to the normal condition, but was bad with respect to the initial condition. That of Comparative Example 2-1 to the acrylic plate was good with respect to the initial condition, but was bad with respect to the normal condition. That of Comparative Examples 2-2 to the acrylic plate was good with respect to the normal condition, but was bad with respect to the initial condition, and interlaminar fracture was observed between the surface layer and the core layer. On the other hand, the pressure-sensitive adhesive force of each of Examples 2-1 to 2-12 to each of the polypropylene plate and the acrylic plate was good with respect to both the initial condition and the normal condition. That is, it has been confirmed that the adhesiveness of each of Examples was more improved in comparison with those of Comparative Examples 2-1 to 2-4, 2-6, and 2-7.

The resistance to resilience of each of Comparative Examples 2-1, 2-2, 2-5, and 2-6 was bad in the polypropylene plate. On the other hand, the resistance to resilience of each of Examples was good in the polypropylene plate. Further, good holding property (cohesive force) was observed in each of Examples and Comparative Examples. Accordingly, it has been confirmed that each of Examples 2-1 to 2-12 has excellent pressure-sensitive adhesive force, excellent resistance to resilience, and an excellent holding property.

From the summarization of the above results, it has been confirmed that, by containing, as tackifying resins to be added to the acrylic polymer (A) as a pressure-sensitive adhesive composition, both the (meth)acrylic polymer (B) and the hydrogenated tackifying resin (C), an effect that has not been achieved before can be obtained, in which all of the pressure-sensitive adhesive force to adherends including an adherend having low polarity, resistance to resilience, and a holding property can be made good.

What is claimed is:

1. An acrylic pressure-sensitive adhesive composition, comprising:
    100 parts by mass of an acrylic polymer (A);
    1 to 70 parts by mass of a (meth)acrylic polymer (B) having a weight average molecular weight (Mw) of 1000≤Mw<30000; and
    1 to 50 parts by mass of a hydrogenated tackifying resin (C),
    wherein the glass transition temperature (Tg) of the (meth)acrylic polymer (B) is 0° C.≤Tg≤300° C, and
    wherein the ratio of the (meth)acrylic polymer (B)/the hydrogenated tackifying resin (C) is from 1/1.7 to 1/0.12.

2. The acrylic pressure-sensitive adhesive composition according to claim 1, wherein the (meth)acrylic polymer (B) contains, as a monomer unit, a (meth)acrylic monomer having an alicyclic structure in its side chain.

3. The acrylic pressure-sensitive adhesive composition according to claim 2, wherein an alicyclic hydrocarbon group in the (meth)acrylic monomer having an alicyclic structure has a bridged ring structure.

4. The acrylic pressure-sensitive adhesive composition according to claim 1, wherein the hydrogenated tackifying resin (C) is a petroleum resin or a terpene resin.

5. The acrylic pressure-sensitive adhesive composition according to claim 1, wherein the softening point of the hydrogenated tackifying resin (C) is 80 to 200° C.

6. The acrylic pressure-sensitive adhesive composition according to claim 1, wherein the acrylic polymer (A) contains, as a monomer unit, at least one type of monomer selected from the group consisting of N-vinyl cyclic amides, represented by the acrylic (1) described in the following general formula, and carboxyl group-containing monomers:

[Formula 1]

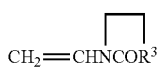

(1)

wherein, $R^3$ is a divalent organic group.

7. An acrylic pressure-sensitive adhesive layer comprising the acrylic pressure-sensitive adhesive composition according to claim 1.

8. The acrylic pressure-sensitive adhesive layer according to claim 7 containing 40 to 90% by mass of a solvent-insoluble component.

9. An acrylic pressure-sensitive adhesive tape including the acrylic pressure-sensitive adhesive layer according to claim 7.

10. The acrylic pressure-sensitive adhesive composition according to claim 1, wherein an alicyclic hydrocarbon group in the (meth)acrylic monomer having an alicyclic structure has a bridged ring structure.

11. The acrylic pressure-sensitive adhesive composition according to claim 2, wherein the hydrogenated tackifying resin (C) is a petroleum resin or a terpene resin.

12. The acrylic pressure-sensitive adhesive composition according to claim 3, wherein the hydrogenated tackifying resin (C) is a petroleum resin or a terpene resin.

* * * * *